United States Patent
Harada et al.

(10) Patent No.: US 10,139,675 B2
(45) Date of Patent: Nov. 27, 2018

(54) DISPLAY APPARATUS

(71) Applicant: Japan Display Inc., Tokyo (JP)

(72) Inventors: Tsutomu Harada, Tokyo (JP); Kazuhiko Sako, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/595,696

(22) Filed: May 15, 2017

(65) Prior Publication Data

US 2017/0336676 A1 Nov. 23, 2017

(30) Foreign Application Priority Data

May 17, 2016 (JP) .................................. 2016-098824

(51) Int. Cl.
*G02F 1/1335* (2006.01)
*G09G 3/20* (2006.01)
*G09G 3/34* (2006.01)
*G09G 3/36* (2006.01)

(52) U.S. Cl.
CPC ..... *G02F 1/133602* (2013.01); *G09G 3/2022* (2013.01); *G09G 3/342* (2013.01); *G09G 3/3413* (2013.01); *G09G 3/3666* (2013.01); *G09G 3/3607* (2013.01); *G09G 2310/0232* (2013.01); *G09G 2320/0238* (2013.01); *G09G 2320/0285* (2013.01); *G09G 2320/0646* (2013.01); *G09G 2360/16* (2013.01)

(58) Field of Classification Search
CPC ...... G02F 1/133602; G09G 2310/0232; G09G 2320/0238; G09G 3/2022; G09G 3/3413; G09G 3/3666

USPC .................................................. 345/102, 690
See application file for complete search history.

(56) References Cited

U.S. PATENT DOCUMENTS

| | | | |
|---|---|---|---|
| 8,233,738 B2 | 7/2012 | Rempel et al. | |
| 8,810,613 B2 * | 8/2014 | Higashi | G09G 3/2003 345/691 |
| 2001/0055032 A1 * | 12/2001 | Saito | G06K 9/48 345/660 |
| 2010/0039368 A1 | 2/2010 | Kim et al. | |
| 2010/0073276 A1 * | 3/2010 | Koike | G09G 3/3426 345/102 |
| 2012/0069063 A1 * | 3/2012 | Sato | H04N 13/0409 345/690 |

(Continued)

FOREIGN PATENT DOCUMENTS

| | | |
|---|---|---|
| JP | 2010-044389 A | 12/2016 |
| JP | 2016-224398 A | 12/2016 |

*Primary Examiner* — Tony Davis
(74) *Attorney, Agent, or Firm* — Michael Best & Friedrich LLP

(57) ABSTRACT

According to an aspect, a display apparatus includes: an image display panel that displays an image thereon; a planar light source that includes a plurality of light sources and irradiates a plurality of divided areas of the image display panel with light from the back side of the image display panel; and a signal processor that drives the light sources individually based on input signals of the image to control brightness of the individual divided areas. The signal processor performs image display on the image display panel using output signals obtained by lowering brightness of a dark region in the image represented by the input signals.

16 Claims, 30 Drawing Sheets

(56) References Cited

U.S. PATENT DOCUMENTS

| | | | |
|---|---|---|---|
| 2014/0232834 A1* | 8/2014 | Sato | G02B 27/225 348/51 |
| 2015/0109351 A1* | 4/2015 | Harada | G09G 3/3607 345/690 |
| 2015/0109352 A1* | 4/2015 | Takasaki | G09G 3/3406 345/690 |
| 2015/0279285 A1 | 10/2015 | Sako et al. | |
| 2015/0317934 A1 | 11/2015 | Takasaki et al. | |
| 2016/0358558 A1* | 12/2016 | Takasaki | G09G 3/342 |
| 2018/0031852 A1* | 2/2018 | Zhou | G02B 27/2214 |

* cited by examiner

LINEAR INTERPOLATION

POLYNOMIAL INTERPOLATION

DISPLAY APPARATUS

CROSS-REFERENCE TO RELATED APPLICATIONS

This application claims priority from Japanese Application No. 2016-098824, filed on May 17, 2016, the contents of which are incorporated by reference herein in its entirety.

BACKGROUND

1. Technical Field

The present invention relates to a display apparatus and a color conversion method.

2. Description of the Related Art

As disclosed in Japanese Patent Application Laid-open Publication No. 2010-44389 for example, a local dimming technique is available by which to attain a higher contrast ratio by dividing a display area into a plurality of areas, providing a plurality of light sources corresponding to the areas, and controlling an amount of luminescence of each of the light sources in units of areas. Conventionally, this local dimming technique has been increasingly adopted as an image quality improvement technique for liquid crystal televisions and the like, and it has recently come under consideration to use the local dimming technique to increase the dynamic range of displayed images also in display apparatuses of mobile equipment such as a smartphone and in display apparatuses of on-vehicle equipment.

Conventionally, peak luminance is generally enhanced in the local dimming technique for improving image quality such as attaining higher contrast and widening a dynamic range, and the like. Unfortunately, the effect obtained by enhancing peak luminance is limited by the maximum luminance of a display apparatuses or a backlight of a liquid crystal panel or the like. In particular, in a small device such as mobile equipment or in-vehicle equipment, it is difficult to increase peak luminance because of a constraint associated with the power supply, and a substantial effect is therefore possibly unavailable.

For the foregoing reasons, there is a need for a display apparatus that is configured to individually control brightness of a plurality of light sources capable of individually changing amounts of luminescence in a plurality of areas in a display area, and that is capable of increasing the number of gradations in a dark region of an image and capable of increasing a contrast ratio with respect to any image input.

SUMMARY

According to an aspect, a display apparatus includes: an image display pane that displays an image thereon; a planar light source that includes a plurality of light sources and irradiates a plurality of divided areas of the image display panel with light from the back side of the image display panel; and a signal processor that drives the light sources individually based on input signals of the image to control brightness of the individual divided areas. The signal processor performs image display on the image display panel using output signals obtained by lowering brightness of a dark region in the image represented by the input signals.

DETAILED DESCRIPTION

Figure 1:
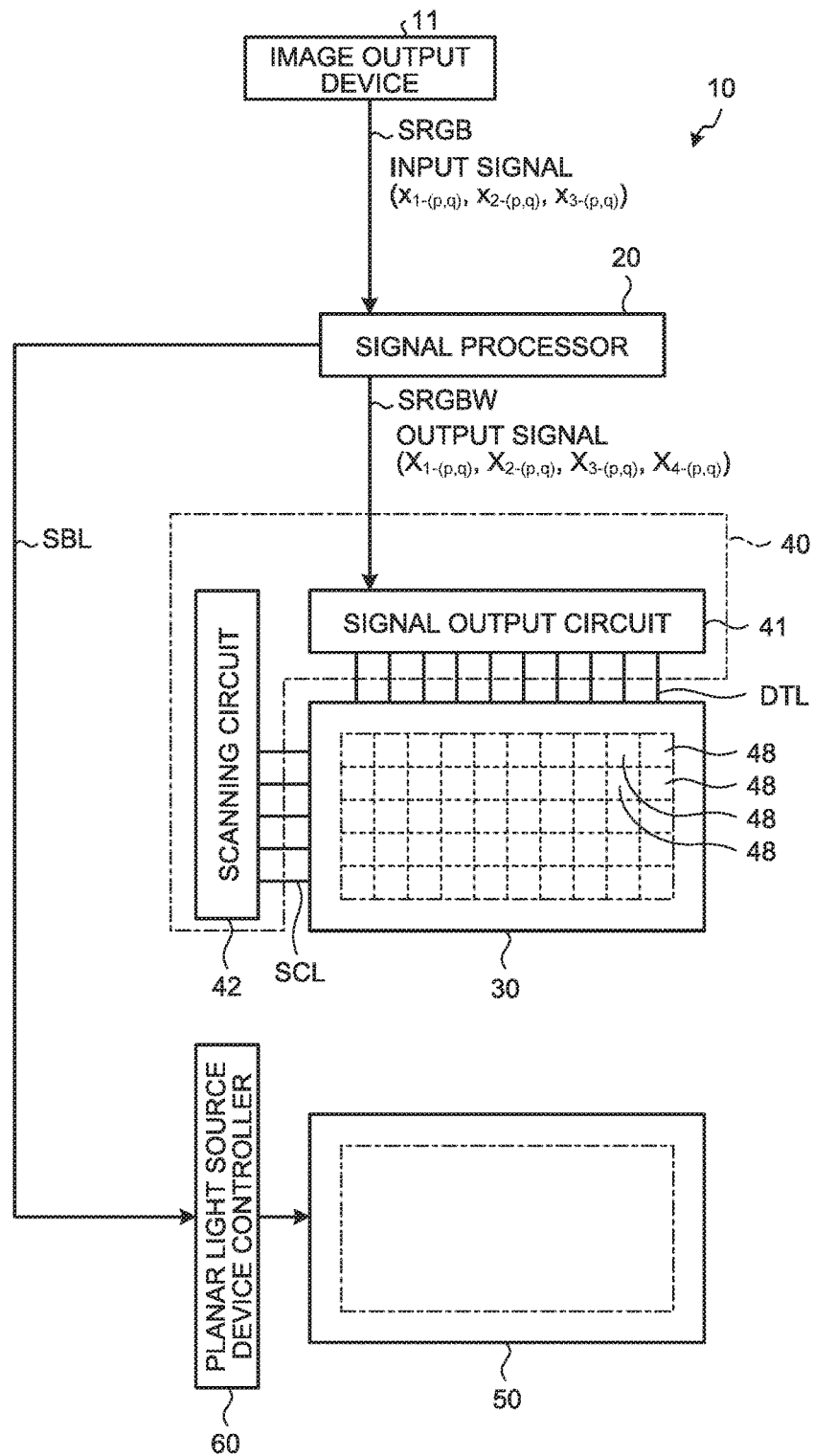
FIG. 1 is a block diagram of an exemplary configuration of a display apparatus according to a first embodiment.

The following describes embodiments in detail with reference to the drawings. The present invention is not limited to the embodiment described below. Components described below include a component that is easily conceivable by those skilled in the art and/or those that are substantially the same. The components described below can be appropriately combined. The disclosure is merely an example, and the present invention naturally encompasses an appropriate modification maintaining the gist of the invention that is easily conceivable by those skilled in the art. To further clarify the description, the width, the thickness, the shape, and the like of each component may be schematically illustrated in the drawings as compared with an actual aspect. However, this is merely an example and interpretation of the present invention is not limited thereto. The same element as that described in the drawing that has already been discussed is denoted by the same reference numeral through the description and the drawings, and detailed description thereof will not be repeated in some cases.

In this disclosure, when an element is described as being "on" another element, the element can be directly on the other element, or there can be one or more elements between the element and the other element.

First Embodiment
Configuration of the Display Apparatus

Figure 2:
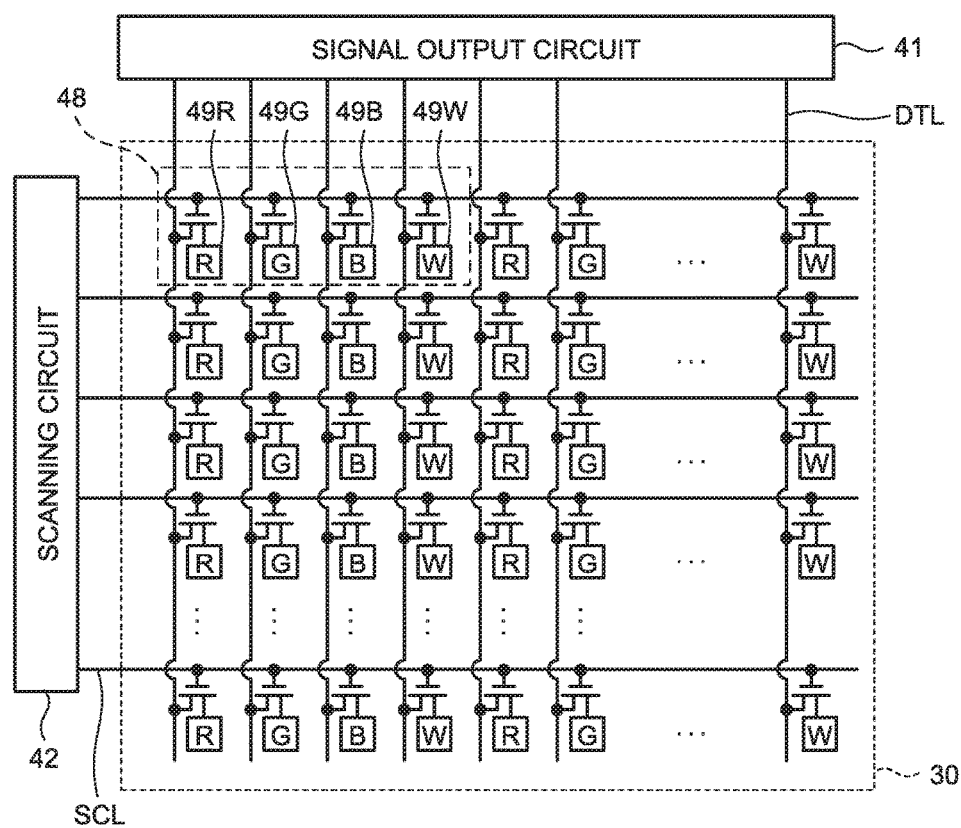
FIG. 2 is a diagram of a pixel array in an image display panel according to the first embodiment.

FIG. 1 is a block diagram of an exemplary configuration of a display apparatus according to a first embodiment. FIG. 2 is a diagram of a pixel array in an image display panel according to the first embodiment.

As illustrated in FIG. 1, a display apparatus 10 includes a signal processor 20, an image display panel (display device) 30, an image display panel driver 40, a planar light source device 50, and a planar light source device controller 60. The signal processor 20 receives input signals SRGB of an image from an image output device 11. The signal processor 20 transmits output signals SRGBW to other components of the display apparatus 10, thereby controlling operations of the components. The image display panel 30 displays an image based on the output signals SRGBW output from the signal processor 20. The image display panel driver 40 controls the drive of the image display panel 30. The planar light source device 50 irradiates the image display panel 30 from the back surface thereof. The planar light source device controller 60 controls the drive of the planar light source device 50.

The signal processor 20 is an arithmetic processing unit that controls operations of the image display panel 30 and the planar light source device 50. The signal processor 20 is coupled to the image display panel driver 40 that drives the image display panel 30 and to the planar light source device controller 60 that drives the planar light source device 50. The signal processor 20 processes the input signals received from the outside to generate output signals and planar light source device control signals. In other words, the signal processor 20 converts an input value (input signal) in an input HSV (Hue-Saturation-Value, Value is also called Brightness) color space of the input signal into an extended value (output signal) in an extended HSV color space reproducible by a first color, a second color, a third color, and a fourth color. The signal processor 20 outputs the generated output signal to the image display panel 30. The signal processor 20 outputs the generated output signal to the image display panel driver 40 and outputs the generated planar light source device control signal to the planar light source device controller 60.

As illustrated in FIG. 1, the image display panel 30 includes $P_0 \times Q_0$ pixels 48 ($P_0$ in a row direction and $Q_0$ in a column direction) arrayed in a two-dimensional matrix (rows and columns). In the example illustrated in FIG. 1, a plurality of pixels 48 are arrayed in a matrix in an X-Y two-dimensional coordinate system. In this example, the row direction corresponds to the X-direction, whereas the column direction corresponds to the Y-direction.

The pixels 48 each include a first sub-pixel 49R, a second sub-pixels 49G, a third sub-pixels 49B, and a fourth sub-pixels 49W. The first sub-pixels 49R displays a first primary color (e.g., red). The second sub-pixels 49G displays a second primary color (e.g., green). The third sub-pixels 49B displays a third primary color (e.g., blue). The fourth sub-pixels 49W displays a fourth color (specifically, white). As described above, the pixels 48 arrayed in a matrix in the image display panel 30 each include the first sub-pixels 49R that displays the first color, the second sub-pixels 49G that displays the second color, the third sub-pixels 49B that displays the third color, and the fourth sub-pixels 49W that displays the fourth color. The first, the second, the third, and the fourth colors are not limited to the first primary color, the second primary color, the third primary color, and white, respectively, and simply need to be different from one another, such as complementary colors. The fourth sub-pixel 49W that displays the fourth color is preferably brighter than the first sub-pixels 49R that displays the first color, the second sub-pixels 49G that displays the second color, and the third sub-pixels 49B that displays the third color when the first to fourth sub-pixels 49R, 49G, 49B, and 49W are irradiated with light of the same light source lighting amount. In the following description, the first sub-pixel 49R, the second sub-pixels 49G, the third sub-pixels 49B, and the fourth sub-pixels 49W will be referred to as a sub-pixel 49 when they need not be distinguished from one another.

More specifically, the display apparatus 10 is a transmissive color liquid-crystal display apparatus. As illustrated in FIG. 2, the image display panel 30 is a color liquid-crystal display panel. A first color filter is arranged between the first sub-pixels 49R and an image observer and allows the first primary color to pass therethrough. A second color filter is arranged between the second sub-pixels 49G and the image observer and allows the second primary color to pass therethrough. A third color filter is arranged between the third sub-pixels 49B and the image observer and allows the third primary color to pass therethrough. The image display panel 30 has no color filter between the fourth sub-pixel 49W and the image observer. The fourth sub-pixels 49W may be provided with a transparent resin layer instead of a color filter. The transparent resin layer in the image display panel 30 can suppress the occurrence of a large gap above the fourth sub-pixels 49W, otherwise a large gap occurs because no color filter is arranged for the fourth sub-pixels 49W.

The image display panel driver 40 illustrated in FIGS. 1 and 2 is included in a controller according to the present embodiment and includes a signal output circuit 41 and a scanning circuit 42. The image display panel driver 40 causes the signal output circuit 41 to hold video signals and sequentially output them to the image display panel 30. The signal output circuit 41 is electrically coupled to the image display panel 30 by signal lines DTL. The image display panel driver 40 causes the scanning circuit 42 to select sub-pixels 49 in the image display panel 30 and control on and off of switching elements (e.g., thin-film transistors TFTs)) for controlling operations (light transmittance) of the sub-pixels 49. The scanning circuit 42 is electrically coupled to the image display panel 30 by scanning lines SCL.

Figure 3:
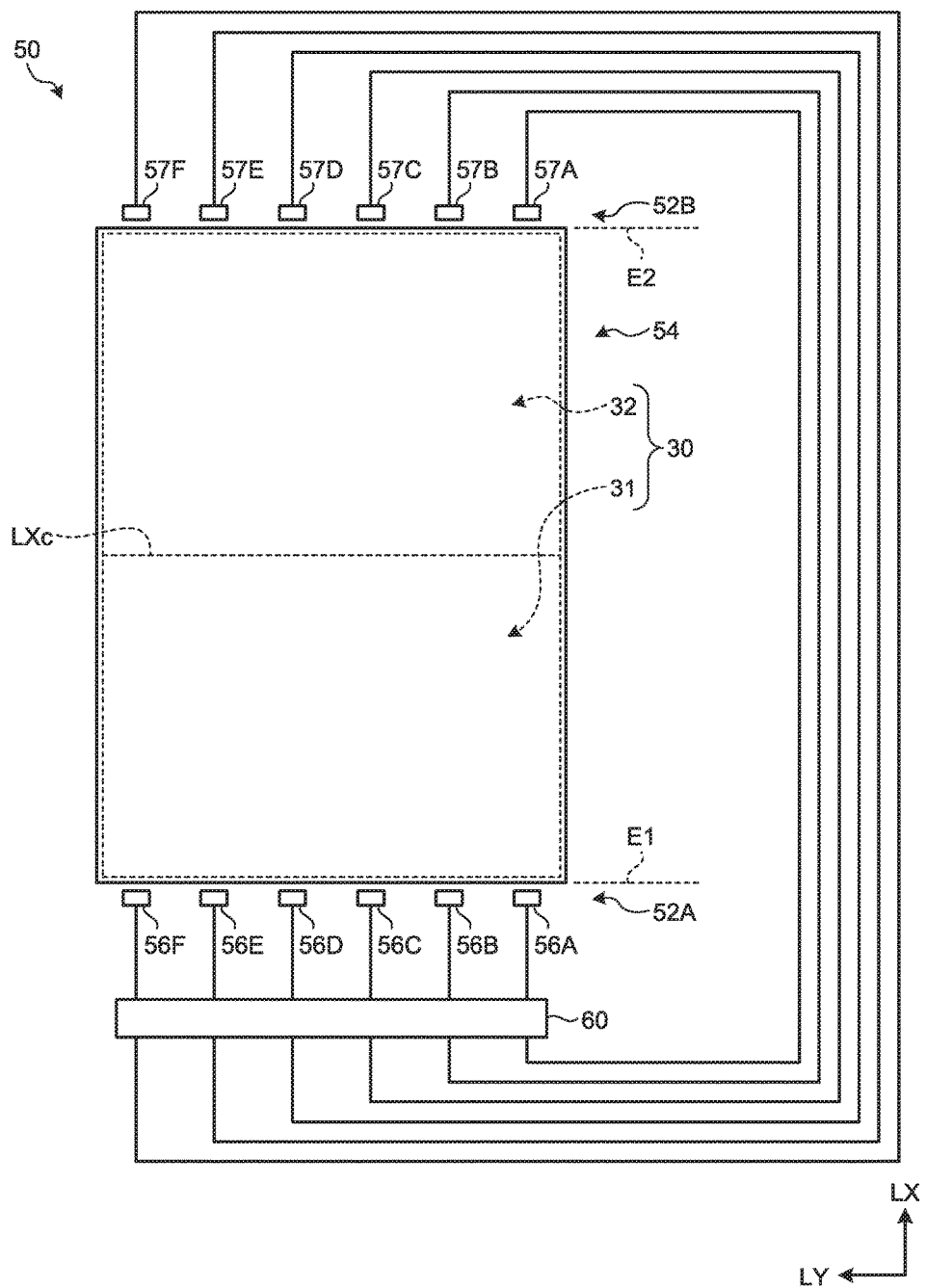
FIG. 3 is a diagram for explaining a light guide plate and sidelight type light sources according to the first embodiment.

The planar light source device 50 is arranged on the back surface side of the image display panel 30, and outputs light to the image display panel 30, thereby irradiating the image display panel 30. FIG. 3 is a diagram for explaining a light guide plate and sidelight type light sources according to the first embodiment. A light guide plate 54 has a first incident surface E1 and a second incident surface E2 on both side surfaces (first side surface and second side surface) thereof, respectively. The planar light source device 50 includes a first. sidelight type light source 52A at a position facing the first incident surface E1. The first sidelight type light source 52A includes a plurality of light sources 56A to 56F.

The planar light source device 50 also includes a second sidelight type light source 52B at a position facing the second incident surface E1. The second sidelight type light source 52B includes a plurality of light sources 57A to 57F.

The first sidelight type light source 52A and the second sidelight type light source 52B are arranged such that the light sources 56A to 56F and the light sources 57A to 57F are line-symmetric with respect to a center line LXc indicating the center of the guide light plate 54 in a light incident direction LX.

The light sources 56A to 56F and 57A to 57F, for example, are light-emitting diodes (LEDs) of the same color (e.g., white).

The light sources 56A to 56F are aligned along the first side surface of the light guide plate 54. Let us assume a case where LY denotes a light source array direction in which the light sources 56A to 56F are aligned. In this case, light output from the light sources 56A to 56F is incident on the first incident surface E1 of the light guide plate 54 along the light incident direction LX orthogonal to the light source array direction LY.

Similarly, the light sources 57A to 57F are aligned along the second side surface of the light guide plate 54. Let us assume a case where LY denotes a light source array direction in which the light sources 57A to 57F are aligned.

In this case, light output from the light sources 57A to 57F is incident on the second incident surface E2 of the light guide plate 54 along the light incident direction LX orthogonal to the light source array direction LY.

The planar light source device controller 60, for example, controls the amount of light output from the planar light source device 50. The planar light source device controller 60 is included in the controller according to the present embodiment. Specifically, the planar light source device controller 60 adjusts the value of an electric current supplied to the planar light source device 50 based on a planar light source device control signal SBL output from the signal processor 20. The planar light source device controller 60 thus controls the amount of light (intensity of light) output to the image display panel 30.

The value of an electric current supplied to the planar light source device 50 is adjusted by adjusting the duty ratio of a voltage or an electric current applied to the light sources 56A to 56F and 57A to 57F. In other words, the planar light source device controller 60 controls the on and off duty ratio of a voltage or an electric current applied to the light sources 56A to 56F and 57A to 57F in FIG. 3 individually. The planar light source device controller 60 thus performs light source divisional drive control for controlling the light source lighting amount (intensity) of light output from the light sources 56A to 56F and 57A to 57F individually.

As described above, the planar light source device controller 60 controls the brightness of each light source of the first sidelight type light source 52A individually and the brightness of each light source of the second sidelight type light source 52B individually.

The planar light source device controller 60 virtually divides the whole display surface of the image display panel 30 into two areas by the center line LXc indicating the center of the whole display surface in the light incident direction LX and handles the two areas resulting from the division as a first display surface 31 and a second display surface 32. The first display surface 31 is an area in the display surface of the image display panel 30 closer to the first sidelight type light source 52A. The first display surface 31 is more affected by light output from the first sidelight type light source 52A than by light output from the second sidelight type light source 52B. By contrast, the second display surface 32 is an area in the display surface of the image display panel 30 closer to the second sidelight type light source 52B. The second display surface 32 is more affected by light output from the second sidelight type light source 52B than by light output from the first sidelight type light source 52A.

The following describes an example where one light source of the first sidelight type light source 52A affects the first display surface 31 illustrated in. FIG. 3. The first sidelight type light source 52A and the second sidelight type light source 52B are arranged such that the light sources 56A to 56 P and the light sources 57A to 57F are line-symmetric with respect to the center line LXc indicating the center of the whole display surface in the light incident direction LX. Because the following description is also applicable to the light sources 57A to 57F by replacing the light sources 56A to 56F with the light sources 57A to 57F, detailed description will be omitted for an example where one light source of the second sidelight type light source 52B affects the second display surface 32 illustrated in FIG. 3.

Figure 4:
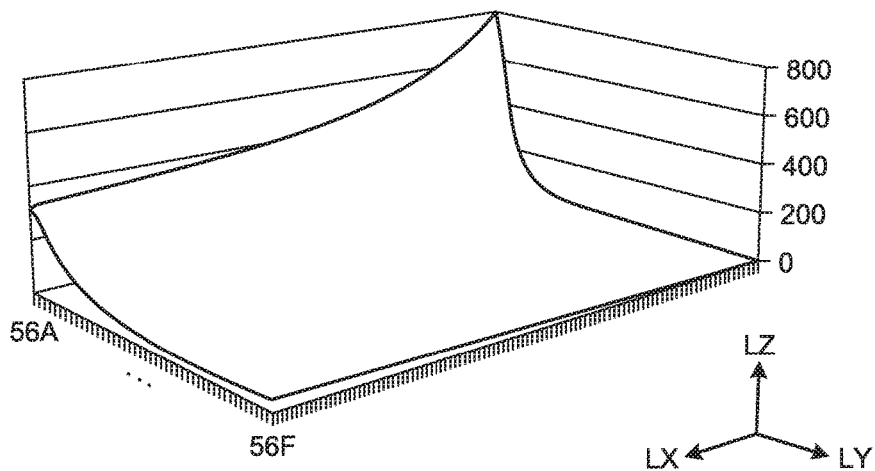
FIG. 4 is a diagram for explaining an example of a light intensity distribution affected by one light source of the sidelight type light source according to the first embodiment.
Figure 5:
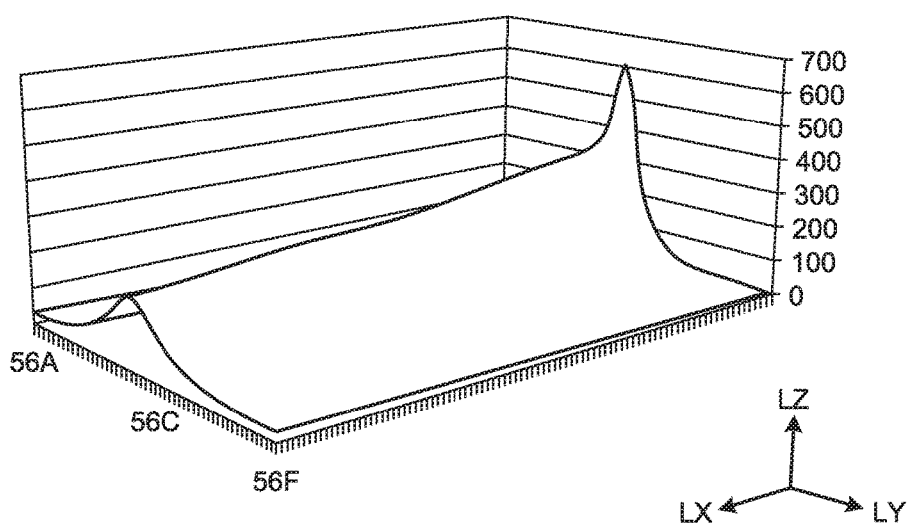
FIG. 5 is a diagram for explaining an example of a light intensity distribution affected by one light source of the sidelight type light source according to the first embodiment.

FIGS. 4 and 5 are diagrams for explaining examples of a light intensity distribution affected by one light source of the sidelight type light source according to the first embodiment. FIG. 4 illustrates information on the light intensity distribution of incident light obtained when only the light source 56A illustrated in FIG. 3 is turned on, the incident light being incident on the light guide plate 54 from the light source 56A and then traveling from the light guide plate 54 to the plane of the image display panel 30. When the incident light from the light source 56A enters the first incident surface E1 of the light guide plate 51 along the light incident direction LX orthogonal to the light source array direction LY, the light guide plate 54 guides the light in an illumination direction LZ in which the image display panel 30 is irradiated from the back surface thereof. The illumination direction LZ according to the present embodiment is orthogonal to the light source array direction LY and the light incident direction LX.

FIG. 5 illustrates information on the light intensity distribution of incident light obtained when only the light source 56C illustrated in FIG. 3 is turned on, the incident light being incident on the light guide plate 54 from the light source 56C and then traveling from the light guide plate 54 to the plane of the image display panel 30. When the incident light from the light source 56C enters the first incident surface E1 of the light guide plate 54 along the light incident direction LX orthogonal to the light source array direction LY, the light guide plate 54 guides the light in the illumination direction LZ in which the image display panel 30 is irradiated from the back surface thereof.

In the light guide plate 54, light is reflected by both end surfaces in the light source array direction LY. As a result, the intensity distribution of light output from the light sources 56A and 56F arranged closer to both end surfaces in the light source array direction LY is different from that of light output from the light source 56C, for example, arranged between the light sources 56A and 56F. To address this, the planar light source device controller 60 according to the present embodiment needs to control the electric current or the on and off duty ratio for the light sources 56A to 56F illustrated in FIG. 3 individually, thereby controlling the light source lighting amount (intensity) of output light depending on the light intensity distribution of the light sources 56A to 56F, which will be described later. The following describes processing operations performed by the display apparatus 10, more specifically, by the signal processor 20.

Processing Operations Performed by the Display Apparatus

Figure 6:
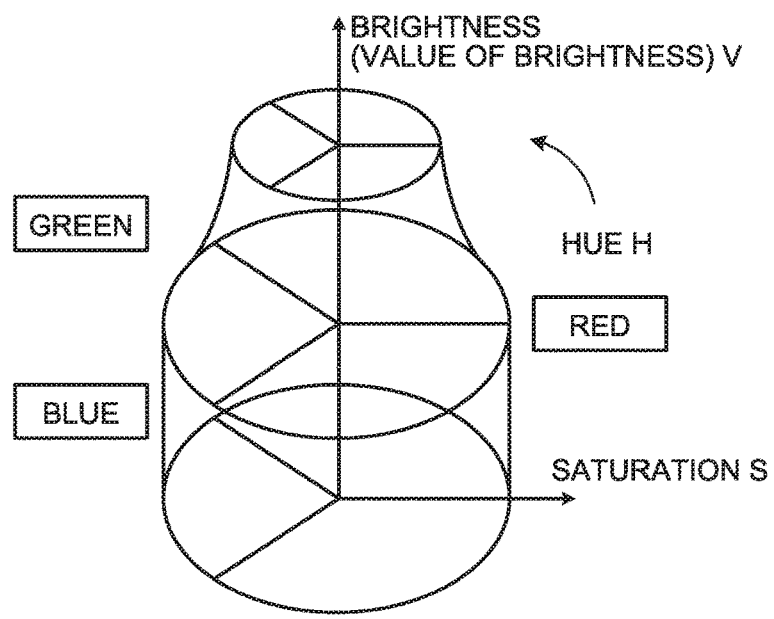
FIG. 6 is a conceptual diagram of an extended HSV color space reproducible by the display apparatus according to the first embodiment.
Figure 7:
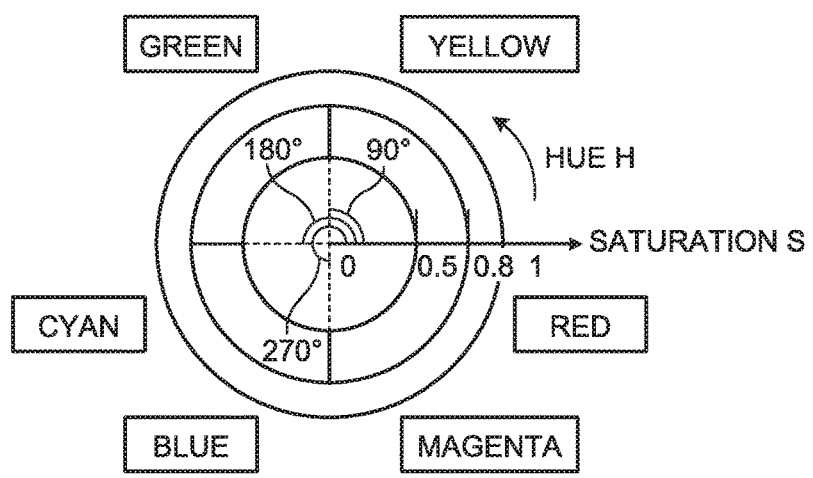
FIG. 7 is a conceptual diagram of the relation between a hue and saturation in the extended HSV color space.
Figure 8:
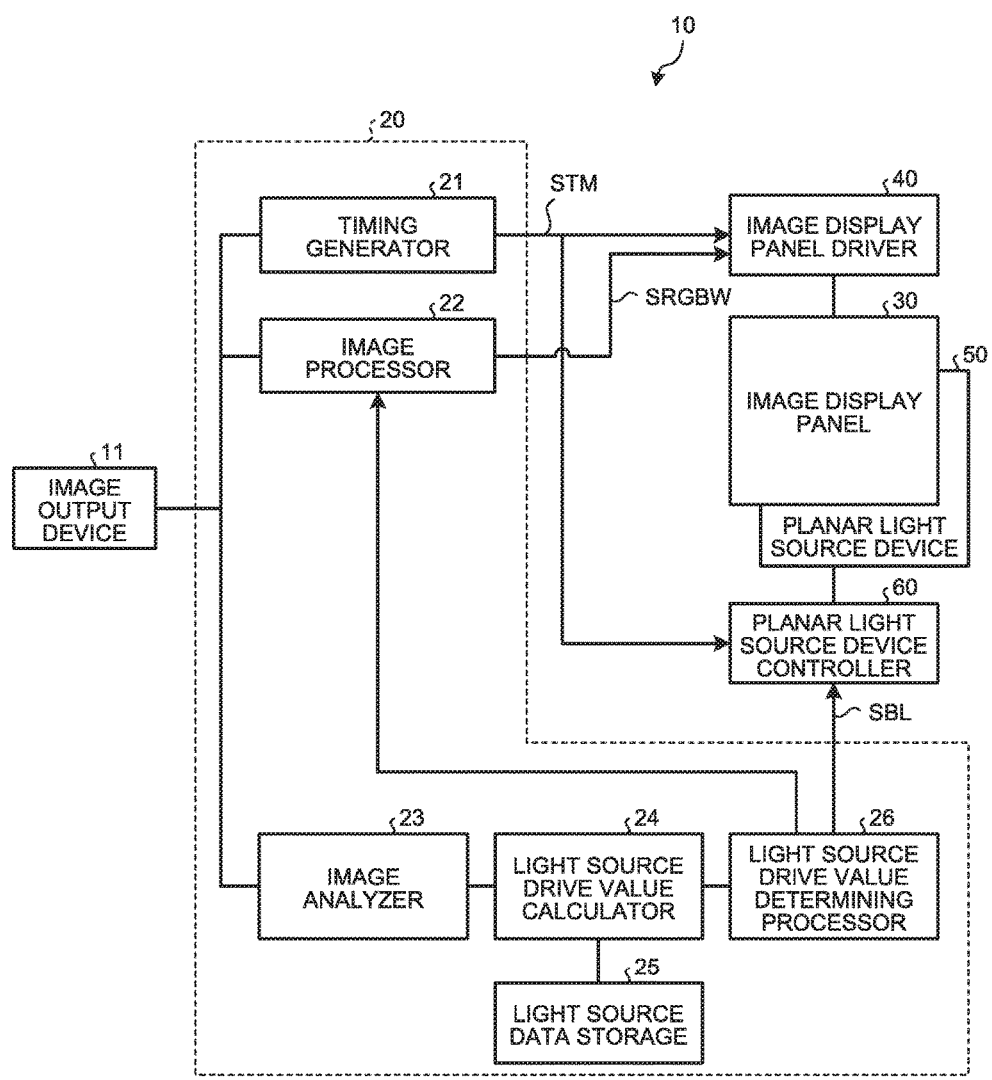
FIG. 8 is a block diagram for explaining a signal processor according to the first embodiment.
Figure 9:
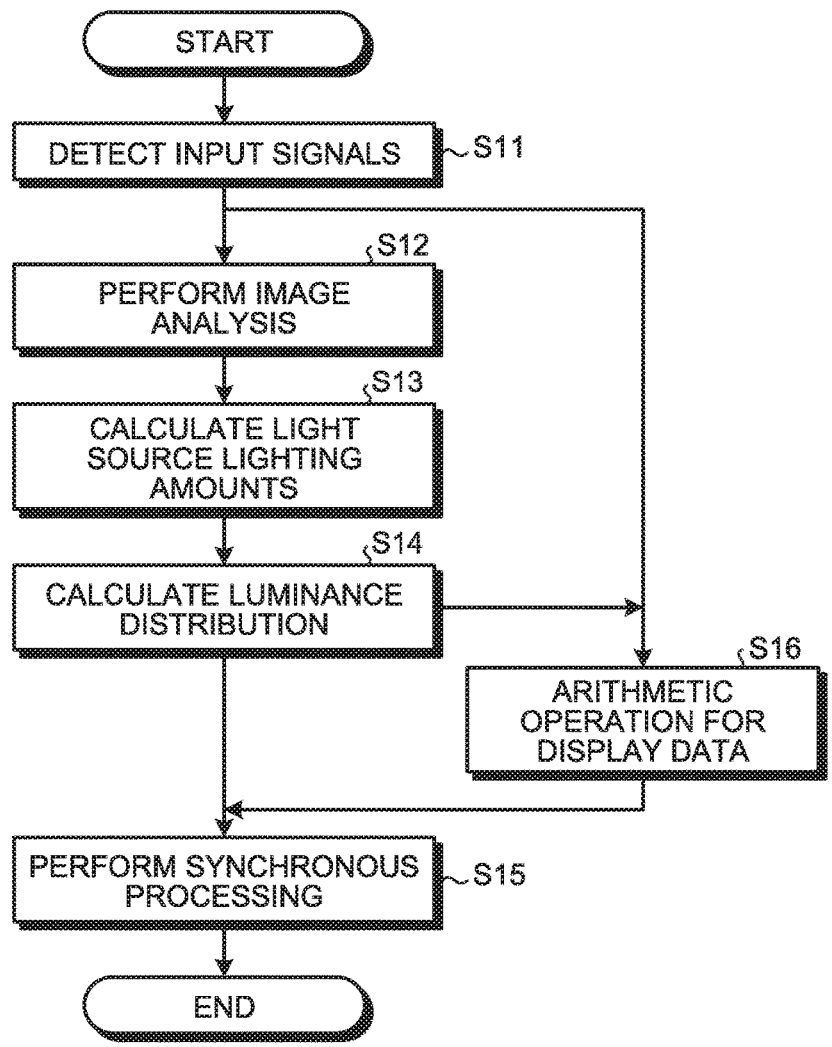
FIG. 9 is a flowchart of a method for driving the display apparatus according to the first embodiment.

FIG. 6 is a conceptual diagram of an extended HSV color space reproducible by the display apparatus according to the first embodiment. FIG. 7 is a conceptual diagram of a relation between a hue and saturation in the extended HSV color space. FIG. 8 is a block diagram for explaining a signal processor according to the first embodiment. As illustrated in FIG. 1, the signal processor 20 receives the input signals SRGB, which are information on an image to be displayed, from the image output device 11 provided outside the signal processor 20. FIG. 9 is a flowchart of a method for driving the display apparatus according to the first embodiment. The input signal SRGB includes information on an image (color) to be displayed at the position of each pixel as an input signal. Specifically, in the image display panel 30 including $P_0 \times Q_0$ pixels 48 arrayed in a matrix (row-column configuration), the signal processor 20 receives, for the (p, q)-th pixel 48 (where $1 \le p \le P_0$ and $1 \le q \le Q_0$), a signal including an input signal for the first sub-pixels 49R having a signal value of $x_{1-(p, q)}$, an input signal for the second sub-pixels 49G having a signal value of $x_{2-(p, q)}$, and an input signal for the third sub-pixels 49B having a signal value of $x_{3-(p, q)}$ (refer to FIG. 1). As illustrated in FIG. 8, the signal processor 20 includes a timing generator 21, an image processor 22, an image analyzer 23, a light source drive value calculator 24, a light source data storage 25, and a light source drive value determining processor 26.

As illustrated in FIG. 9, the signal processor 20 illustrated in FIGS. 1 and 8 detects an input signal SRGB (Step S11). The timing generator 21 processes the input signal SRGB, thereby transmitting a synchronization signal STM for synchronizing timings of each frame in the image display panel driver 40 and the planar light source device controller 60 to the image display panel driver 40 and the planar light source device controller 60.

The image processor 22 of the signal processor 20 processes the input signal SRGB, thereby generating an output signal for the first sub-pixel (signal value $X_{1-(p, q)}$) for determining display gradation in the first sub-pixels 49R, an output signal for the second sub-pixel (signal value $X_{2-(p, q)}$) for determining display gradation in the second sub-pixels 49G, an output signal for the third sub-pixel (signal value $X_{3-(p, q)}$) for determining display gradation in the third sub-pixels 49B, and an output signal for the fourth sub-pixel (signal value $X_{4-(p, q)}$) for determining display gradation in the fourth sub-pixels 49W. The signal processor 20 performs an arithmetic step (Step S16) of calculating display data to be output to the image display panel driver 40. The following describes the arithmetic step of calculating display data (Step S16) according to the present embodiment in detail.

Because the pixels 48 each include the fourth sub-pixels 49W that outputs the fourth color (white), the display apparatus 10 can broaden the dynamic range of brightness in the HSV color space (extended HSV color space) as illustrated in FIG. 6. Specifically, as illustrated in FIG. 6, the extended HSV color space has the following shape: a substantially truncated cone in which the maximum value of brightness V decreases as saturation S increases is placed on a cylindrical HSV color space displayable by the first sub-pixels 49R, the second sub-pixels 49G, and the third sub-pixels 49B.

The signal processor 20 stores therein the maximum value VMax(S) of the brightness having the saturation S as a variable in the HSV color space expanded (extended) by adding the fourth color (e.g., white) by the image processor 22 of the signal processor 20. In other words, the signal processor 20 stores therein the maximum value Vmax (S) of the brightness for each pair of coordinates (coordinate values) of the saturation and the hue in the three-dimensional HSV color space illustrated in FIG. 6 Because the input signal includes the input signals for the first sub-pixels 49R, the second sub-pixels 49G, and the third sub-pixel 49B, the HSV color space of the input signal has a cylindrical shape, that is, the same shape as the cylindrical part of the extended HSV color space.

The image processor 22 in the signal processor 20 calculates the output signal (signal value $X_{1-(p, q)}$) for the first sub-pixels 49R based on at least the input signal (signal value $x_{1-(p, q)}$) and an expansion coefficient α of the first sub-pixels 49R and outputs the output signal to the first sub-pixels 49R. The signal processor 20 calculates the output signal (signal value $X_{2-(p, q)}$) for the second sub-pixels 49G based on at least the input signal (signal value $x_{2-(p, q)}$) and an expansion coefficient α of the second sub-pixels 49G and outputs the output signal to the second sub-pixels 49G. The signal processor 20 calculates the output signal (signal value $X_{3-(p, q)}$) for the third sub-pixels 49B based on at least the input signal (signal value $x_{3-(p, q)}$) and an expansion coefficient α of the third sub-pixels 49B and outputs the output signal to the third sub-pixels 49B. The signal processor 20 calculates the output signal (signal value $X_{4-(p, q)}$) for the fourth sub-pixels 49W based on the input signal (signal value $x_{1-(p, q)}$) for the first sub-pixels 49R, the input signal (signal value $x_{2-(p, q)}$) for the second sub-pixels 49G and the input signal (signal value $x_{3-(p, q)}$) for the third sub-pixels 49B and outputs the output signal to the fourth sub-pixels 49W.

Specifically, the image processor 22 of the signal processor 20 calculates the output signal for the first sub-pixels 49R based on the expansion coefficient α of the first sub-pixels 49R and the output signal for the fourth sub-pixels 49W, calculates the output signal for the second sub-pixels 49G based on the expansion coefficient α of the second sub-pixels 49G and the output signal for the fourth sub-pixels 49W, and calculates the output signal for the third sub-pixels 49B based on the expansion coefficient α of the third sub-pixels 49B and the output signal for the fourth sub-pixels 49W.

Specifically, assuming that $\chi$ is a constant depending on the display apparatus, the signal processor 20 calculates the signal value $X_{1-(p, q)}$ corresponding to the output signal for the first sub-pixels 49R, the signal value $X_{2-(p, q)}$ corresponding to the output signal for the second sub-pixels 49G, and the signal value $X_{3-(p, q)}$ corresponding to the output signal for the third sub-pixels 49B for the (p, q)-th pixel (or the (p, q)-th group of the first sub-pixel 49R, the second sub-pixels 49G, and the third sub-pixels 49B) using the following expressions (1) to (3), respectively.

$$X_{1-(p, q)} = \alpha \times X_{1-(p, q)} - \chi \times X_{4-(p, q)} \quad (1)$$

$$X_{2-(p, q)} = \alpha \times X_{2-(p, q)} - \chi \times X_{4-(p, q)} \quad (2)$$

$$X_{3-(p, q)} = \alpha \times X_{3-(p, q)} - \chi \times X_{4-(p, q)} \quad (3)$$

The signal processor 20 obtains the maximum value Vmax(S) of the brightness using the saturation S as a variable in the HSV color space expanded by adding the fourth color, obtains the saturation S and the brightness V(S) of a plurality of pixels 48 based on input signal values of the sub-pixels 49 of the pixels 48.

The saturation S is expressed by: S=(Max−Min)/Max, and the brightness V(S) is expressed by: V(S)=Max. The saturation S takes a value from 0 to 1, and the brightness V(S) takes a value from 0 to $(2^n-1)$, where n is the number of bits for display gradation. Max is the maximum value of the input signal value of the first sub-pixels 49R, the input signal value of the second sub-pixels 49G, and the input signal value of the third sub-pixels 49B in the pixel 48. Min is the minimum value of the input signal value of the first sub-pixels 49R, the input signal value of the second sub-pixels 49G, and the input signal value of the third sub-pixels 49B in the pixel 48. As illustrated in FIG. 7, the hue H is represented in a range from 0° to 360°. The hue H varies in order of red, yellow, green, cyan, blue, magenta, and red from 0° to 360°.

In this embodiment, the signal value $X_{4-(p, q)}$ can be obtained based on a product of $Min_{(p, q)}$ and the expansion coefficient α. Specifically, the signal value $X_{4-(p, q)}$ can be obtained based on the following expression (4). In the expression (4), the product of $Min_{(p, q)}$ and the expansion coefficient α is divided by $\chi$, but the present embodiment is not limited thereto. Description of $\chi$ will be provided later.

$$X_{4-(p, q)} = Min_{(p, q)} \times \alpha / \chi \quad (4)$$

Typically, in the (p, q)-th pixel, the saturation $S_{(p, q)}$ and the brightness $V(S)_{(p, q)}$ in the cylindrical HSV color space can be obtained through the following expressions (5) and (6) based on the input signal (signal value $x_{1-(p, q)}$ for the first sub-pixels 49R, the input signal (signal value $x_{2-(p, q)}$ for the second sub-pixels 49G, and the input signal (signal value $x_{3-(p, q)}$ for the third sub-pixels 49B.

$$S_{(p, q)} = (Max_{(p, q)} - Min_{(p, q)}) / Max_{(p, q)} \quad (5)$$

$$V(S)_{(p, q)} = Max_{(p, q)} \quad (6)$$

In this case, $Max_{(p, q)}$ is the maximum value among the input signal values of three sub-pixels 49, that is, $(x_{1-(p, q)}, x_{2-(p, q)}, x_{3-(p, q)})$ and $Min_{(p, q)}$ is the minimum value among the input signal values of three sub-pixels 49 that is, $(x_{1-(p, q)}, x_{2-(p, q)}, x_{3-(p, q)})$.

The fourth sub-pixel 49W that displays white is provided with no color filter. The fourth sub-pixels 49W that displays the fourth color is brighter than the first sub-pixels 49R that displays the first color, the second sub-pixels 49G that displays the second color, and the third sub-pixel 49B that displays the third color when the first to fourth sub-pixels 49W, 49R, 49G, and. 49B are irradiated. with light of the same light source lighting amount. Let us assume a case where $BN_{1-3}$ denotes the luminance of an aggregate of the first sub-pixels 49R, the second sub-pixel 49G, and the third sub-pixels 49B in a pixel 48 or a group of pixels 48 obtained when the first sub-pixels 49R receives a signal having a value corresponding to the maximum signal value of the output signals for the first sub-pixels 49R, the second sub-pixels 49G receives a signal having a value corresponding to the maximum signal value of the output signals for the second sub-pixels 49G, and the third sub-pixels 49B receives a signal having a value corresponding to the maximum signal value of the output signals for the third sub-pixels 49B. Let us also assume a case where $BN_4$ denotes the luminance of the fourth sub-pixels 49W obtained when the fourth sub-pixel 49W in the pixel 48 or the group of pixels 48 receives a signal having a value corresponding to the maximum signal value of the output signals for the fourth sub-pixels 49W. In other words, when the aggregate of the first sub-pixels 49R, the second sub-pixels 49G, and the third sub-pixels 49B displays white having the highest luminance, the luminance of white is represented by $BN_{1-3}$. Assuming that $\chi$ is a constant depending on the display apparatus, the constant $\chi$ is expressed by: $\chi = BN_4 / BN_{1-3}$.

Specifically, the luminance $BN_4$ in a case where the input signal having the maximum value of display gradation is assumed to be input to the fourth sub-pixels 49W is, for example, 1.5 times the luminance $BN_{1-3}$ of white in a case where the maximum value of the signal value $x_{1-(p, q)}$, the maximum value of the signal value $X_{2-(p, q)}$, and the maximum value of the signal value $x_{3-(p, q)}$ are input to the aggregate of the first sub-pixels 49R, the second sub-pixel 49G, and the third sub-pixels 49B as input signals having the above display gradation value. That is, $\chi = 1.5$ in this embodiment.

When the signal value $x_{4-(p, q)}$ is given by the above expression (4), the maximum value Vmax(S) of the brightness can be represented by the following expressions (7) and (8).

When $S \leq S_0$, $$V\max(S) = (\chi + 1) \times (2^n - 1) \quad (7)$$

When $S_0 < S \leq 1$, $$V\max(S) = (2^n - 1) \times (1/S) \quad (8)$$

where $S_0 = 1/(\chi + 1)$. In other words, $S_0$ denotes a threshold for the saturation S. If the saturation S of the input signal value is equal to or lower than $S_0$, the display apparatus 10 can reproduce brightness obtained when the fourth sub-pixel is turned on with the maximum lighting amount. By contrast, if the saturation S of the input signal value is higher than $S_0$, the display apparatus 10 fails to reproduce the brightness obtained when the fourth sub-pixel is turned on with the maximum lighting amount.

The thus obtained maximum value Vmax (S) of the brightness using the saturation S as a variable the HSV color space expanded (extended) by adding the fourth color is stored, for example, as a kind of look-up tab in the signal processor 20. Alternatively, the maximum value Vmax(S) of the brightness using the saturation S as a variable in the expanded HSV color space is obtained by the signal processor 20 as occasion demands.

Next, the following describes a method (expansion processing) of obtaining the output signals for the (p, q)-th pixel 48, that is, the signal values of $X_{1-(p, q)}$, $X_{2-(p, q)}$, $X_{3-(p, q)}$, and $X_{4-(p, q)}$. The following processing is performed while maintaining a ratio between the luminance of the first primary color displayed by (the first sub-pixels 49R+the fourth sub-pixels 49W), the luminance of the second primary color displayed by (the second sub-pixels 49G+the fourth sub-pixels 49W), and the luminance of the third primary color displayed by (the third sub-pixels 49B+the fourth sub-pixels 49W). The processing is performed while keeping (maintaining) a color tone. Additionally, the processing is performed while keeping (maintaining) a gradation-luminance characteristic (gamma characteristic, or γ characteristic). When all of the input signal values are 0 or small in any of the pixels 48 or any group of the pixels 48, the expansion coefficient α may be obtained without including such a pixel 48 or a group of the pixels 48.

First Process

First, the signal processor 20 obtains the saturation S and the brightness V(S) of each of the pixels 48 based on the input signal values of the sub-pixels 49 of the pixels 48. Specifically, the signal processor 20 obtains $S_{(p, q)}$ and $V(S)_{(p, q)}$ through the expressions (7) and (8) based on the signal value $x_{1-(p, q)}$ as the input signal to the (p, q)-th pixel 48 for the first sub-pixels 49R, the signal value $x_{2-(p, q)}$ as the input signal thereto for the second sub-pixel 49G, and the signal value $x_{3-(p, q)}$ as the input signal thereto for the third sub-pixels 49B. The signal processor 20 performs this processing on each of the pixels 48.

Second Process

Subsequently, the signal processor 20 obtains the expansion coefficient α (S) based on Vmax(S)/V(S) obtained for the pixels 48.

$$\alpha(S) = V\max(S)/V(S) \qquad (9)$$

Third Process

Next, the signal processor 20 obtains the signal value $X_{4-(p, q)}$ for the (p, q)-th pixel 48 based on at least the signal value $x_{1-(p, q)}$, the signal value $x_{2-(p, q)}$, and the signal value $x_{3-(p, q)}$. In this embodiment, the signal processor 20 determines the signal value $X_{4-(p, q)}$ based on $Min_{(p, q)}$, the expansion coefficient α, and the constant χ. More specifically, as described above, the signal processor 20 obtains the signal value $X_{4-(p, q)}$ based on the expression (4) described above. The signal processor 20 obtains the signal value $X_{4-(p, q)}$ for all of the $P_0 \times Q_0$ pixels 48.

Fourth Process

Subsequently, the signal processor 20 obtains the signal value $X_{1-(p, q)}$ for the (p, q)-th pixel 48 based on the signal value $x_{1-(p, q)}$ the expansion coefficient α, and the signal value $X_{4-(p, q)}$, obtains the signal value $X_{2-(p, q)}$ for the (p, q)-th pixel 48 based on the signal value $x_{2-(p, q)}$, the expansion coefficient α, and the signal value $X_{4-((p, q)}$, and obtains the signal value $X_{3-(p, q)}$ for the (p, q)-th pixel 48 based on the signal value $X_{3-(p, q)}$, the expansion coefficient α, and the signal value $X_{4-(p, q)}$. Specifically, the signal processor 20 obtains the signal value $X_{1-(p, q)}$, the signal value $X_{2-(p, q)}$, and the signal value $X_{3-(p, q)}$ for the (p, q)-th pixel 48 based on the expressions (1) to (3) described above.

As represented by the expression (4), the signal processor 20 expands $Min_{(p, q)}$ with the expansion coefficient α. Expansion of $Min_{(p, q)}$ with the expansion coefficient α increases not only the luminance of a white display sub-pixel (fourth sub-pixels 49W) but also the luminance of a red display sub-pixel, a green display sub-pixel, and a blue display sub-pixel (corresponding to the first sub-pixels 49R, the second sub-pixels 49G, and the third sub-pixels 49B, respectively) as represented by the expressions described above. As a result, dullness in color can be prevented. In other words, expansion of $Min_{(p, q)}$ with the expansion coefficient α increases the luminance of the entire image by α times compared with a case where $Min_{(p, q)}$ is not expanded. This expansion method is suitably used to display an image, such as a still image, with high luminance, for example.

As illustrated in FIG. 9, the signal processor 20 performs the arithmetic step of calculating display data (Step S16) and performs an image analysis on the input signals SRGB (Step S12). The image analysis (Step S12) on the input signals SRGB in the image analyzer 23 is described herein.

Figure 10:
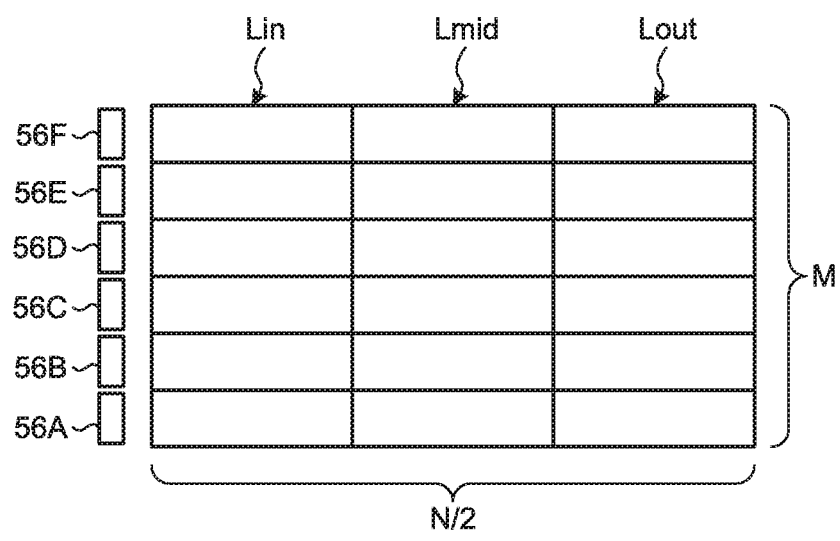
FIG. 10 is a diagram of an example of luminance determination blocks according to the first embodiment.

Based on the input signals SRGB, the image analyzer 23 obtains an expansion coefficient $\alpha_b$ with respect to each luminance determination block (a block that is a divided area obtained when the display area of the image display panel 30 is divided into a plurality of divided areas) and outputs it to the image processor 22. The luminance determination blocks are described here. FIG. 10 is a diagram of an example of the luminance determination blocks according to the first embodiment.

In the present embodiment, the light sources 56A to 56F are individually controlled for controlling the luminance of the panel. For that purpose, in the present embodiment, the image analyzer 23 calculates, with respect to each luminance determination block, an expansion coefficient and a reciprocal thereof based on input signal values of the pixels 48 in that luminance determination block. The expansion coefficient of each luminance determination block is hereinafter denoted by $\alpha_b$, and the reciprocal thereof is denoted by $1/\alpha_b$.

In the present embodiment, the luminance determination blocks (which may simply referred to as blocks) include a light incident portion Lin, a middle portion Lmid, and an outer portion Lout that are arrayed, as illustrated in FIG. 10, in a manner such that: columns, each of which includes the light incident portion Lin, the middle portion Lmid, and the outer portion Lout aligned in the light incident direction LX, are aligned in the light source array direction LY. Thus, the light incident portion Lin, the middle portion Lmid, and the outer portion Lout are luminance determination blocks obtained by virtually dividing the first display surface 31 (refer to FIG. 3) of the image display panel 30 into a matrix in the light source array direction LY and the light incident direction LX. The luminance determination blocks according to the present embodiment are arranged in a form of six columns in the light source array direction LY and three rows in the light incident direction. LX. The number of columns of the luminance determination blocks in the light source array direction LY illustrated in FIG. 10 corresponds to the number of the light sources 56A to 56F, each of the columns including the light incident portion Lin, the middle portion Lmid, and the outer portion Lout. In the luminance determination blocks illustrated in FIG. 10, the number of luminance determination blocks in the light incident direction LX is three of the light incident portion Lin, the middle portion Lmid, and the outer portion Lout. The outer portion Lout, the middle portion Lmid, and the light incident portion Lin are closer to the center line LXc indicating the center of the whole display surface in the light incident direction LX is this order. The present embodiment considers three blocks present at the same position in the light source array direction LY (the light incident portion Lin, the middle portion Lmid, and the outer portion Lout) as one group. In this arrangement, a plurality of groups are aligned in the light source array direction LY. The processing described later is performed while sequentially specifying each of the groups as a group of interest.

Based on the input signal values of the pixels 48 included in each luminance determination block, the image analyzer 23 calculates the expansion coefficient $\alpha_b$ applicable to the pixels 48 in that, luminance determination block, and $1/\alpha_b$ for that luminance determination block.

The expansion coefficient $\alpha_b$ applicable to the pixel 48 in each luminance determination block can be calculated by the following expression (9)' obtained by rearranging the expression (9). In the expression (9)', $V\max_b$ denotes the maximum value of brightness in the luminance determination block, and $V_b$ denotes brightness in the pixel 48 in the luminance determination block.

$$\alpha_b = V\max_b / V_b \qquad (9)'$$

Figure 11:
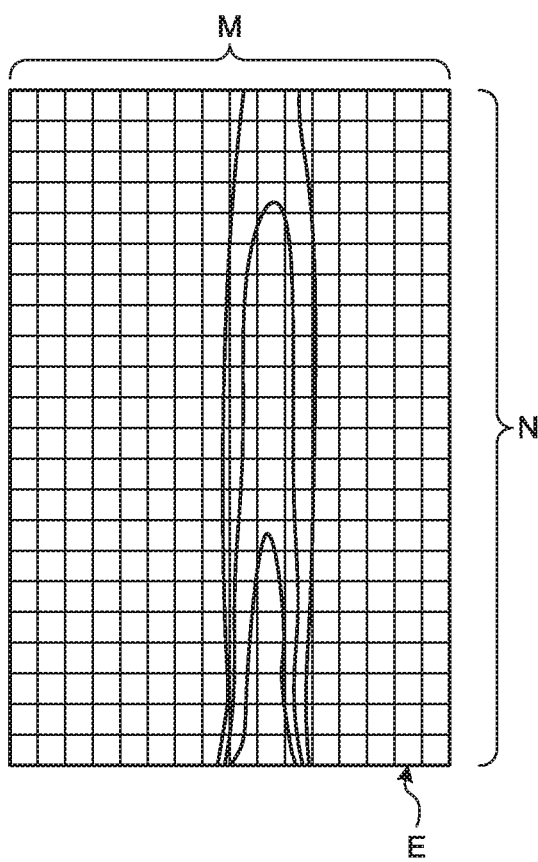
FIG. 11 is a schematic diagram for explaining information on a light intensity distribution of incident light incident on the light guide plate from a certain light source and traveling from the light guide plate to a plane of the image display panel.
Figure 12:
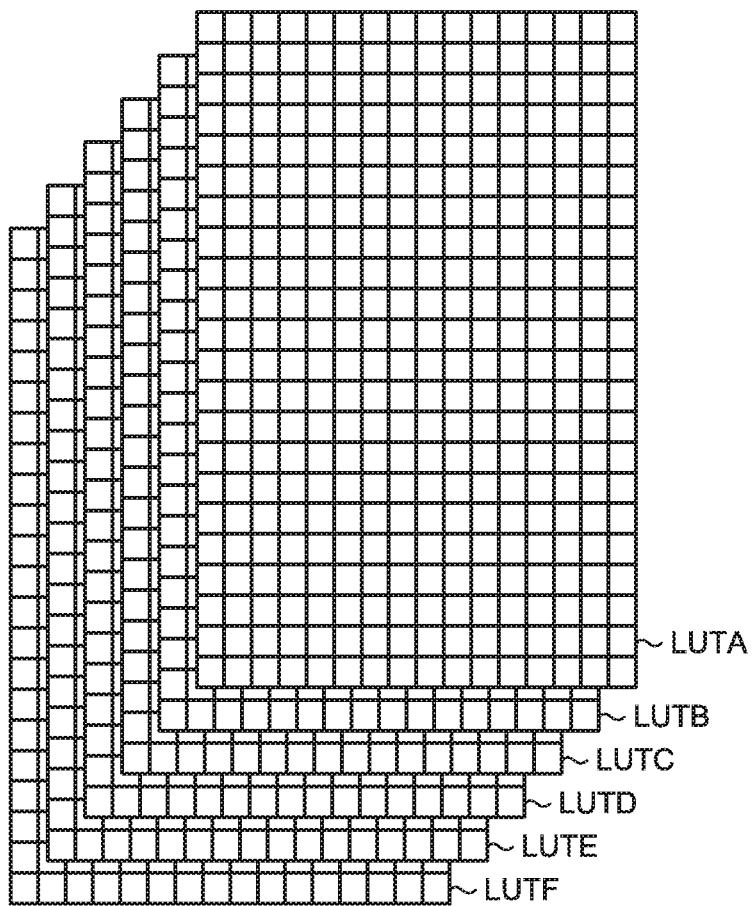
FIG. 12 is a schematic diagram for explaining lookup tables.

The following describes lookup tables used in the processing described later. FIG. 11 is a schematic diagram for explaining information on light intensity distribution of incident light incident on the light guide plate from a certain light source and traveling from the light guide plate to a plane of the image display panel. FIG. 12 is a schematic diagram for explaining the lookup tables. The light source data storage 25 according to the present embodiment stores therein a plurality of lookup tables (LUTs). The lookup tables are array data composed of M×N array elements and each store therein representative values of light intensity in the array elements. M denotes the number of array elements in the light source array direction LY (number of columns), whereas N denotes the number of array elements in the light incident direction LX (number of rows). While the M×N array elements each correspond to a corresponding one of the pixels, for example, the number of the array elements in lookup tables can be reduced by dropping some array elements at regular intervals from all the array elements corresponding to the pixels and storing the remaining array elements in the lookup tables. Alternatively, the lookup tables may each store therein representative values of light intensity in respective divided areas obtained by virtually dividing the plane of the image display panel 30 into M×N. In this case, the representative value may be the average of light intensity in the corresponding divided area, the median of light intensity in the corresponding divided area, or the value of light intensity at any position in the corresponding divided area, for example. While the data in the lookup tables according to the present embodiment is the representative values of the respective divided areas, it is not limited thereto.

The lookup tables according to the present embodiment each store therein the representative values of light intensity in the respective divided areas obtained by virtually dividing the plane of the image display panel 30 illustrated in FIG. 3 into M×N. The light source data storage 25 stores therein the lookup tables of the respective light sources. As illustrated in FIG. 11, for example, the light source data storage 25 stores therein a lookup table LUTA. The LUTA indicates the information on the light intensity distribution of incident light obtained when only the light source 56A illustrated in FIG. 3 is turned on with a certain light source lighting amount (refer to FIG. 4) on the light guide plate 54, the incident light being incident on the light guide plate 54 from the light source 56A and traveling from the light guide plate 54 to the plane of the image display panel 30. The light source data storage 25 also stores therein a lookup table LUTB. The LUTB indicates the information on the light intensity distribution of incident light obtained when only the light source 56B illustrated in FIG. 3 is turned on with the certain light source lighting amount, the incident light being incident on the light guide plate 54 from the light source 56B and traveling from the light guide plate 54 to the plane of the image display panel 30. The light source data storage 25 also stores therein a lookup table LUTC. The LUTC indicates the information on the light intensity distribution of incident light obtained when only the light source 56C illustrated in FIG. 3 is turned on with the certain light source lighting amount, the incident light being incident on the light guide plate 54 from the light source 56C and traveling from the light guide plate 54 to the plane of the image display panel 30. The light source data storage 25 also stores therein a lookup table LUTD. The LUTD indicates the information on the light intensity distribution of incident light obtained when only the light source 56D illustrated in FIG. 3 is turned on with the certain light source lighting amount, the incident light being incident on the light guide plate 54 from the light source 56D and traveling from the light guide plate 54 to the plane of the image display panel 30. The light source data storage 25 also stores therein a lookup table LUTE. The LUTE indicates the information on the light intensity distribution of incident light obtained when only the light source 56E illustrated in FIG. 3 is turned on with the certain light source lighting amount, the incident light being incident on the light guide plate 54 from the light source 56E and traveling from the light guide plate 54 to the plane of the image display panel 30. The light source data storage 25 also stores therein a lookup table LUTF. The LUTF indicates the information on the light intensity distribution of incident light obtained when only the light source 56F illustrated in FIG. 3 is turned on with the certain light source lighting amount, the incident light being incident on the light guide plate 54 from the light source 56F and traveling from the light guide plate 54 to the plane of the image display panel 30.

The lookup tables IOTA to LUTF according to the present embodiment correspond to the light sources 56A to 56F, respectively. The lookup tables according to the present embodiment, for example, may be data obtained by simultaneously turning on a pair of the light sources 56A and 56B, a pair of the light sources 56C and 56D, and a pair of the light sources 56E and 56F among the light sources 56A to 56F. This data structure can reduce labor in the operation for creating the lookup tables and the storage capacity of the light source data storage 25. As a result, an integrated circuit including the light source data storage 25 can be downsized.

The light source drive value calculator 24 refers to the lookup tables LUTA to LUTF in the light source data storage 25. The light source drive value calculator 24 superimposes the lookup tables LUTA to LUTF such that the light source lighting amounts are closer to $1/\alpha_b$ times the value of each block, thereby calculating the light source lighting amounts of the light sources 56A to 56F (Step S13). Representative luminance obtained by superimposing the (i, j)-th divided areas in lookup tables LUTA to LUTF (where 1≤i ≤N and 1≤j≤M), for example, is calculated by the following expression (10).

$$L_{(i,j)} = \sum_{k=0}^{n} \{(Ic/\alpha_{k(i,j)}) \times LUTm(P, Q)\} \qquad (10)$$

LUTm(P, Q): lookup table data of each light source

Ic/α$_k$: each light source current m: A to F

With this calculation, the light source drive value calculator 24 replaces complicated arithmetic processing with simple reference processing of the lookup tables LUTA to LUTF, thereby reducing the operation amount.

As described above, to cause the image display panel 30 to display an image, the image display panel driver 40 requires the luminance distribution in units of the pixels 48. Based on the light source lighting amounts of the light sources 56A to 56F calculated at Step S13 and the lookup tables LUTA to LUTF, the light source drive value determining processor 26 calculates the luminance distribution in units of the pixels 48 (Step S14). The luminance distribution in units of the pixels 48 is calculated by performing an interpolation operation on the information using the lookup tables LUTA to LUTF. While the luminance distribution including luminance information on a pixel 48 basis has a large quantity of information, the present embodiment can reduce the operation load because the lookup tables LUTA to LUTF are created with representative values obtained by the reduction in array element.

Figure 13:
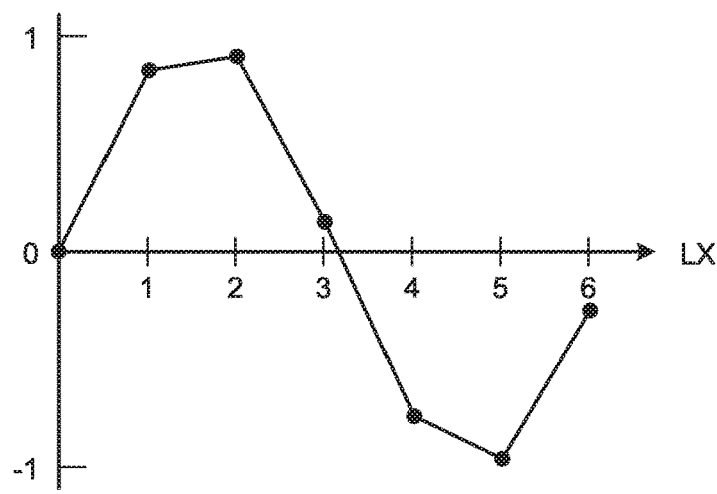
FIG. 13 is a diagram for explaining an arithmetic operation for linear interpolation.
Figure 14:
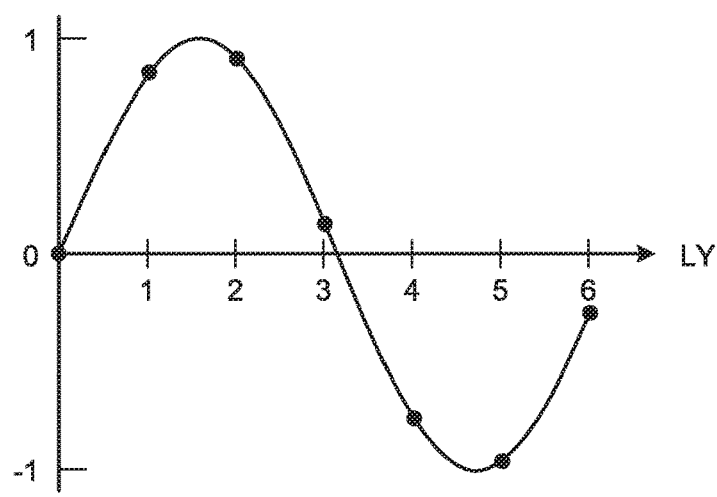
FIG. 14 is a diagram for explaining an arithmetic operation for polynomial interpolation.

The information on the luminance in units of the pixels 48 varies drastically in the light source array direction LY and moderately in the light incident direction LX. FIG. 13 is a diagram for explaining an arithmetic operation for linear interpolation. FIG. 14 is a diagram for explaining an arithmetic operation for polynomial interpolation. The information on the luminance of the pixels 48 in the light incident direction LX is obtained by performing the linear interpolation illustrated in FIG. 13. The information on the luminance of the pixels 48 in the light source array direction LY is obtained by performing the polynomial interpolation illustrated in FIG. 14. The polynomial interpolation is cubic interpolation, for example. The lookup tables LUTA to LUTF simply need to store therein values of light intensity at least at the peak positions of light output from the light sources and at positions between the adjacent light sources in the light source array direction LY.

Figure 15:
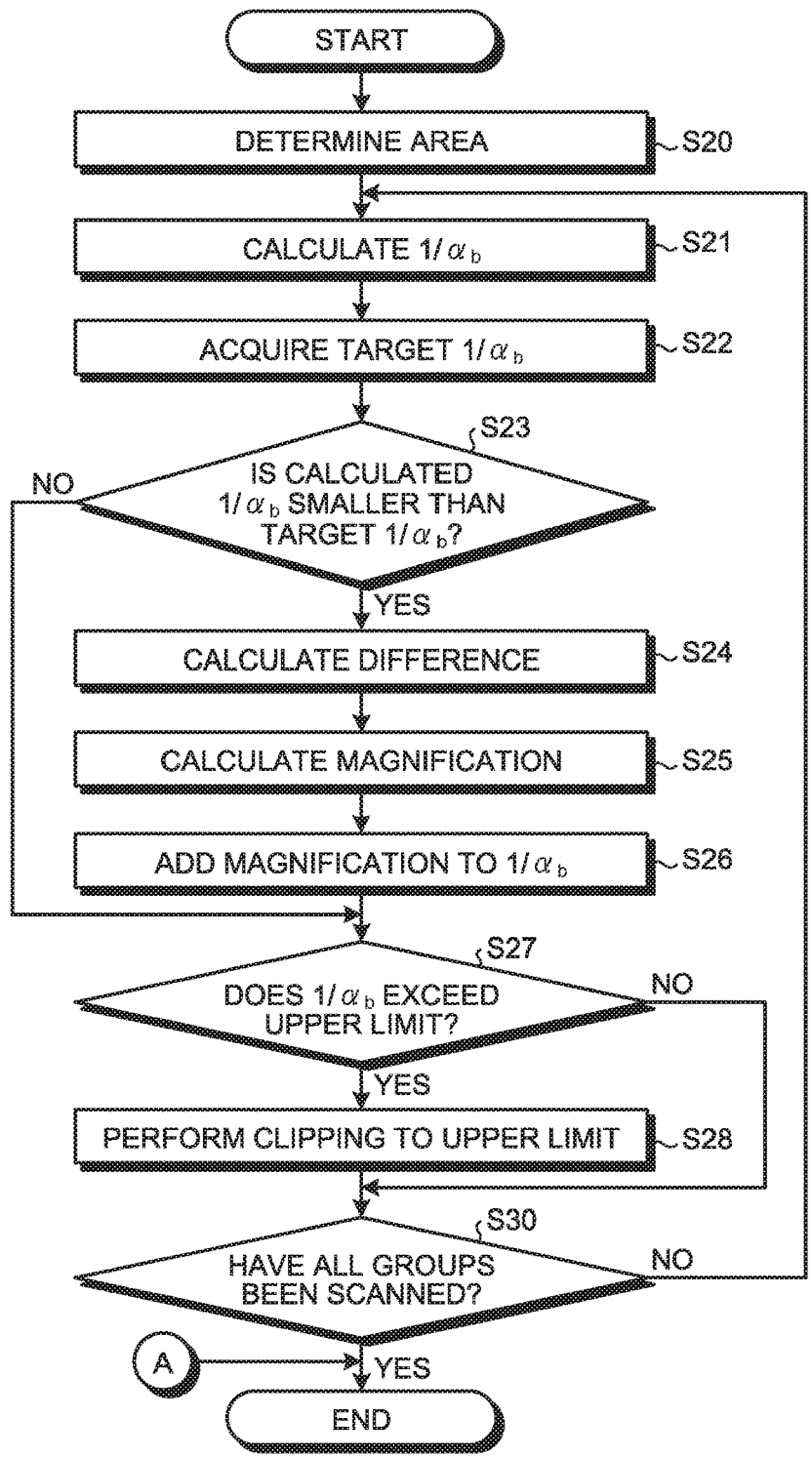
FIG. 15 is a detailed flowchart of an image analysis and a light source drive value calculation step according to the first embodiment.
Figure 16:
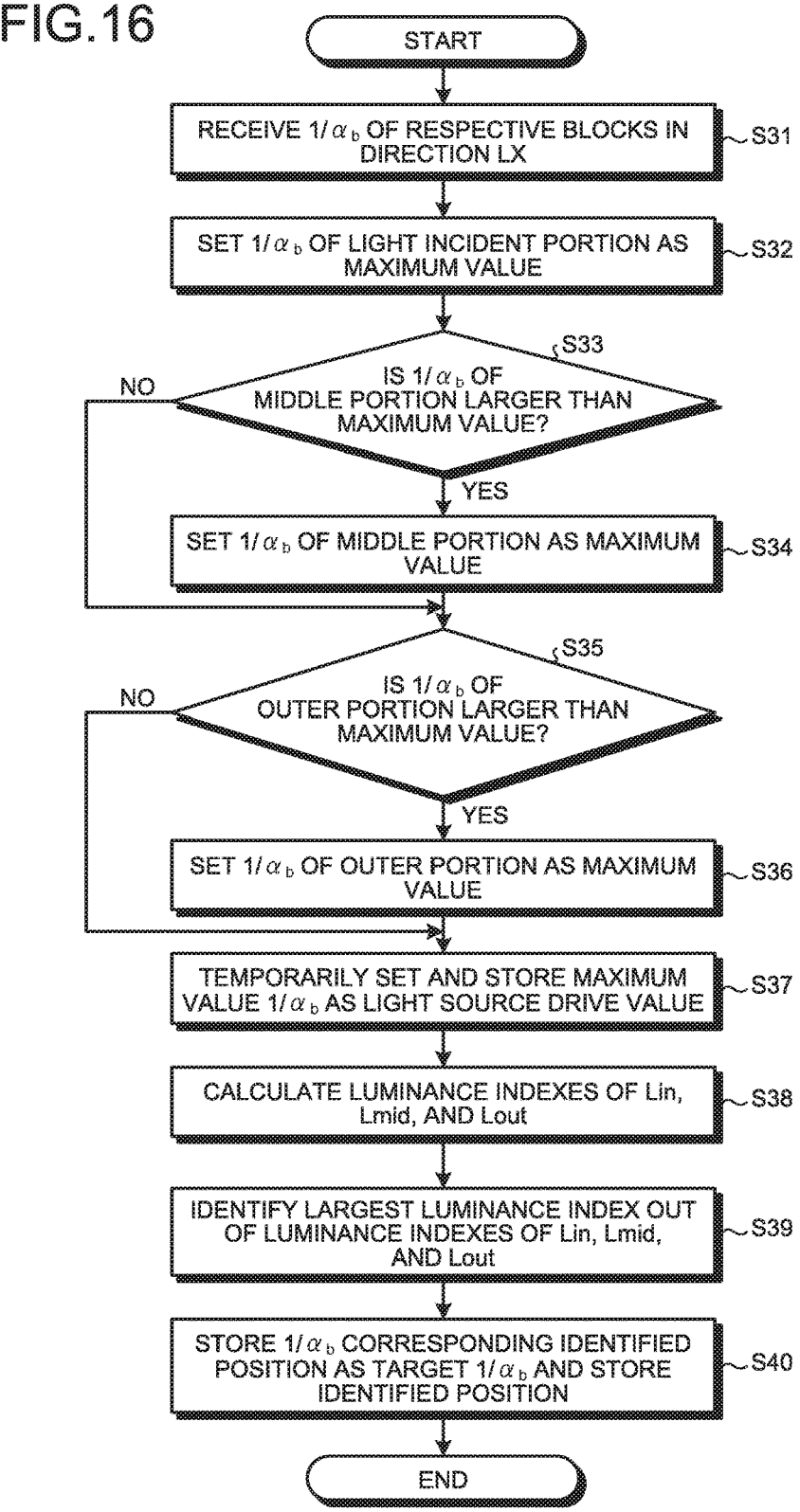
FIG. 16 is a flowchart for explaining a step for determining a drive value of each light source according to the first embodiment.
Figure 17:
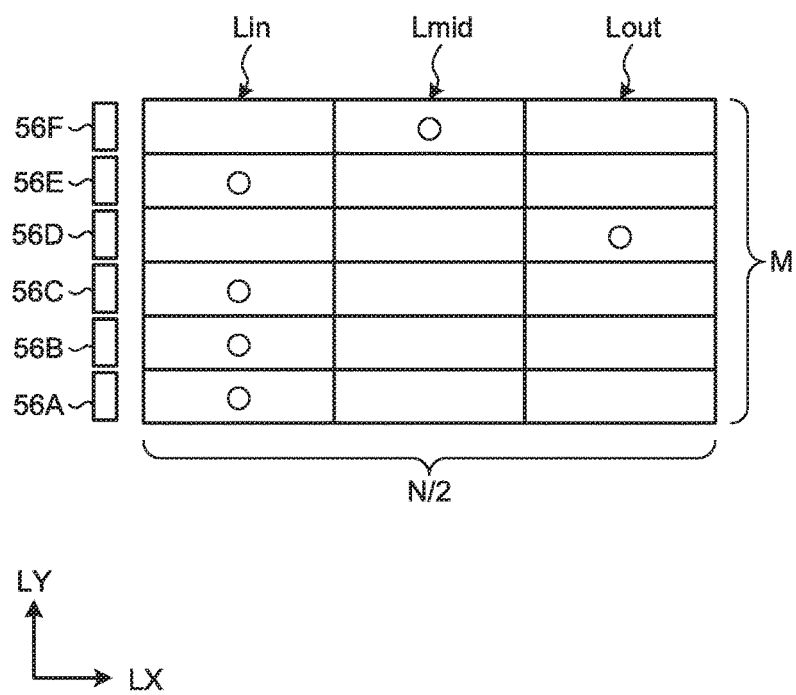
FIG. 17 is a diagram for explaining identified (flagged) luminance determination blocks according to the first embodiment.

FIG. 15 is a detailed flowchart of the image analysis and a light source drive value calculation step according to the first embodiment. FIG. 16 is a flowchart for explaining a step of determining a drive value of each light source according to the first embodiment. FIG. 17 is a diagram for explaining identified (flagged) luminance determination blocks according to the first embodiment. The following describes the image analysis and light source drive value calculation step with reference to FIGS. 15 to 17.

The image analyzer 23 calculates 1/α$_b$ of the luminance determination blocks based on the input signal values included in the luminance determination blocks as described above. After specifying one group as a group of interest, the light source drive value calculator 24 receives (acquires) the calculated 1/α$_b$ of the blocks in the group of interest (blocks aligned in the light incident direction LX) as illustrated in FIG. 16 (Step S31). The light source drive value calculator 24 sets 1/α$_b$ of the light incident portion Lin as the maximum value (Step S32). If 1/α$_b$ of the middle portion Lmid in the group of interest is larger than the maximum value (Yes at Step S33), the light source drive value calculator 24 sets 1/α$_b$ of the middle portion Lmid as the maximum value (Step S34). The middle portion Lmid in the group of interest is a portion present at the same position in the light source array direction LY as the light incident portion Lin having its value set as the maximum value at Step S32. If 1/α$_b$ of the middle portion Lmid in the group of interest is equal to or smaller than the maximum value (No at Step S33), the light source drive value calculator 24 performs the processing at Step S35 using 1/α$_b$ of the light incident portion Lin as the maximum value.

If 1/α$_b$ of the outer portion Lout in the group of interest is larger than the maximum value (Yes at Step S35), the light source drive value calculator 24 sets 1/α$_b$ of the outer portion Lout as the maximum value (Step S36). The outer portion Lout in the group of interest is a portion present at the same position in the light source array direction LY as the light incident portion Lin having its value set as the maximum value at Step S32. If 1/α$_b$ of the outer portion Lout in the group of interest is equal to or smaller than the maximum value (No at Step S35), the light source drive value calculator 24 performs the processing at Step S37 without replacing the maximum value.

The light source drive value calculator 24 temporarily sets the maximum value of 1/α$_b$ as the light source drive value and stores it therein (Step S37). While the explanation has been made of an example where the light source drive value calculator 24 compares 1/α$_b$ of the luminance determination blocks calculated based on the input signal values of the luminance determination blocks to identify the maximum value in the group of interest, the present disclosure is not limited thereto. The light source drive value calculator 24, for example, may multiply 1/α$_b$ of the luminance determination blocks calculated based on the input signal values of the luminance determination blocks by the values of light intensity at the positions corresponding to the luminance determination blocks stored in the lookup table. The light source drive value calculator 24 then compares the values obtained by the multiplication to identify the maximum value in each group.

Assuming that the light source drive value is 1/α$_{i\text{-}max}$, the light source drive value calculator 24 calculates luminance indexes of the light incident portion Lin, the middle portion Lmid, and the outer portion Lout in the group of interest by the following expressions (11) to (13), respectively (Step S38). In the following expressions, LUTm(P$_{Lin}$, Q$_{Lin}$) denotes data in the P$_{Lin}$-th row and the Q$_{Lin}$-th column in a lookup table m. The data in the P$_{Lin}$-th row and the Q$_{Lin}$-th column may be data of each pixel, data of each luminance determination block, or data of each divided area obtained by virtually dividing the image display panel 30 into certain areas. This format is also applicable to LUTm(P$_{Lmid}$, Q$_{Lmid}$) and LUTm(P$_{Lout}$, Q$_{Lout}$).

$$\text{luminance index of } Lin = \qquad (11)$$
$$(1/\alpha_{Lin}) / \sum \{(1/\alpha_{i\text{-}max}) \times LUTm(P_{Lin}, Q_{Lin})\}$$

(1/α$_{Lin}$): 1/α of the block of Lin (1/α$_{i\text{-}max}$): light source drive value LUTm(P$_{Lin}$, Q$_{Lin}$): lookup table data of each light source m: A to F -continued uminance index of $Lmid =$ (12)

$$(1/\alpha_{Lmid}) / \sum \{(1/\alpha_{i\text{-}max}) \times LUTm(P_{Lmid}, Q_{Lmid})\}$$

($1/\alpha_{Lmid}$): $1/\alpha$ of the block of $Lmid$ ($1/\alpha_{i\text{-}max}$): light source drive value $LUTm(P_{Lmid}, Q_{Lmid})$: lookup table data of each light source m: A to F uminance index of $Lout =$ (13)

$$(1/\alpha_{Lout}) / \sum \{(1/\alpha_{i\text{-}max}) \times LUTm(P_{Lout}, Q_{Lout})\}$$

($1/\alpha_{Lout}$): $1/\alpha$ of the block of $Lout$ ($1/\alpha_{i\text{-}max}$): light source drive value $LUTm(P_{Lout}, Q_{Lout})$: lookup table data of each light source m: A to F The light source drive value calculator 24 identifies the largest luminance index out of the luminance indexes of the light incident portion Lin, the middle portion Lmid, and the outer portion Lout calculated at Step S38 (Step S39).

The light source drive value calculator 24 stores therein $1/\alpha_b$ corresponding to the luminance index identified at Step S39 as a target $1/\alpha_b$ and stores therein the position of the identified block serving as a block corresponding to the identified luminance index and one of the light incident portion Lin, the middle portion Lmid, and the outer portion Lout in the group of interest (Step S40). As a result, the identified block is taken as the luminance determination block that is subjected to luminance correction, and $1/\alpha_b$ of the identified luminance determination block is taken as the target $1/\alpha_b$ for the group to which the luminance determination block belongs. The "block to be a target of luminance correction" may be hereinafter simply referred to as a "luminance correction target block".

Figure 24:
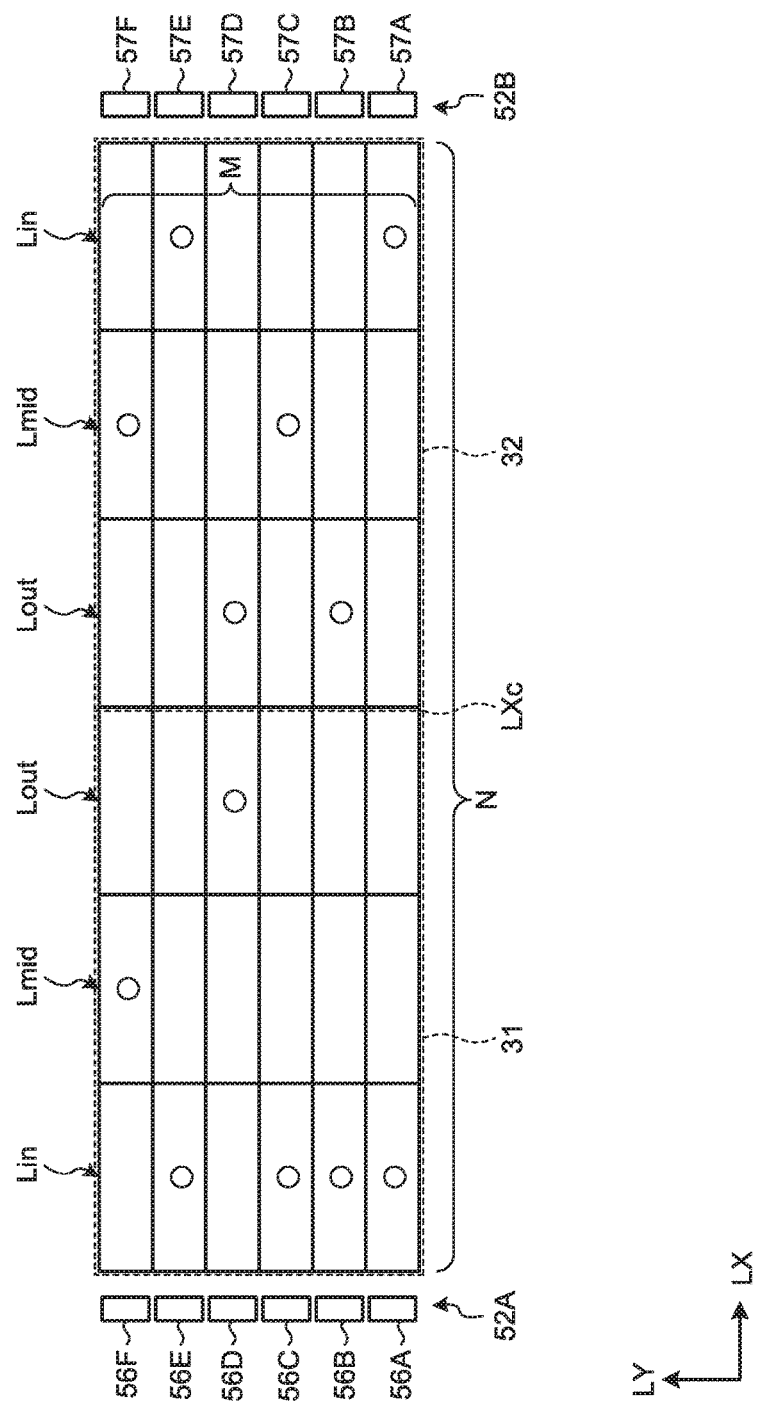
FIG. 24 is another diagram for explaining identified (flagged) luminance determination blocks according to the first embodiment.

The example illustrated in FIG. 24 indicates information that the luminance determination blocks identified with a flag of a circle have the maximum value.

After the determination of the target $1/\alpha_b$, the image analyzer 23 determines the area of the luminance determination block as illustrated in FIG. 15 (Step S20). The light source drive value calculator 24 specifies a group of interest and calculates $1/\alpha_b$ of the luminance correction target block in the specified group of interest (Step S21). The calculated $1/\alpha_b$ is a value corresponding to the luminance of the luminance correction target block assuming that the light sources are turned on with the light source drive values temporarily set as described above (or corrected by the processing described later), and is different from the light source drive value of each luminance correction target block (each light source). Specifically, $1/\alpha_b$ can be calculated using the value of light intensity in the lookup tables corresponding to the light sources 56A to 56F. The light source drive value calculator 24 calculates $1/\alpha_b$ of the luminance correction target block using the following expression. (14), for example.

$$1/\alpha_G = \sum_{k=0}^{n} \{(1/\alpha_k) \times LUTm(P, Q)\}$$ (14)

-continued $LUTm(P, Q)$: lookup table data of each light source $1/\alpha_k$: light source drive value of the luminance correction target block m: A to F In the expression (14), $1/\alpha_G$ denotes the result of calculation of $1/\alpha_b$ of the luminance correction target block performed at Step S21, $LUTm(P, Q)$ denotes data (value of light intensity) in the P-th row and the Q-th column in the lookup table m, and $1/\alpha_k$ denotes the light source drive value $1/\alpha_b$ of the luminance correction target block in each group. In this example, each group corresponds to any one of the light sources 56A to 56F, and the lookup tables LUTA to LUTF correspond to the light sources 56A to 56F, respectively. In the expression (14), the light source drive value of the luminance correction target block in each group is multiplied by data of the position (P, Q) of the luminance correction target block in the lookup table corresponding to the group (light source). Calculation of the sum of the values obtained by the multiplication derives $1/\alpha_b$ ($1/\alpha_G$ in the expression (14)) with the effect of light from all the light sources taken into consideration in the expression (14), the latest $1/\alpha_b$ of the luminance correction target block in each group is used as $1/\alpha_k$ in other words, after luminance correction (correction of $1/\alpha_b$) of a luminance correction target block in a group of interest is performed by the processing described later, $1/\alpha_b$ resulting from the luminance correction is used as $1/\alpha_k$ of the luminance correction target block in the group of interest to perform the calculation at Step S21 on another luminance correction target block in a group that is subjected to luminance correction after the correction of the group of interest.

Subsequently, the light source drive value calculator 24 acquires the target $1/\alpha_b$ of the group of interest as illustrated in FIG. 15 (Step S22). The light source drive value calculator 24 then performs luminance correction (correction of the light source drive value) described below.

Figure 18:
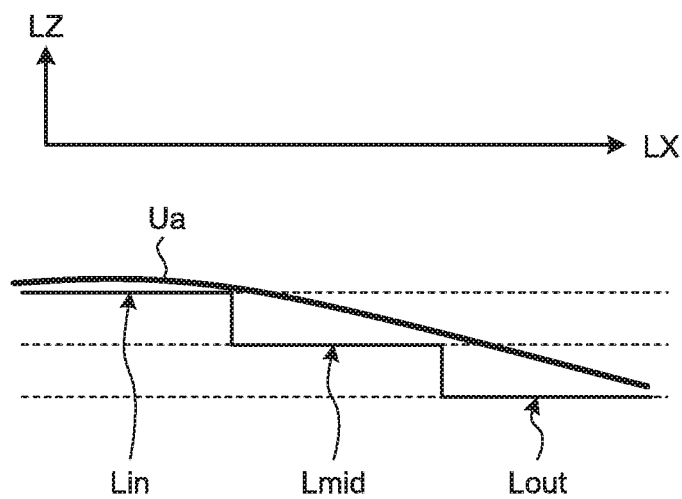
FIG. 18 is a diagram for explaining a case where the luminance is highest at a light incident portion in the luminance determination blocks according to the first embodiment.
Figure 19:
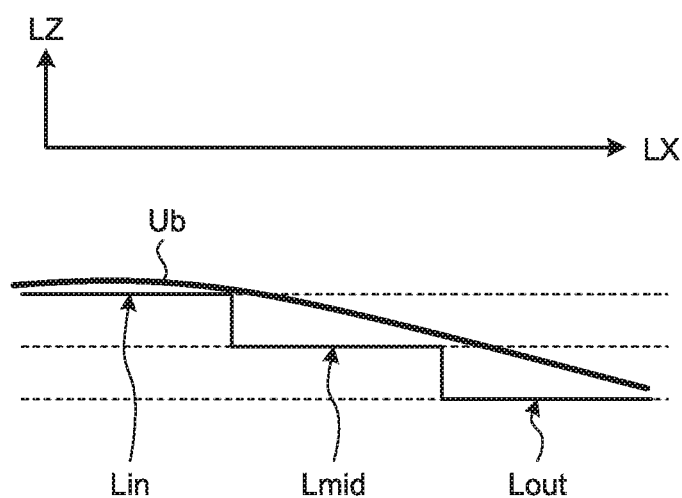
FIG. 19 is a diagram for explaining actual luminance of the luminance determination blocks illustrated in FIG. 18.
Figure 20:
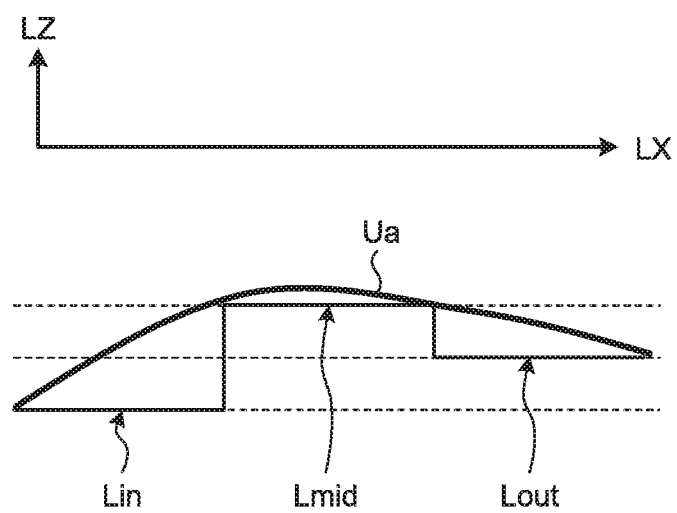
FIG. 20 is a diagram for explaining a case where the luminance is highest at a middle portion in the luminance determination blocks according to the first embodiment.
Figure 21:
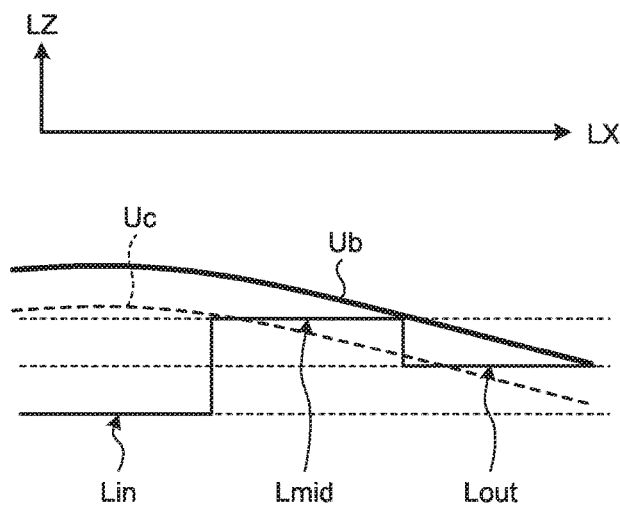
FIG. 21 is a diagram for explaining actual luminance of the luminance determination blocks illustrated in FIG. 20.
Figure 22:
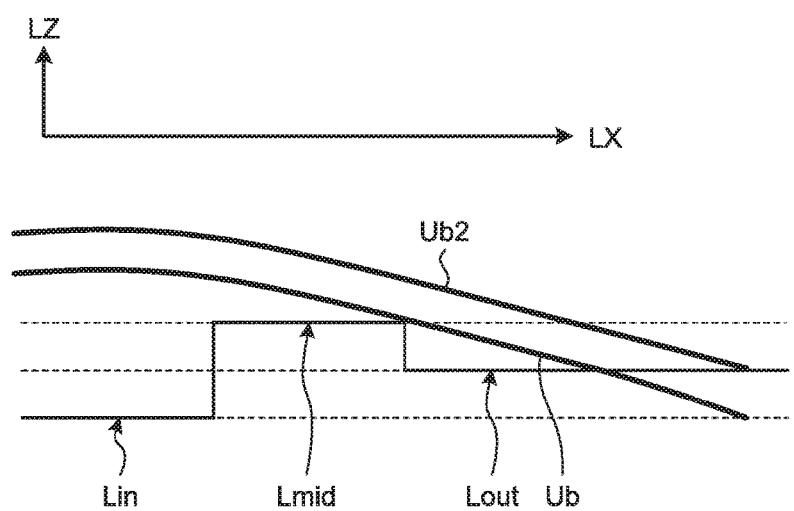
FIG. 22 is another diagram for explaining the actual luminance of the luminance determination blocks illustrated in FIG. 20.

FIGS. 18 to 22 schematically illustrate the light source lighting amounts in the illumination direction LZ of the light incident portion Lin, the middle portion Lmid, and the outer portion Lout present at the same position in the light source array direction LY. Let us assume a case where each of $1/\alpha_b$ and the luminance index of the light incident portion Lin for example among the light incident portion Lin, the middle portion Lmid, and the outer portion Lout present at the same position in the light source array direction LY is the maximum value, for example. In this case, a curve Ua indicating the light source lighting amount of an ideal light source illustrated in FIG. 18 is similar to a curve Ub indicating the light source lighting amount of an actual light source illustrated in FIG. 19. This is because light output from a light source has characteristics that the light amount decreases as it travels away from the first incident surface E1. Let us also assume a case where $1/\alpha_b$ in the middle portion Lmid among the light incident portion Lin, the middle portion Lmid, and the outer portion. Lout present at the same position in the light source array direction LY is the maximum value as illustrated in FIG. 20, for example. In this case, the luminance of the curve Ua indicating the light source lighting amount of the ideal light source illustrated in FIG. 20 is hard to ensure by a single light source. To address this, it is necessary to increase the luminance in the light incident portion Lin, which originally need not be increased, thereby making $1/\alpha_b$ in the light incident portion Lin the largest as represented by the curve Ub indicating the light source lighting amount of the actual light source illustrated in FIG.

Figure 23:
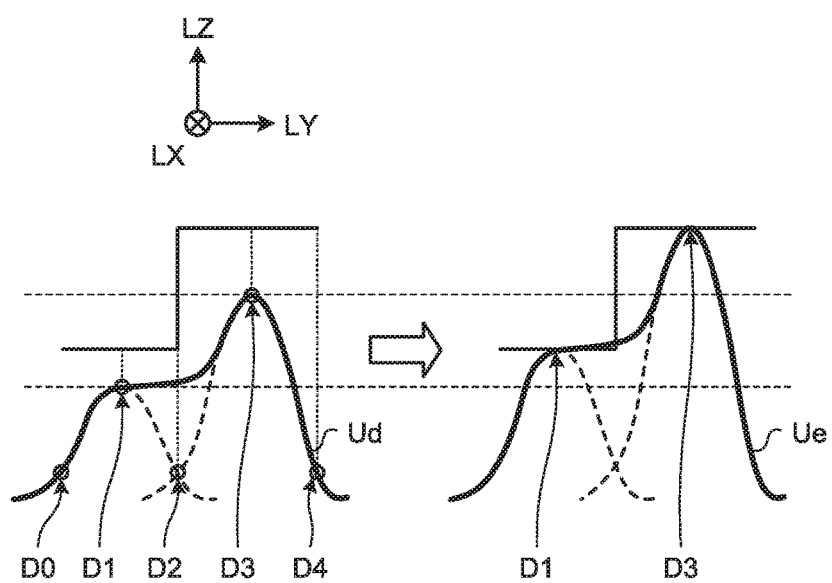
FIG. 23 is a conceptual diagram for explaining an increase in the light source lighting amount to compensate insufficient luminance according to the first embodiment.

21. In this case, the luminance index of the middle portion Lmid is the maximum value. If the luminance index is calculated using the value of light intensity at a position closest to the light source in the block of the middle portion Lmid, $1/\alpha_b$ in the middle portion Lmid and the outer portion Lout may possibly fall short as represented by a curve Uc indicating the light source lighting amount. Consequently, the luminance index needs to be calculated using the value of light intensity at a position farthest from the light source in each block. Even when $1/\alpha_b$ of the middle portion Lmid is the largest as illustrated in FIG. 24, and the light source lighting amount is set so as to supply necessary luminance to the middle portion Lmid, the light may possibly have the characteristics indicated by the curve Ub, thereby failing to supply necessary luminance to the outer portion Lout. In this case, it is necessary to set the light source lighting amount having characteristics indicated by a curve Ub2, and the luminance index is used to determine whether the light source lighting amount is set in this manner. In this case, the luminance index of the outer portion Lout is the maximum value. The first sidelight type light source 52A according to the present embodiment can perform individual drive control on the light sources 56A to 56F. With this control, a curve Ud indicating the light source lighting amount of the light source is corrected to a curve Ue as illustrated in FIG. 23. As illustrated in FIG. 23, the light source drive value calculator 24 holds at least data positions and luminance of peaks and troughs (D0 to D4) in the luminance in the light source array direction LY and holds at least one or more pieces of data of the light incident portion Lin, the middle portion Lmid, and the outer portion Lout in the light incident direction LX. If the curve Ud is corrected to the curve Ue as illustrated in FIG. 23, the luminance levels of the peaks D1 and D3 in the luminance are changed out of the peaks and the troughs (D0 to D4) in the luminance.

If $1/\alpha_b$ of the luminance correction target block in the group of interest calculated at Step S21 is smaller than the target $1/\alpha_b$ of the group of interest (Yes at Step S23), the light source drive value calculator 24 calculates the difference between the calculated $1/\alpha_b$ and the target $1/\alpha_b$ (Step S24). The light source drive value calculator 24 then calculates the magnification of the difference (Step S25). The light source drive value calculator 24 calculates how many times larger the difference is than the value in the lookup table at the position. Specifcally, the light source drive value calculator 24 reads data corresponding to the position of the block to be a target of luminance correction from the lookup table of the light source corresponding to the position of the block to be a target of luminance correction in the light source array direction LY. The read data is referred to as Percentage for convenience. The magnification is calculated by dividing the difference Sub between the calculated $1/\alpha_b$ and the target $1/\alpha_b$ by Percentage. The lookup tables LUTA to LUTE according to the present embodiment store therein the light intensity distribution obtained when the light sources are turned on at the maximum output (output of 100%). By dividing the difference by the value of light intensity in the lookup table, the light source drive value calculator 24 can derive the ratio (magnification) of the difference to the value of light intensity of 100%.

The light source drive value calculator 24 adds the calculated magnification of the difference to $1/\alpha_b$ calculated based on the input signal and temporarily set at Step S37 (Step S26) In other words, if $1/\alpha_b$ calculated at Step S21 is smaller than the target $1/\alpha_b$ of the block, the light source drive value calculator 24 adds the calculated magnification of the difference to the temporarily set. $1/\alpha_b$ (Step S26), thereby compensating the luminance of the block having insufficient luminance. The light source drive value calculator 24 then performs the processing at Step S27.

By contrast, if $1/\alpha_b$ calculated at Step S21 is equal to or larger than the target $1/\alpha_b$ of the group of interest (No at Step S23), the light source drive value calculator 24 skips the processing from Step S24 to Step S26 and performs the processing at Step S27. If $1/\alpha_b$ of the luminance correction target block exceeds an upper limit (Yes at Step S27), the light source drive value calculator 24 performs clipping for replacing $1/\alpha_b$ with the upper limit (Step S28). If positive determination is made at Step S23, $1/\alpha_b$ of the luminance correction target block compared with the upper limit at Step S27 is the light source drive value $1/\alpha_b$ resulting from the correction at Step S26. By contrast, if negative determination is made at Step S23, $1/\alpha_b$ is the temporarily set light source drive value $1/\alpha_b$. The upper limit is set in advance as an upper limit of the light source drive value used in light source control. After the processing at Step S28, the light source drive value calculator 24 performs the processing at Step S30. By contrast, if $1/\alpha_b$ of the luminance correction target block does not exceed the upper limit (No at Step S27), the light source drive value calculator 24 skips the processing at Step S28 and performs the processing at Step S30. If scanning of all the groups is completed (Yes at Step S30), the light source drive value calculator 24 finishes the process illustrated in FIG. 15. By contrast, if scanning of all the groups is not completed (No at Step S30), the light source drive value calculator 24 specifies the next group as a group of interest and performs the processing at Step S21 again. With the processing described above, the light source drive value $1/\alpha_b$ of each block temporarily set at Step S37 is corrected. If negative determination is made at Step S23 and Step S27, the temporarily set light source drive value may possibly not be corrected. In this case, the temporarily set light source drive value is used for control of the light source lighting amount of the light source without any change. The light source lighting amount is calculated from $1/\alpha_b$ of each block derived in this manner. Subsequently, $1/\alpha_b$ of each luminance correction target block calculated as described above is used as the light source drive value $1/\alpha_k$ of each light source. The light source drive values $1/\alpha_k$ of the light sources 56A to 56F are thus calculated. Based on the light source drive value $1/\alpha_k$ and the lookup table, the representative luminance is calculated by the expression (10).

The representative luminance of the light sources 57A to 57F of the second sidelight type light source 52B can be calculated in the same manner. As described above, the temporarily set $1/\alpha_b$ is corrected such that $1/\alpha_b$ of each luminance correction target block is equal to the target $1/\alpha_b$. The light source lighting amount of each light source is controlled based on the corrected. $1/\alpha_b$. In other words, the light source lighting amount of each light source is controlled such that the luminance of each luminance correction target block satisfies the target luminance.

The method for calculating the light source drive value described above is also applicable to a display apparatus including a sidelight type light source only at a position facing an incident surface (e.g., E1) on the first side surface of the light guide plate 54 as illustrated in FIG. 17. The calculation method is also applicable to a display apparatus including sidelight type light sources (the first sidelight type light source 52A and the second sidelight type light source 52B) at positions facing incident surfaces (e.g., E1 and E2) on both side surfaces of the light guide plate 54 as illustrated in FIG. 3. In this case, the calculation method is applicable to a case where an image is displayed by turning on only one of the first sidelight type light source 52A and the second sidelight type light source 52B. The calculation method is also applicable to a case where an image is displayed by turning on both of the first sidelight type light source 52A and the second sidelight type light source 52B. In this case, however, the first display surface 31 is affected not only by light output from the first sidelight type light source 52A but also by light output from the second sidelight type light source 52B. The second display surface 32 is affected not only by light output from the second sidelight type light source 52B but also by light output from the first sidelight type light source 52A. The light source drive value calculator 24 preferably calculates the light source drive values $1/\alpha_b$ of the two sidelight type light sources not separately but collectively while taking into consideration the interaction between the two sidelight type light sources.

The embodiment below describes an example of calculating the light source lighting amount $1/\alpha_k$ of each light source with higher accuracy while taking into consideration light to which the light sources of the first sidelight type light source 52A and the light sources of the second sidelight type light source 52B are interactively contribute.

FIG. 24 is another diagram for explaining identified (flagged) luminance determination blocks according to the present embodiment. The following describes arrangement of blocks in a case where the light sources of the first sidelight type light source 52A and the light sources of the second sidelight type light source 52B are used. The second display surface 32 of the image display panel 30 also has the light incident portion Lin, the middle portion Lmid, and the outer portion Lout obtained by virtually dividing the second display surface 32 into a matrix in the light source array direction. LY and the light incident direction LX. On the second display surface 32 of the image display panel 30, the outer portion Lout, the middle portion Lmid, and the light incident portion tin are closer to the center line LXc indicating the center of the Whole display surface in the light incident direction LX in this order. With this arrangement, the groups of three blocks (the light incident portions Lin, the middle portions Lmid, and the outer portions Lout) present at the same position in the light source array direction LY are line-symmetric with respect to the center line LXc indicating the center of the whole display surface in the light incident direction LX. On the second display surface 32 illustrated in FIG. 24, the number of rows of the luminance determination blocks in the light source array direction LY composed of the light incident portion Lin, the middle portion Lmid, and the outer portion Lout corresponds to the number of the light sources 57A to 57F.

On the second display surface 32, the three blocks present at the same position in the light source array direction LY (the light incident portion Lin, the middle portion Lmid, and the outer portion Lout) are considered as one group. In this arrangement, a plurality of groups are aligned in the light source array direction LY. The groups on the second display surface 32 are included in all the groups at Step S30. In the processing illustrated in FIG. 16, the light source drive value is temporarily set and the target $1/\alpha_b$ is calculated for each of the groups on the first display surface 31 and the groups on the second display surface 32. In the processing illustrated in FIG. 15, if scanning of the groups on the first display surface 31 is completed, but scanning of the groups on the second display surface 32 is not completed (No at Step S30), the light source drive value calculator 24 specifies the next group as a group of interest and performs the processing at Step S21 again.

Figure 25:
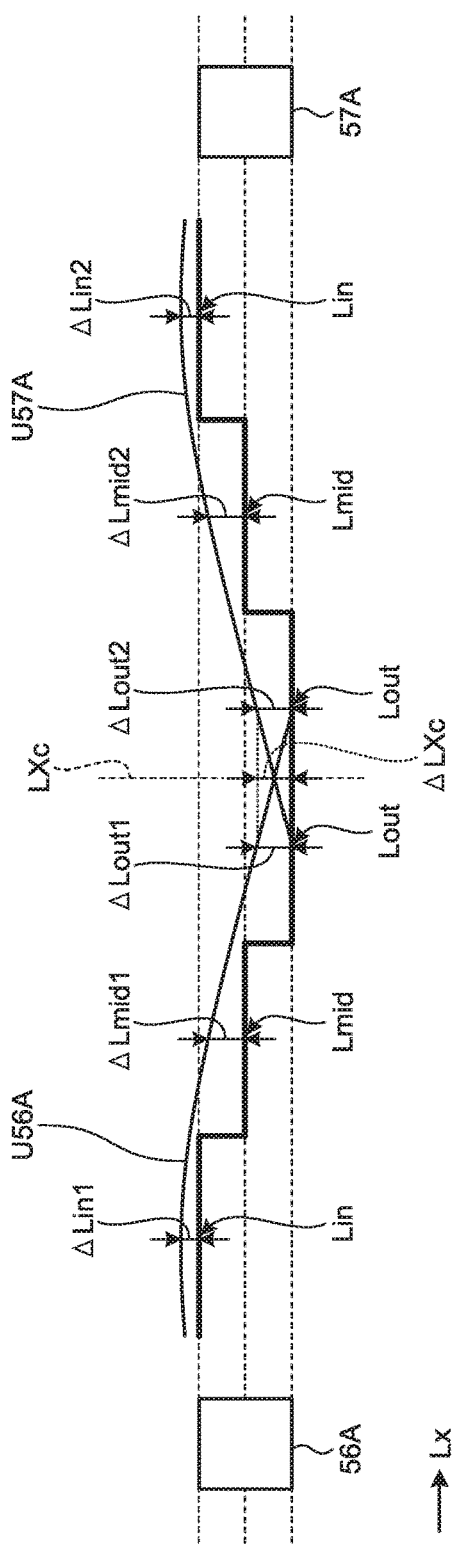
FIG. 25 is a diagram for explaining actual luminance of the luminance determination blocks.

As a result, as illustrated in FIG. 24, the luminance determination blocks identified with a flag of a circle are independently set on the first display surface 31 and the second display surface 32. In two groups corresponding to the light sources 56A and 57A illustrated in FIG. 24, for example, the luminance is higher in the light incident portions Lin as illustrated in FIG. 19. FIG. 25 is a diagram for explaining actual luminance of the luminance determination blocks. In a curve U56A indicating the light source lighting amount of the light source 56A on the first display surface 31, light source lighting amount differences ΔLin1, ΔLmid1, and ΔLout1 of the light incident portion Lin, the middle portion Lmid, and the outer portion Lout, respectively, are ideally reduced to the minimum. Similarly, in a curve U57A indicating the light source lighting amount of the light source 57A on the second display surface 32, light source lighting amount differences ΔLin2, ΔLmid2, and ΔLout2 of the light incident portion Lin, the middle portion Lmid, and the outer portion Lout, respectively, are ideally reduced to the minimum. Even if the light source 56A is turned on such that the luminance falls on an ideal curve U56A, light output from the light source 57A opposite thereto may possibly affect the first display surface 31. Similarly, even if the light source 57A is turned on such that the luminance falls on an ideal curve U57A, light output from the light source 56A opposite thereto may possibly affect the second display surface 32. To reduce an unintended light source lighting amount difference ΔLXc illustrated in FIG. 25, for example, it is necessary to set the light source drive value $1/\alpha_k$ of the light source 56A while taking into consideration the effects not only of the light sources 56B to 56F but also of the light sources 57A to 57F.

The present embodiment performs the following processing. First, the image analyzer 23 calculates $1/\alpha_b$ of the luminance determination blocks based on the input signal values included in the luminance determination blocks as described above. After specifying one group as a group of interest, the light source drive value calculator 24 receives (acquires) the calculated $1/\alpha_b$ of the blocks in the group of interest (blocks aligned in the light incident direction LX) as illustrated in FIG. 16 (Step S31). The light source drive value calculator 24 sets $1/\alpha_b$ of the light incident portion Lin as the maximum value (Step S32). If $1/\alpha_b$ of the middle portion Lmid in the group of interest is larger than the maximum value (Yes at Step S33), the light source drive value calculator 24 sets $1/\alpha_b$ of the middle portion Lmid as the maximum value (Step S34). The middle portion Lmid in the group of interest is a portion present at the same position in the light source array direction LY as the light incident portion Lin having its value set as the maximum value at Step S32. If $1/\alpha_b$ of the middle portion Lmid in the group of interest is equal to or smaller than the maximum value (No at Step S33), the light source drive value calculator 24 performs the processing at Step S35 using $1/\alpha_b$ of the light incident portion Lin as the maximum value.

If $1/\alpha_b$ of the outer portion Lout in the group of interest is larger than the maximum value (Yes at Step S35), the light source drive value calculator 24 sets $1/\alpha_b$ of the outer portion Lout as the maximum value (Step S36). The outer portion Lout in the group of interest is a portion present at the same position in the light source array direction LY as the light incident, portion Lin having its value set as the maximum value at Step S32. If $1/\alpha_b$ of the outer portion Lout in the group of interest is equal to or smaller than the maximum value (No at Step S35), the light source drive value calculator 24 performs the processing at Step S37 without replacing the maximum value.

The light source drive value calculator 24 temporarily sets the maximum value of $1/\alpha_b$ as the light source drive value and stores it therein (Step S37). Also in this example where the first sidelight type light source 52A and the second sidelight type light source 52B are used, the light source drive value calculator 24 compares $1/\alpha_b$ of the luminance determination blocks calculated based on the input signal values of the luminance determination blocks to identify the maximum value in each group of interest. The present disclosure, however, is not limited thereto. The light source drive value calculator 24, for example, may multiply $1/\alpha_b$ of the luminance determination blocks calculated based on the input signal values of the luminance determination blocks by the values of light intensity at the positions corresponding to the luminance determination blocks stored in the lookup table. The light source drive value calculator 24 then compares the values obtained by the multiplication to identify the maximum value in each group.

Assuming that the light source drive value of each light source in the first sidelight type light source 52A is $1/\alpha_{i1\text{-}max}$ and that the light source drive value of each light source in the second sidelight type light source 52B is $1/\alpha_{i2\text{-}max}$, the light source drive value calculator 24 calculates luminance indexes of the light incident portion Lin, the middle portion Lmid, and the outer portion Lout in the group of interest by the expressions (11) to (13), respectively (Step S38). This example assumes that the light source data storage 25 stores therein in advance the lookup tables LUTA to LUTF corresponding to the light sources 56A to 56F, respectively, of the first sidelight type light source 52A and lookup tables LUTG to LUTL corresponding to the light sources 57A to 57F, respectively, of the second sidelight type light source 52B. In this example, m of LUTm indicating a lookup table therefore takes a value from A and L, not from A to F. With this operation, the light source drive value calculator 24 can calculate the luminance indexes that reflect the degree of contribution of light from the light sources of the first sidelight type light source 52A and the second sidelight type light source 52B. In the following expressions, LUTm($P_{Lin}$, $Q_{Lin}$) denotes data in the $P_{Lin}$-th row and the $Q_{Lin}$-th column in a lookup table m. The data in the $P_{Lin}$-th row and the $Q_{Lin}$-th column may be data of each pixel, data of each luminance determination block, or data of each divided area obtained by virtually dividing the image display panel 30 into certain areas. This format is also applicable to LUTm ($P_{Lmid}$, $Q_{Lmid}$) and LUTm($P_{Lout}$, $Q_{Lout}$). In this example, ($P_{Lin}$, $Q_{Lin}$) denotes a coordinate value represented by an absolute coordinate system common to the lookup tables.

The present disclosure does not necessarily have the lookup tables for all the light sources as described above. The present disclosure, for example, may have only lookup tables corresponding to the light sources of either one of the first sidelight type light source 52A and the second sidelight type light source 52B. Information on the light intensity distribution in the lookup table obtained for incident lights incident on the plane of the image display panel 30 and emitted therefrom through the light guide plate 54 while only one of the light sources on the second incident surface E2 side is on is the same as information on the light intensity distribution in the lookup table of the light source on the first incident surface E1 side arranged line-symmetrically with the turned-on light source with respect to the center line LXc indicating the center of the whole display surface in the light incident direction LX. As described above, the lookup tables LUTA to LUTF according to the present embodiment correspond to the light sources 56A to 56F, respectively. If the light source data storage 25 stores therein the lookup tables LUTA to LUTF, the light source drive value calculator 24 can calculate the light source lighting amount of each light source not only of the first sidelight type light source 52A but also of the second sidelight type light source 52B using the lookup tables LUTA to LUTE in the light source data storage 25. More specifically, the light source drive value calculator 24 can calculate the light source lighting amount of the light sources 57A to 57F, inverting the lookup tables LUTA to LUTE in a manner line-symmetric with respect to the center line LXc and superimposing them. In this case, the light source drive value calculator 24 can calculate the luminance indexes using the following expressions (15-1), (16-1), and (17-1) instead of the expressions (11), (12), and (13), respectively.

$$\text{luminance index of } Lin = \quad (15\text{-}1)$$
$$(1/\alpha_{Lin}) / \left[\sum \{(1/\alpha_{i1\text{-}max}) \times LUTm(P_{Lin}, Q_{Lin})\} + \sum \{(1/\alpha_{i2\text{-}max}) \times LUTm(P_{Lin}, MAXQ - Q_{Lin})\}\right]$$

$(1/\alpha_{Lin})$: $1/\alpha$ of the block of $Lin$ $(1/\alpha_{i1\text{-}max})$: light source drive value of the first sidelight type light source $(1/\alpha_{i2\text{-}max})$: light source drive value of the second sidelight type light source $LUTm(P_{Lin}, Q_{Lin})$, $LUTm(P_{Lin}, MAXQ - Q_{Lin})$: lookup table data of each light source m: A to F $$\text{luminance index of } Lmid = \quad (16\text{-}1)$$
$$(1/\alpha_{Lmid}) / \left[\sum \{(1/\alpha_{i1\text{-}max}) \times LUTm(P_{Lmid}, Q_{Lmid})\} + \sum \{(1/\alpha_{i2\text{-}max}) \times LUTm(P_{Lmid}, MAXQ - Q_{Lmid})\}\right]$$

$(1/\alpha_{Lmid})$: $1/\alpha$ of the block of $Lmid$ $(1/\alpha_{i1\text{-}max})$: light source drive value of the first sidelight type light source $(1/\alpha_{i2\text{-}max})$: light source drive value of the second sidelight type light source $LUTm(P_{Lmid}, Q_{Lmid})$, $LUTm(P_{Lmid}, MAXQ - Q_{Lmid})$: lookup table data of each light source m: A to F $$\text{luminance index of } Lout = \quad (17\text{-}1)$$
$$(1/\alpha_{Lout}) / \left[\sum \{(1/\alpha_{i1\text{-}max}) \times LUTm(P_{Lout}, Q_{Lout})\} + \sum \{(1/\alpha_{i2\text{-}max}) \times LUTm(P_{Lout}, MAXQ - Q_{Lout})\}\right]$$

Figure 27:
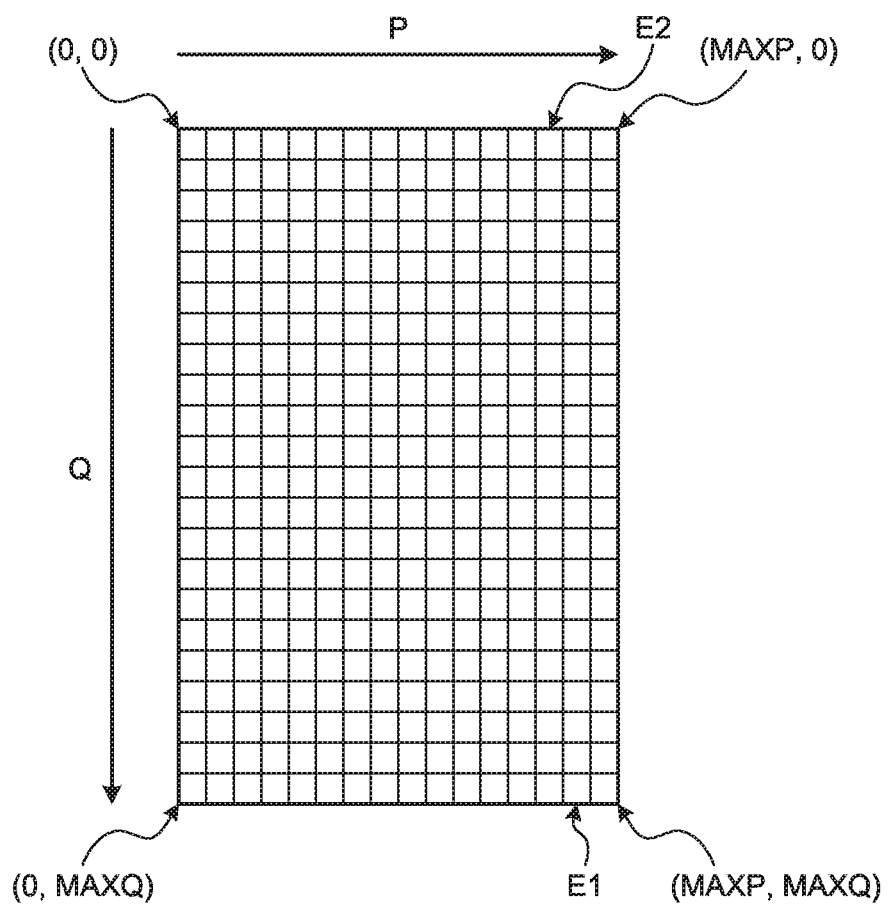
FIG. 27 is a diagram of an example of absolute coordinate values in the lookup table according to the first embodiment.

$(1/\alpha_{Lout})$: $1/\alpha$ of the block of $Lout$ $(1/\alpha_{i1\text{-}max})$: light source drive value of the first sidelight type light source $(1/\alpha_{i2\text{-}max})$: light source drive value of the second sidelight type light source $LUTm(P_{Lout}, Q_{Lout})$, $LUTm(P_{Lout}, MAXQ - Q_{Lout})$: lookup table data of each light source m: A to F In the expressions (15-1) to (17-1), coordinate transformation is performed to use the lookup tables indicating the light intensity distribution obtained when the light sources of the first sidelight type light source 52A are turned on as the lookup tables indicating the light intensity distribution obtained when the light sources of the second sidelight type light source 52B are turned on. The following describes the coordinate transformation with reference to FIG. 27. In the expressions (15-1) to (17-1), the coordinate value is distinguished depending on the position in the light incident direction LX like ($P_{Lin}$, $Q_{Lin}$), ($P_{Lmid}$, $Q_{Lmid}$), and ($P_{Lout}$, $Q_{Lout}$). Because the concept of coordinate transformation is the same independently of positions in the light incident direction, the coordinate value is simply represented by (P, Q) in the following description.

In LUTm(P, Q) indicating data in the P-th row and the Q-th row in the lookup table m, P denotes a position in the light source array direction LY, whereas Q denotes a position in the light incident direction LX. P takes a value from 0 to MAXP, whereas Q takes a value from 0 to MAXQ. Assuming that (P, Q)=(0, 0) is the coordinate value of an array element at a first corner on the second sidelight type light source 52B side out of the array elements in the lookup table m, the coordinate value of an array element at a second corner is represented by (MAXP, 0). The coordinate value of an array element at a first corner on the first sidelight type light source 52A side is represented by (0, MAXQ), whereas the coordinate value of an array element at a second corner is represented by (MAXP, MAXQ). In a case where the lookup tables LUTA to LUTF are inverted with respect to the center line LXc, and an absolute coordinate value on the lookup tables LUTA to LUTF is represented by (P, Q), the light source drive value calculator 24 reads and uses data at a coordinate (P, MAXQ-Q) from the lookup tables LUTA to LUTF (coordinate transformation). In the expressions (15-1) to (17-1), the read and used data is represented by LUTm(P, MAXQ-Q). By reading data at a position line-symmetric with a processing target block with respect to the center line LXc from the lookup tables LUTA to LUTF, the light source drive value calculator 24 can invert the lookup tables LUTA to LUTF with respect to the center line LXc.

The light source drive value calculator 24 identifies the largest luminance index out of the luminance indexes of the light incident portion Lin, the middle portion Lmid, and the outer portion Lout calculated at Step S38 (Step S39).

The light source drive value calculator 24 stores therein $1/\alpha_b$ corresponding to the luminance index identified at Step S39 as a target $1/\alpha_b$ and stores therein the position of the identified block serving as a block corresponding to the identified luminance index and one of the light incident portion Lin, the middle portion Lmid, and the outer portion Lout in the group of interest (Step S40). As a result, the identified block is taken as the luminance determination block that is subjected to luminance correction, and $1/\alpha_b$ of the identified luminance determination block is taken as the target $1/\alpha_b$ for the group to which the luminance determination block belongs.

The example illustrated in FIG. 24 indicates information that the luminance determination blocks identified with a flag of a circle have the maximum value.

After the determination of the target $1/\alpha_b$, the image analyzer 23 determines the area of the luminance determination block as illustrated in FIG. 15 (Step S20). The light source drive value calculator 24 specifies a group of interest and calculates $1/\alpha_b$ of the luminance correction target block in the specified group of interest (Step S21). The calculated $1/\alpha_b$ is a value corresponding to the luminance of the luminance correction target block assuming that the light sources are turned on with the respective light source drive values temporarily set as described above (or corrected by the processing described later), and is different from the light source drive value of each luminance correction target block (each light source). Specifically, $1/\alpha_b$ can be calculated using the values of light intensity in the LUT corresponding to the light sources of the first sidelight type light source 52A and the second sidelight type light source 52B. If the light source data storage 25 stores therein in advance the lookup tables LUTA to LUTF corresponding to the light sources 56A to 56F, respectively, of the first sidelight type light source 52A and the lookup tables LUTG to LUTL corresponding to the light sources 57A to 57F, respectively, of the second sidelight type light source 52B, the light source drive value calculator 24 calculates $1/\alpha_b$ of the luminance correction target block using the expression (14). In this case, m of LUTm indicating a lookup table takes not from A to F but from A to L. With this operation, the light source drive value calculator 24 can calculate $1/\alpha_b$ ( $1/\alpha_G$ in the expression (14)) with the effect of light from all the light sources taken into consideration. In a similar manner to the above operation, in the expression (14), the latest $1/\alpha_b$ of the luminance correction target block in each group is used as $1/\alpha_k$. In other words, after luminance correction (adjustment of $1/\alpha_b$) of a luminance correction target block in a group of interest is performed by the processing described later, $1/\alpha_b$ resulting from the luminance correction is used as $1/\alpha_k$ of the luminance correction target block in the group of interest to perform the calculation at Step S21 on another luminance correction target block in a group that is subjected to luminance correction after the correction of the group of interest.

As described above, the present embodiment may have only the lookup tables indicating the light intensity distribution obtained when the light sources of the first sidelight type light source 52A are turned on and does not necessarily have the lookup tables indicating the light intensity distribution obtained when the light sources of the second sidelight type light source 52B are turned on. In this case, to use the lookup tables indicating the light intensity distribution obtained when the light sources of the first sidelight type light source 52A are turned on as the lookup tables indicating the light intensity distribution obtained when the light sources of the second sidelight type light source 52B are turned on, the light source drive value calculator 24 calculates $1/\alpha_b$ of the luminance correction target block using the following expression (18-1) instead of the expression (14) at Step S21.

$$1/\alpha_G = \sum \{(1/\alpha_{k1}) \times LUTm(P, Q)\} + \sum \{(1/\alpha_{k2}) \times LUTm(P, MAXQ-Q)\} \quad (18\text{-}1)$$

($1/\alpha_{k1}$): light source drive value of the luminance correction target block on the first sidelight type light source side ($1/\alpha_{k2}$): light source drive value of the luminance correction target block on the second sidelight type light source side LUTm(P, Q): lookup table data of each light source m: A to F In the expression (18-1), coordinate transformation is performed similarly to the expressions (15-1) to (17-1). Specifically, in a case where the lookup tables indicating the light intensity distribution obtained when the light sources of the first sidelight type light source 52A are turned on are also used as the lookup tables indicating the light intensity distribution obtained when the light sources of the second sidelight type light source 52B are turned on, and where an absolute coordinate value of the processing target block on the lookup tables is represented by (P, Q), the light source drive value calculator 24 reads and uses data at the coordinate (P, MAXQ-Q) from the lookup tables corresponding to the position of the processing target block in the light source array direction LY (coordinate transformation). In the expression (18-1), the read and used data is represented by LUTm(P, MAXQ-Q). By reading data at a position line-symmetric with the processing target block with respect to the center line LXc from the lookup tables LUTA to LUTF, the light source drive value calculator 24 can invert the lookup tables LUTA to LUTF with respect to the center line LXc.

Subsequently, the light source drive value calculator 24 acquires the target $1/\alpha_b$ of the group of interest as illustrated in FIG. 15 (Step S22). The light source drive value calculator 24 then performs luminance correction (correction of the light source drive value) described below.

If $1/\alpha_b$ of the luminance correction target block in the group of interest calculated at Step S21 is smaller than the target $1/\alpha_b$ of the group of interest (Yes at Step S23), the light source drive value calculator 24 calculates the difference between the calculated $1/\alpha_b$ and the target $1/\alpha_b$ (Step S24). The light source drive value calculator 24 then calculates the magnification of the difference (Step S25). The light source drive value calculator 24 calculates how many times larger the difference is than the value in the lookup table at the position. Specifically, the light source drive value calculator 24 reads data corresponding to the position of the luminance correction target block from the lookup table of the light source corresponding to the position of the luminance correction target block in the light source array direction LY. The read data is referred to as Percentage for convenience. The magnification is calculated by dividing the difference Sub between the calculated $1/\alpha_b$ and the target $1/\alpha_b$ by Percentage. The lookup tables according to the present embodiment store therein the light intensity distribution obtained when the light sources are turned on at the maximum output (output of 100%). By dividing the difference by the value of light intensity in the lookup table, the light source drive value calculator 24 can derive the ratio (magnification) of the difference to the value of light intensity of 100%. In a case where the lookup tables indicating the light intensity distribution obtained when the light sources of the first sidelight type light source 52A are turned on are also used as the lookup tables indicating the light intensity distribution obtained when the light sources of the second sidelight type light source S21B are turned on, the light source drive value calculator 24 performs coordinate transformation as described above when reading Percentage. Specifically, in a case where an absolute coordinate value of the luminance correction target block is represented by (P, Q), the light source drive value calculator 24 reads data at the coordinate (P, MAXQ-Q) from the lookup tables corresponding to the position of the luminance correction target block in the light source array direction LY and uses it as Percentage.

The light source drive value calculator 24 adds the calculated magnification of the difference to $1/\alpha_b$ calculated based on the input signal and temporarily set at Step S37 (Step S26). In other words, if $1/\alpha_b$ calculated at Step S21 is smaller than the target $1/\alpha_b$ of the block, the light source drive value calculator 24 adds the calculated magnification of the difference to the temporarily set $1/\alpha_b$ (Step S26), thereby compensating the luminance of the block having insufficient luminance.

Figure 26:
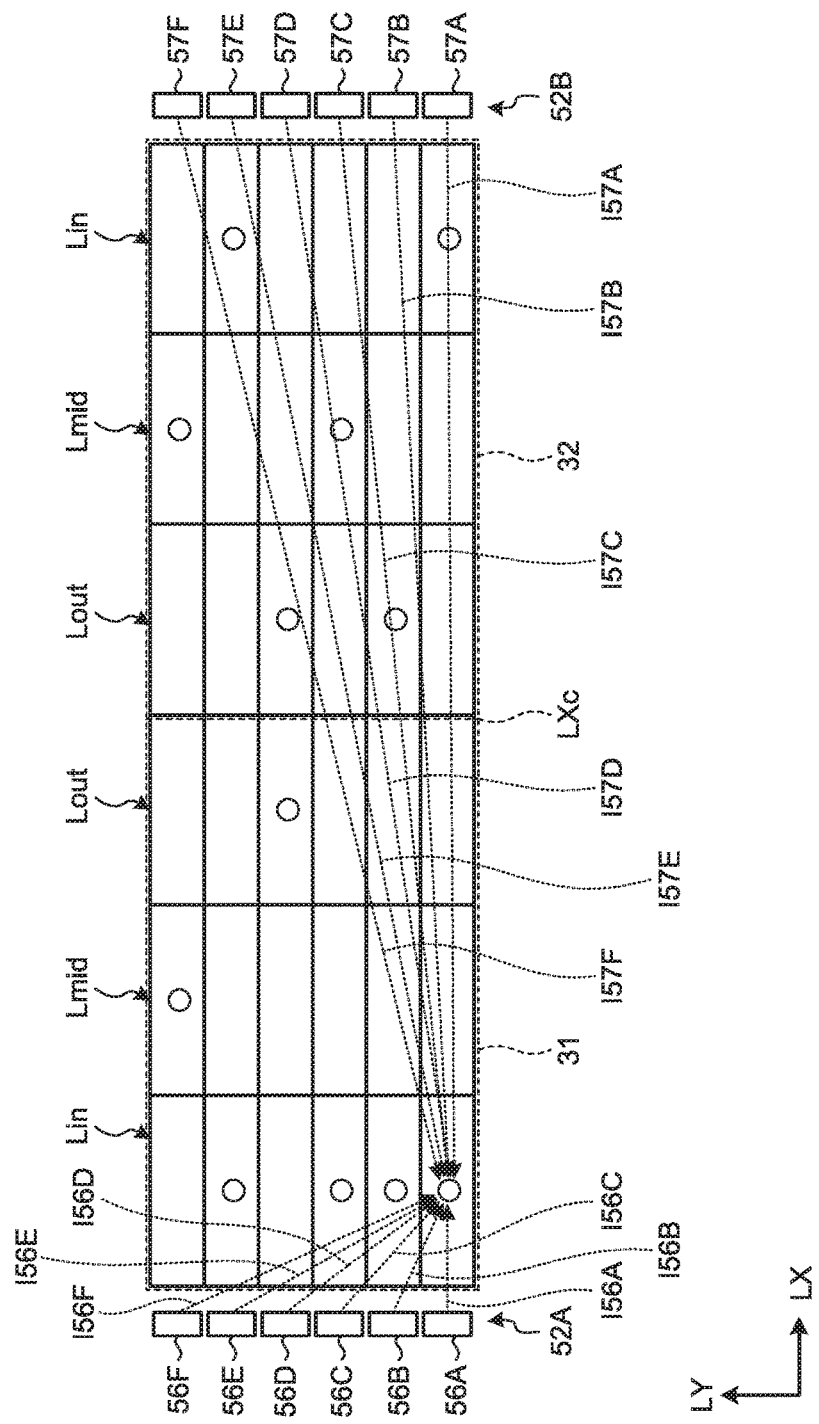
FIG. 26 is a diagram for explaining an effect of each of the light source on one luminance determination block serving as a target for luminance correction.

FIG. 26 is a diagram for explaining an effect of each of the light source on one luminance determination block serving as a target for luminance correction. Let us assume a case where the luminance determination block illustrated in FIG. 26 is the light incident portion Lin on the first display surface 31 closest to the light source 56A. In this case, the representative luminance of the luminance determination block is obtained by adding luminance I56A to I56F and I57A to I57F of the luminance determination block generated by incident light output from the light sources 56A to 56F and 57A to 57F, respectively. As illustrated in FIG. 26, for example, the light source drive value calculator 24 recalculates the light source drive value such that the sum of the luminance generated by the light source 56A the light source drive value of which is to be calculated and the luminance generated by the light sources 56B to 56F and 57A to 57F other than the light source 56A is equal to the target luminance. The light source drive value calculator 24 then stores therein the recalculated light source drive value. Specifically, as described above, the light source drive value calculator 24 calculates the difference Sub by subtracting, from the target $1/\alpha_b$, $1/\alpha_b$ being calculated at Step S21, that is, $1/\alpha_b$ corresponding to the sum of the luminance on the assumption that the light sources 56A to 56F and 57A to 57F are turned on. The light source drive value calculator 24 divides the difference Sub by Percentage on the lookup table corresponding to the light source 56A, thereby calculating the magnification. The light source drive value calculator 24 adds the magnification to $1/\alpha_b$ temporarily set as the light source drive value of the light source 56A. The light source drive value calculator 24 thus recalculates the light source drive value of the light source 56A and stores it therein. The light source drive value calculator 24 performs the processing on each light source. With this processing, the curve Ud illustrated in FIG. 23 is corrected to the curve Ue, for example. As a result, the luminance levels of the peaks D1 and D3 of the luminance are changed among the peaks and the troughs (D0 to D4) in the luminance, whereby the luminance is increased. The light source drive value calculator 24 then performs the processing at Step S27.

By contrast, if $1/\alpha_b$ calculated at Step S21 is equal to or larger than the target $1/\alpha_b$ of the group of interest (No at Step S23), the light source drive value calculator 24 skips the processing from Step S24 to Step S26 and performs the processing at Step S27. If $1/\alpha_b$ of the luminance correction target block exceeds an upper limit (Yes at Step S27), the light source drive value calculator 24 performs clipping for replacing $1/\alpha_b$ with the upper limit (Step S28). If positive determination is made at Step S23, $1/\alpha_b$ of the luminance correction target block compared with the upper limit at Step S27 is the light source drive value $1/\alpha_b$ resulting from the correction at Step S26 as described above. By contrast, if negative determination is made at Step S23, $1/\alpha_b$ is the temporarily set light source drive value $1/\alpha_b$. The upper limit is set in advance as an upper limit of the light source drive value used in light source control. After the processing at Step S28, the light source drive value calculator 24 performs the processing at Step S30. By contrast, if $1/\alpha_b$, of the luminance correction target block does not exceed the upper limit (No at Step S27), the light source drive value calculator 24 skips the processing at Step S28 and performs the processing at Step S30. If scanning of all the groups is completed (Yes at Step S30), the light source drive value calculator 21 finishes the process illustrated in FIG. 15. By contrast, if scanning of all the groups is not completed (No at Step S30), the light source drive value calculator 24 specifies the next group as a group of interest and performs the processing at Step S21 again. With the processing described above, the light source drive value $1/\alpha_b$ of each block temporarily set at Step S37 is corrected if negative determination is made at Step S23 and Step S27, the temporarily set light source drive value may possibly not be corrected in this case, the temporarily set light source drive value is used for control of the light source lighting amount of the light source without any change. The light source lighting amount is calculated from $1/\alpha_b$ of each block derived this manner. Subsequently, $1/\alpha_b$ of each luminance correction target block calculated as described above is used as the light source drive value $1/\alpha_k$ of each light source. In other words, the light source drive values $1/\alpha_k$ of the light sources 56A to 56F and 57A to 57F are calculated. Based on the light source drive value $1/\alpha_k$ and the lookup table, the representative luminance is calculated by the expression (10). As described above, the temporarily set $1/\alpha_b$ is corrected such that $1/\alpha_k$, of each luminance correction target block is equal to the target $1/\alpha_b$. The light source lighting amount of each light source is controlled based on the corrected $1/\alpha_b$. In other words, the light source lighting amount of each light source is controlled such that the luminance of each luminance correction target block satisfies the target luminance.

To use the lookup tables indicating the light intensity distribution obtained when the light sources of the first sidelight type light source 52A are turned on as the lookup tables indicating the light intensity distribution obtained when the light sources of the second sidelight type light source 52B are turned on, it is necessary to incorporate the calculation for coordinate transformation into the expression (10). As described above, the representative luminance is calculated by multiplying light source currents by data of the lookup tables of the light sources and calculating the sum of the values resulting from the multiplication. When the lookup tables are shared by the first sidelight type light source 52A and the second sidelight type light source 52B, the light source drive value calculator 24 can calculate the representative luminance simply by using the expression for multiplying the light source currents by data of the lookup tables of the light sources and calculating the sum of the values resulting from the multiplication for both of the first sidelight type light source 52A and the second sidelight type light source 52B. The light source currents of the second sidelight type light source 52B are multiplied by data at the coordinate (P, MAXQ-Q) instead of the coordinate (P, Q) in the lookup tables.

While the display apparatus 10 of the present embodiment has the lookup tables indicating the light intensity distribution obtained when the light sources of the first sidelight type light source 52A are turned on and has no lookup tables indicating the light intensity distribution obtained when the light sources of the second sidelight type tight source 52B are turned on, the present disclosure is not limited thereto. The display apparatus 10 of the present embodiment, for example, may have the lookup tables indicating the light intensity distribution obtained when the light sources of the second sidelight type light source 52B are turned on and have no lookup tables indicating the light intensity distribution obtained when the light sources of the first sidelight type light source 52A are turned on.

The calculation of the light source drive value $1/\alpha_k$ of the light source (luminance correction, that is, correction of the light source drive value) may be performed in order of the light sources 56A, 56B, 56C, 56D, 56E, 56F, 57A, 51B, 57C, 57D, 57E, and 57F. Alternatively, the calculation of the light source drive value $1/\alpha_k$ of the light source may be performed in order of the light sources 56A, 56B, 56C, 56D, 56E, 56F, 57F, 57E, 57D, 57C, 57B, and 57A. The order of calculating the light source drive value $1/\alpha_k$ of the light source is not restricted. If the light source drive value $1/\alpha_k$ of one of the light sources 56A to 56F and 57A to 57F is corrected by the processing at Step S26 in FIG. 15, the light source drive values $1/\alpha_k$ of the other light sources are recalculated. Specifically, the drive signal value calculator 24 calculates the light source drive value $1/\alpha_k$ of the light sources 56A to 56F and 57A to 57F in order, while sequentially reflecting the light source drive values $1/\alpha_k$ of the light sources derived earlier on the light source drive values $1/\alpha_k$ of the light sources derived later. Thus, the representative luminance of each light source is calculated with high accuracy.

The order of correction of the light source drove value may be determined based on the characteristics or the setting of the backlight, for example. In a case where one light source is affected more by the effect of light output from light sources aligned with the one light source in the light source array direction LY (light sources included in the same sidelight type light source) than by the effect of light output from light sources opposite to the one light source in the light incident direction LX, for example, the light source drive value calculator 24 may calculate the light source drive value in order of arrangement of the light sources in the light source array direction LY. In this case, the tight source drive value calculator 24 may calculate the light source drive value in order of the light sources 56A, 56B, 56C, 56D, 56E, 56F, 57A, 57B, 57C, 57D, 57E, and 57F or the light sources 56A, 56B, 56C, 56D, 56E, 56F, 57F, 57E, 57D, 57C, 57B, and 57A, for example.

In a case where one light source is affected less by the effect of light output from light sources aligned with the one light source in the light source array direction LY (light sources included in the same sidelight type light source) than by the effect of light output from light sources opposite to the one light source in the light incident direction LX, for example, the light source drive value calculator 24 may alternately correct the light source drive value of the light sources in the first sidelight type light source 52A and the light source drive value of the light sources in the second sidelight type light source 52B. In this case, the light source drive value calculator 24 may correct the light source drive value in order of the light sources 56A, 57A, 56B, 57B, 56C, 57C, 56D, 57D, 56E, 57E, 56F, and 57F, for example.

Furthermore, the light source drive value calculator 24 may correct the light source drive value a plurality of times. By reflecting the light source drive value corrected in the first correction of the light source drive value on the second correction of the light source drive value, for example, the light source drive value calculator 24 can calculate the light source drive value with high accuracy. In this case, the light source drive value calculator 24 can correct the light source drive value so as to increase the luminance in the first correction and correct the light source drive value so as to decrease the luminance in the second correction.

The light source drive value determining processor 26 transmits the light source drive values ($1/\alpha_k$) of the respective light sources 56A, 56B, 56C, 56D, 56E, 56F, 57A, 57B, 57C, 57D, 57E, and 57F to the planar light source device controller 60 and transmits the expansion coefficients $\alpha_k$ of the respective pixels 48 as information on luminance of the pixels 48, to the image processor 22 (Step S14).

Next, calculation of display data (Step S12) in the image processor 22 is described. In the present embodiment, when calculating an output signal (signal value $X_{1-(p, q)}$) for the first sub-pixels 49R, an output signal (signal value $X_{2-(p, q)}$) for the second sub-pixels 49G, an output signal (signal value $X_{3-(p, q)}$) for the third sub-pixels 49B, and an output signal (signal value $X_{4-(p, q)}$) for the fourth sub-pixel 49W with respect to each pixel 48 in the luminance determination blocks, the image processor 22 uses, as the luminance information of the pixels 48, the expansion coefficients $\alpha_k$ of the pixels 48 transmitted from the light source drive value determining processor 26.

Figure 28:
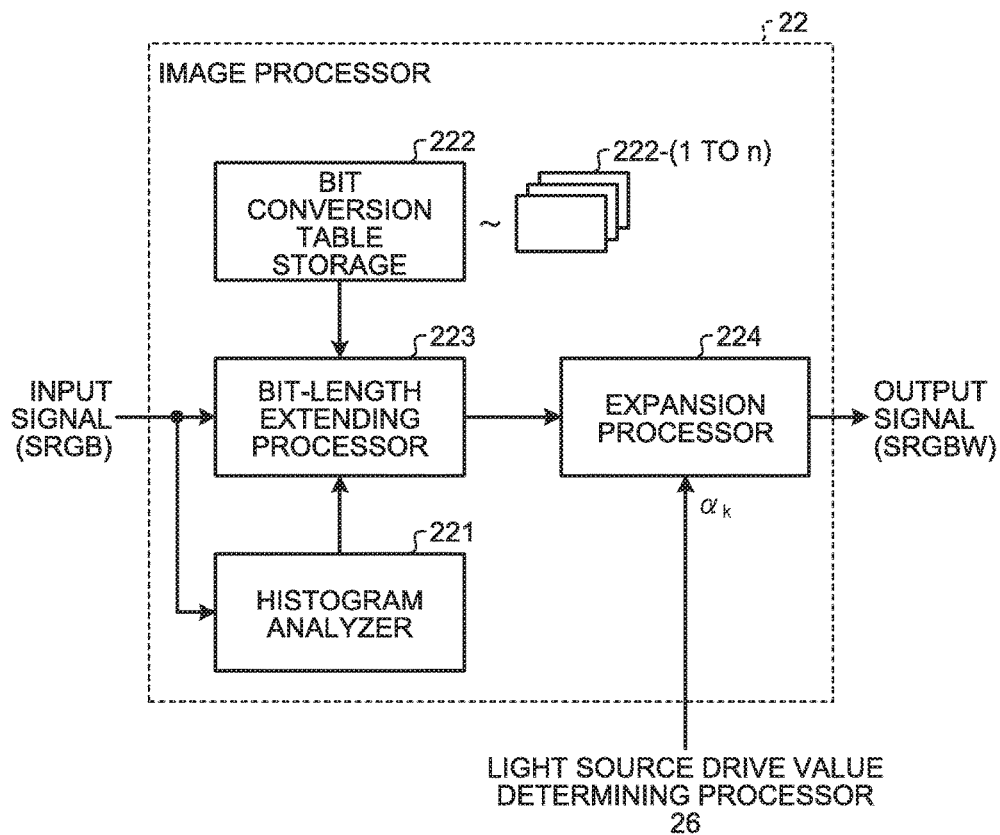
FIG. 28 is a block diagram for explaining an image processor according to the first embodiment.
Figure 29:
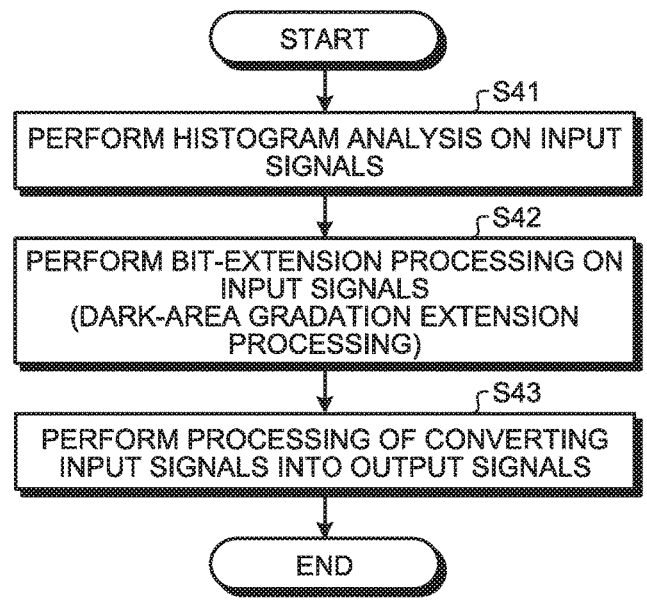
FIG. 29 is a detailed flowchart of an arithmetic step of calculating display data according to the first embodiment.

FIG. 28 is a block diagram for explaining the image processor according to the first embodiment. FIG. 29 is a detailed flowchart of an arithmetic step of calculating display data according to the first embodiment. As illustrated in FIG. 28, the image processor 22 according to the present embodiment includes a histogram analyzer 221, a bit conversion table storage 222, a bit-length extending processor 223, and an expansion processor 224.

Figure 30:
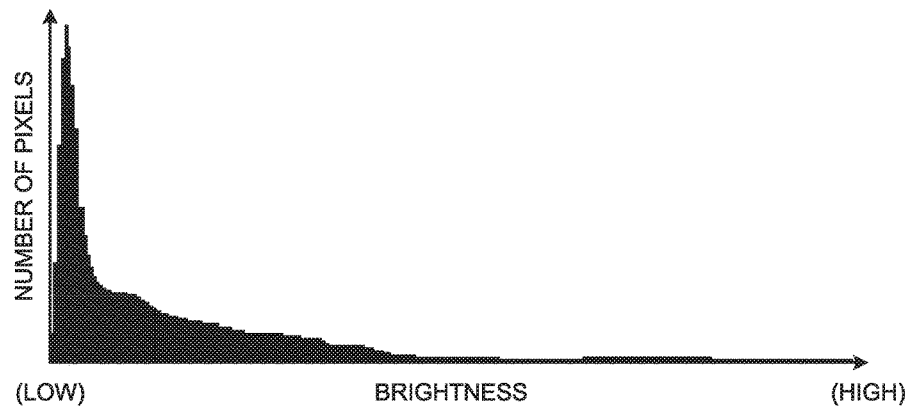
FIG. 30 is a diagram of as example of a histogram analysis result with respect to each frame.

Based on information on input signals SRGB of an image, the histogram analyzer 221 performs a histogram analysis on the original image thereof (Step S41). FIG. 30 is a diagram of an example of a histogram analysis result with respect to each frame. In the example (the histogram) illustrated in FIG. 30, the vertical axis represents the number of pixels (the number of pixels 48) at each level of brightness represented by the horizontal axis. In other words, in the histogram analysis, the histogram analyzer 221 analyzes the number of pixels at each level of brightness indicated by input signals of an original image. While the number of pixels at each level of brightness is represented by the vertical axis in FIG. 30, the histogram analysis may be performed with the horizontal axis representing the number of pixels corresponding to each level of luminance.

The bit conversion table storage 222 stores a plurality of bit conversion tables 222-(1) to 222-(n) corresponding to different histogram analysis results. Based on one of the bit conversion tables 222-(1) to 222-(n) that corresponds to the histogram analysis result, the bit-length extending processor 223 extends the bits of input signals SRGB (Step S42). In this example, the 8-bit input signals SRGB of the image are extended into 16-bit input signals SRGB.

Figure 31:
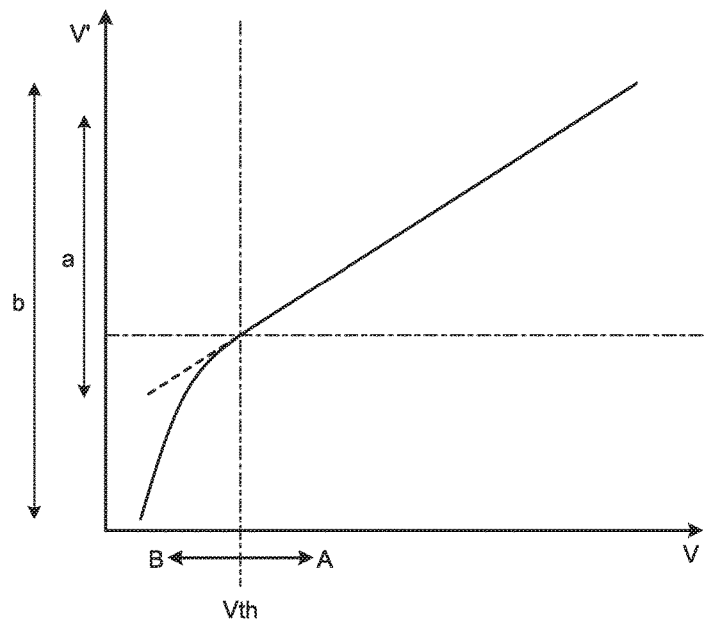
FIG. 31 is a graph illustrating an example of a bit conversion table according to the first embodiment.

FIG. 31 is a graph illustrating an example of the bit conversion table according to the first embodiment. FIG. 31 illustrates an example of a graph of brightness V' of an image after bit-length extension versus brightness V of an original image thereof before the bit-length extension. The vertical axis represents the brightness V', and the horizontal axis represents the brightness V.

In the present embodiment, the light sources 56A to 56F are individually controlled for controlling the luminance of the panel as described above. As illustrated in FIG. 31, an image can be therefore reproduced in a panel luminance range b wider than a panel luminance range a in which an image can be reproduced with the panel luminance controlled using a single light source.

As illustrated in FIG. 31, each of the bit conversion tables 222-(1) to 222-(n) according to the first embodiment has a linear region A and a curving region B. The linear region A is a region where the brightness of an original image is equal to or higher than a certain brightness threshold Vth, and has a characteristic that the brightness of an image after the bit conversion is kept unchanged from the brightness of the original image. The curving region B is a region where the brightness of the original image is lower than the certain brightness threshold Vth, and has a characteristic that: decrease in brightness of the image after the bit conversion relative to decrease in brightness of the original image becomes gradually larger as the brightness of the original image decreases. The characteristic of the curving region B is expressed by, for example, a quadratic curve that is tangent to a line of the characteristic of the linear region as a tangent line at a point of tangency corresponding to the certain brightness threshold Vth for the original image. That is, in the curving region B where the brightness of the original image is lower than the certain brightness threshold Vth, the brightness V' of the image after the bit conversion is smaller than the brightness V of the original image. In the present embodiment, the bit conversion tables 222-(1) to 222-(n) each having these characteristics are applied. Thus, the signal processor 22 can obtain output signals SRGBW representing an image in which brightness of a region corresponding to a dark region in the original image represented by input signals SRGB is lower than the brightness of the dark region in the original image, the dark region being a region corresponding to the curving region B where the brightness of the original image is lower than the certain brightness threshold Vth.

In the present embodiment, the bit conversion table storage 222 stores the bit conversion tables 222-(1) to 222-(n) that have different values for the certain brightness threshold Vth for the original image that separates the linear region A and the curving region B. Based on the result of the histogram analysis performed by the histogram analyzer 221 with respect to each frame, the bit-length extending processor 223 determines the certain brightness threshold Vth for the original image that separates the linear region A and the curving region B, and performs bit conversion on the input signal SRGB by applying one of the bit conversion tables 222-(1) to 222-(n) that corresponds to this certain brightness threshold Vth. A method that the bit-length extending processor 223 uses for determining the one of the bit conversion tables 222-(1) to 222-(n) may be a method that includes, for example, obtaining brightness of a pixel having the highest brightness among 20% of all pixels that have the lowest brightness in the histogram analysis result illustrated in FIG. 30; and then setting the obtained brightness as the certain brightness threshold Vth for the original image that separates the linear region A and the curving region B to select the one of the conversion tables 222-(1) to 222-(n). The percentage is not limited to 20% and can be set to an appropriate value. The method for determining the certain brightness threshold Vth for the original image that separates the linear region A and the curving region B is not limited to this example.

In the present embodiment, the bit-length extending processor 223 converts the 8-bit input signal SRGB into a 16-bit signal, thereby setting the number of bits for display gradation of the each input signal (signal value $X_{1-(p, q)}$), signal value $X_{2-(p, q)}$), and signal value $X_{3-(p, q)}$) to 16 (setting a value for display gradation to a value from 0 to 65535 corresponding to 65536 gradations). That is, the brightness V(S) can be one value ranging from 0 to 65535.

The expansion processor 224 receives the above-described expansion coefficients $\alpha_k$ of the respective pixels 48 from the light source drive value determining processor 26. Based on these expansion coefficients $\alpha_k$ of the respective pixels 48, the expansion processor 224 performs processing of converting, into the output signals SRGBW, the input signals SRGB subjected to the bit-length extension by the bit-length extending processor 223 (Step S43).

More specifically, at least based on the input signal (signal value $X_{1-(p, q)}$) for the first sub-pixels 49R subjected to the bit-length extension by the bit-length extending processor 223 and on the expansion coefficients $\alpha_k$ of the respective pixels 48, the expansion processor 224 calculates an output signal (signal value $X_{1-(p, q)}$) for the first sub-pixels 49R. At least based on the input signal (signal value $X_{2-(p, q)}$) for the second sub-pixel 49G subjected to the bit-length extension by the bit-length extending processor 223 and on the expansion coefficients $\alpha_k$ of the respective pixels 48, the expansion processor 224 calculates an output signal (signal value $X_{2-(p,\ q)}$) for the second sub-pixels 49G. At least based on the input signal (signal value $X_{3-(p,\ q)}$) for the third sub-pixels 49B subjected to the bit-length extension by the bit-length extending processor 223 and on the expansion coefficients $\alpha_k$ of the respective pixels 48, the expansion processor 224 calculates an output signal (signal value $X_{3-(p,\ q)}$) for the third sub-pixel 49B. The expansion processor 224 calculates an output signal (signal value $X_{4-(p,\ q)}$) for the fourth sub-pixels 49 based on the input signal (signal value $X_{1-(p,\ q)}$) for the first sub-pixels 49R, the input signal (signal value $X_{2-(p,\ q)}$) for the second sub-pixels 49G, and the input signal (signal value $X_{3-(p,\ q)}$) for the third sub-pixels 49B all of which have been subjected to the bit conversion by the bit-length extending processor 223, and the expansion coefficients $\alpha_k$ of the respective pixels 48.

The image processor 22 performs synchronous processing in which the above-described conversion processing is performed so as to output the signal value $X_{1-(p,\ q)}$), the signal value $X_{2-(p,\ q)}$), the signal value $X_{3-(p,\ q)}$), and the signal value $X_{4-(p,\ q)}$) for the (p, q)-th pixel 48 (Step S15). Based on the synchronization signal STM, the image display panel driver 40 displays an image of each frame on the image display panel 30, and the planar light source device controller 60 drives the light sources 56A to 56F and 57A to 57F individually.

As described above, the display apparatus 10 according to the first embodiment drives the light sources 56A to 56F and 57A to 57F individually based on information of input signals SRGB of an image, and displays the image using output signals SR BW obtained by lowering the brightness of the dark region in the image represented by the input signals SRGB. Thus, a higher contrast ratio can be attained for any image input.

In the present embodiment, a histogram analysis is performed on input signals SRGB of an image, and the brightness of the dark region is lowered in accordance with characteristics corresponding to the result of this histogram analysis to obtain the output signals SRGEW. Thus, the image can be displayed with a favorable contrast ratio.

In the present embodiment, the image processor 22 performs the bit-length extension processing with one of the bit conversion tables 222-(1) to 222-(n) that corresponds to the histogram analysis result, so that the brightness of the dark region is lowered, thereby obtaining the output signals SRGBW. Thus, the number of gradations in the dark region can be increased, and image display can be of higher quality.

In the present embodiment, the brightness of the dark region is made lower with respect to the video signals without lowering luminance in the dark region in driving the light sources 56A to 56F and 57A to 57F. Thus, a higher contrast ratio can be attained with the visibility of the dark region secured.

The present embodiment can provide a display apparatus that is configured to control individual brightness of a plurality of light sources individually, the light sources being capable of individually changing amount of luminescence in a plurality of areas in a display area, and that is capable of increasing the number of gradations in a dark region of an image and capable of increasing a contrast ratio with respect to any image input.

Second Embodiment

Figure 32:
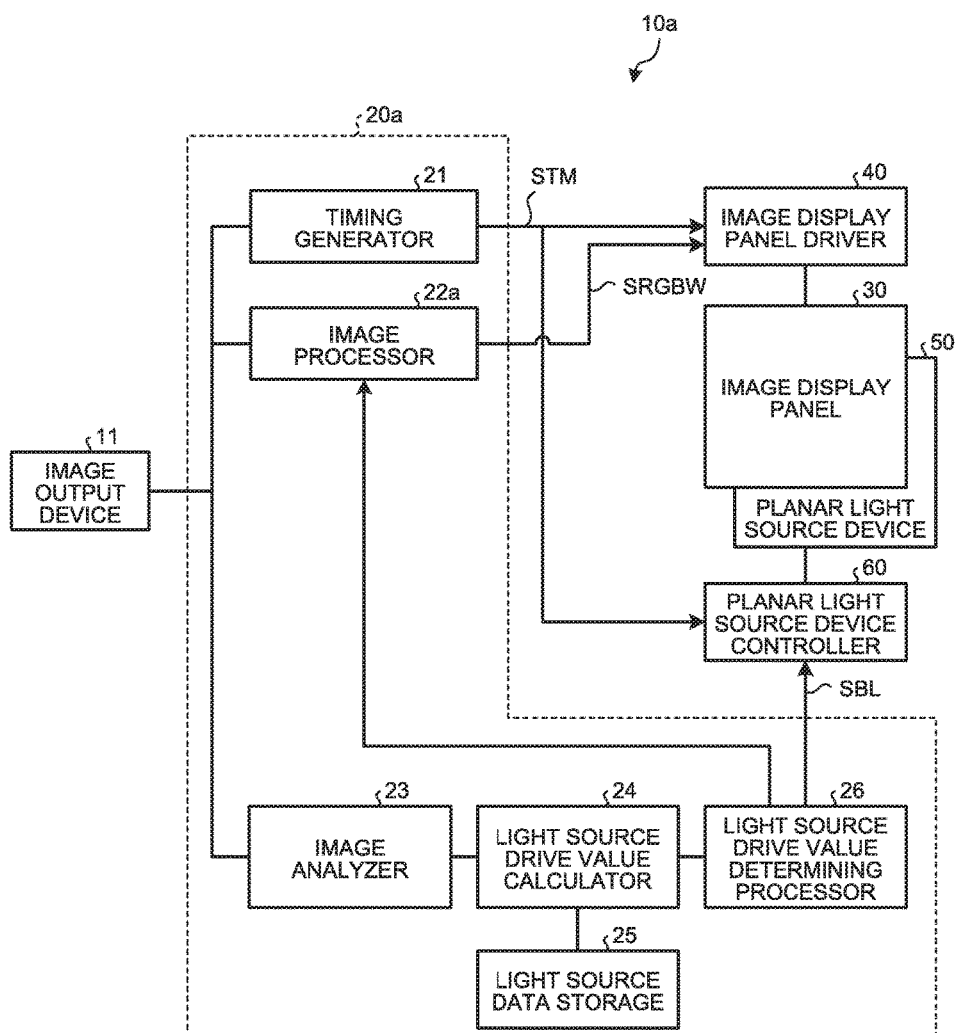
FIG. 32 is a block diagram for explaining a signal processor according to a second embodiment.
Figure 33:
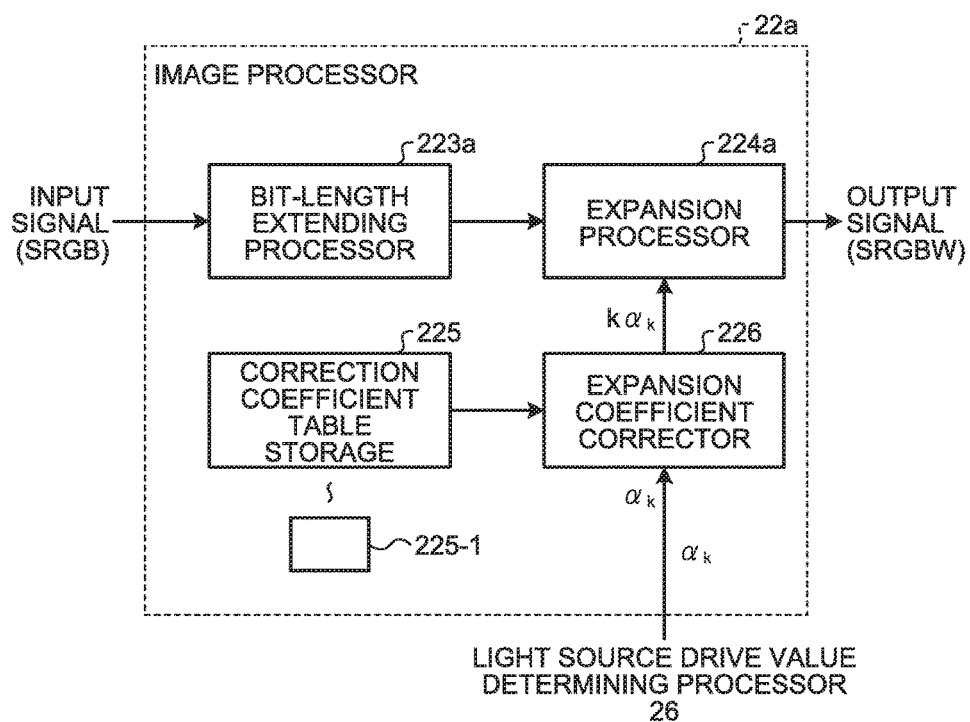
FIG. 33 is a block diagram for explaining an image processor according to the second embodiment.
Figure 34:
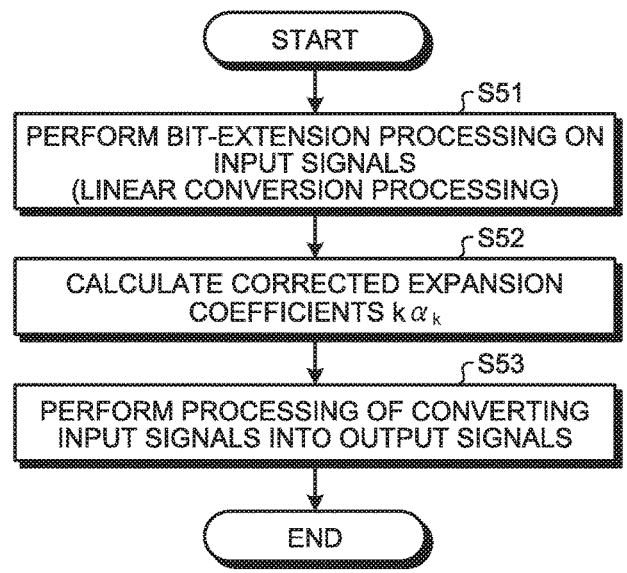
FIG. 34 is a detailed flowchart of an arithmetic step of calculating display data according to the second embodiment.

FIG. 32 is a block diagram for explaining a signal processor according to a second embodiment. FIG. 33 is a block diagram for explaining an image processor according to the second embodiment. FIG. 34 is a detailed flowchart of an arithmetic step of calculating display data according to the second embodiment. The configuration of a display apparatus, the pixel array of an image display panel, a light guide plate, sidelight type light sources, a flowchart of a method for driving the display apparatus, luminance determination blocks, lookup tables, a detailed flowchart of the image analysis and a light source drive value calculation step, and a flowchart for explaining a step for determining a drive value of each light source according to the second embodiment are the same as those in the first embodiment described above, and repetitive description will be omitted.

As illustrated in FIG. 32, a signal processor 20a in a display apparatus 10a according to the present embodiment includes the timing generator 21, an image processor 22a, the image analyzer 23, the light source drive value calculator 24, the light source data storage 25, and the light source drive value determining processor 26. As illustrated in FIG. 33, the image processor 22a according to the present embodiment includes a bit-length extending processor 223a, an expansion processor 224a, a correction coefficient table storage 225, and an expansion coefficient corrector 226.

The bit-length extending processor 223a according to the present embodiment linearly converts each input signal SRGB by performing bit-length extension thereon (Step S51). In this example, the 8-bit input signals SRGB of the image are extended into 16-bit signals.

The correction coefficient table storage 225 stores a correction coefficient table 225-1.

Figure 35:
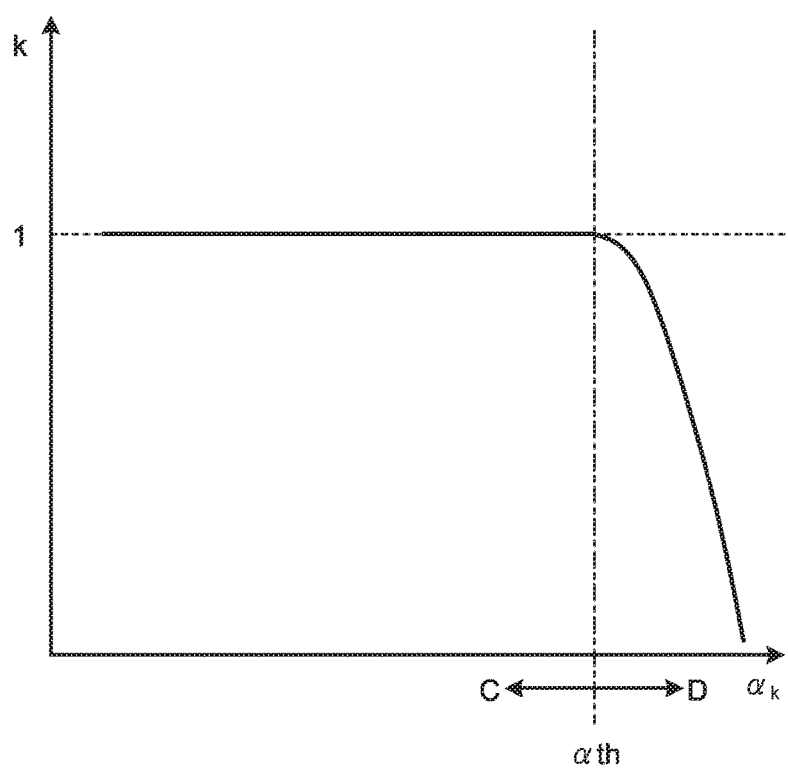
FIG. 35 is a graph illustrating an example of a correction coefficient table according to the second embodiment.

FIG. 35 is a graph illustrating an example of the correction coefficient table according to the second embodiment. FIG. 35 illustrates an example of a graph of a correction coefficient k versus the expansion coefficient $\alpha_k$ of each pixel 48. The vertical axis represents the correction coefficient k, and the horizontal axis represents the expansion coefficient $\alpha_k$.

As illustrated in FIG. 35, the correction coefficient table 225-1 according to the second embodiment has a linear region C and a curving region D. The linear region C is a region where the expansion coefficient $\alpha_k$ of each pixel 48 is not greater than a certain expansion coefficient threshold $\alpha$th, and has a characteristic that the correction coefficient k equals to 1 so that brightness of an image subjected to the expansion processing by the expansion processor 224a can be kept unchanged from the brightness of an original image thereof. The curving region D is a region where the expansion coefficient $\alpha_k$ of each pixel 48 is greater than the certain expansion coefficient threshold $\alpha$th, and has a characteristic that the correction coefficient k is less than 1 so that decrease in brightness of the image subjected to the expansion processing by the expansion processor 224a relative to decrease in brightness of the original image can be gradually larger as brightness of the original image decreases. The characteristic of the curving region D is expressed by, for example, a quadratic curve that is tangent to a line of the characteristic of the linear region C as a tangent line at a point of tangency corresponding to the certain expansion coefficient threshold $\alpha$th for the expansion coefficients $\alpha_k$ of the respective pixels 48.

Based on the expansion coefficients $\alpha_k$ of the respective pixels 48 input from the light source drive value determining processor 26, the expansion coefficient corrector 226 multiplies the expansion coefficients $\alpha_k$ of the respective pixels 48 by the correction coefficient k with reference to the correction coefficient table 225-1, thereby calculating the corrected expansion coefficients $k\alpha_k$ of the respective pixels 48 (Step S52).

Based on the corrected expansion coefficients $k\alpha_k$ obtained by multiplying the expansion coefficients $\alpha_k$ of the respective pixels 48 input from the light source drive value determining processor 26 by the correction coefficient k, the expansion processor 224a according to the present embodiment performs processing of converting the input signals SRGB subjected to the bit-length extension by the bit-length extending processor 223a into the output signals SRGBW (Step S53).

That is, in the curving region D where the expansion coefficient $\alpha_k$ of each pixel 48 is greater than the certain expansion coefficient threshold $\alpha$th, an image subjected to the conversion processing has brightness lower than brightness of the original image thereof. In the present embodiment, with reference to the conversion coefficient table 225-1 having such characteristics, input signals SRGB subjected to the bit-length extension by the bit-length extending processor 223a are converted into output signals SRGBW through conversion processing using the corrected expansion coefficient $k\alpha_k$ obtained by multiplying the expansion coefficient of each pixel 48 by the correction coefficient $\alpha_k$. Thus, the signal processor 22a can obtain output signals SRGBW representing an image in which brightness of a region corresponding to the dark region in the original image represented by input signals SRGB is lower than the brightness of the dark region in the original image, the dark region being a region corresponding to the curving region D where the expansion coefficient $\alpha_k$ of each pixel 48 is greater than the certain expansion coefficient threshold $\alpha$th.

More specifically, at least based on the input signal (signal value $X_{1-(p, q)}$) for the first sub-pixels 49R subjected to the bit-length extension by the bit-length extending processor 223a and on the expansion coefficient $k\alpha_k$ of each pixel 48, the expansion processor 224a according to the present embodiment calculates the output signal (signal value $X_{1-(p, q)}$) for the first sub-pixels 49R. At least based on the input signal (signal value $X_{2-(p, q)}$) for the second sub-pixels 49G subjected to the bit-length extension by the bit-length extending processor 223 and on the expansion coefficient $k\alpha_k$ of each pixel 48, the expansion processor 224a calculates the output signal (signal value $X_{2-(p, q)}$) for the second sub-pixel 49G. At least based on the input signal (signal value $X_{3-(p, q)}$) for the third sub-pixels 49B subjected to the bit-length extension by the bit-length extending processor 223 and on the expansion coefficient $k\alpha_k$ of each pixel 48, the expansion processor 224a calculates the output signal. (signal value $X_{3-(p, q)}$) for the third sub-pixels 49B. The expansion processor 224a further calculates the output signal (signal value $X_{4-(p, q)}$) for the fourth sub-pixels 49W, based on the input signal (signal value $X_{1-(p, q)}$) for the first sub-pixels 49R, the input signal. (signal value $X_{2-(p, q)}$) for the second sub-pixels 49G, and the input signal (signal value $X_{3-(p, q)}$) for the third sub-pixels 49B all subjected to the bit-length extension by the bit-length extending processor 223 and on the expansion coefficient $k\alpha_k$ of each pixel 48.

The image processor 22a performs synchronous processing in which the above-described conversion processing is performed so as to output the signal value $X_{1-(p, q)}$, the signal value $X_{2-(p, q)}$, the signal value $X_{1-(p, q)}$, and the signal value $X_{4-(p, q)}$ for the (p, q)-th pixel 48 (Step S15). Based on the synchronization signal STM, the image display panel driver 40 displays an image of each frame on the image display panel 30, and the planar light source device controller 60 drives the light sources 56A to 56F and 57A to 57F individually.

As described above, in the same manner as with the first embodiment, the display apparatus 10a according to the second embodiment drives the light sources 56A to 56F and 57A to 57F individually based on information of input signals SRGB of an image, and displays the image using output signals SRGBW obtained by lowering the brightness of the dark region in the image represented by the input signals SRGB. Thus, a higher contrast ratio can be attained for any image input.

In the present embodiment, the image processor 22a lowers the brightness of the dark region by performing the bit-length extension processing on input signals SRGB of an image and performing image processing on these signals subjected to the bit-length extension processing, using the corrected expansion coefficients $k\alpha_k$ of the respective pixels 48, and thus can obtain the output signals SRGBW. The corrected expansion coefficients $k\alpha_k$ are obtained by correcting the expansion coefficients $\alpha_k$ of the respective pixels 48 using the correction coefficients k corresponding to the expansion coefficients $\alpha_k$. Thus, the image can be displayed with a favorable contrast ratio with the number of gradations in the dark region increased, and image display can be of higher quality.

In the present embodiment, as in the first embodiment, the brightness of the dark region is lowered with respect to the video signals without lowering luminance in the dark region in driving the light sources 56A to 56F and 57A to 57F. Thus, a higher contrast ratio can be attained with the visibility of gradation in the dark region secured.

The present embodiment can provide a display apparatus that is configured to control individual brightness of a plurality of light sources individually, the light sources being capable of individually changing amount of luminescence in a plurality of areas in a display area, and that is capable of increasing the number of gradations in a dark region of an image and capable of increasing a contrast ratio with respect to any image input.

Third Embodiment

Figure 36:
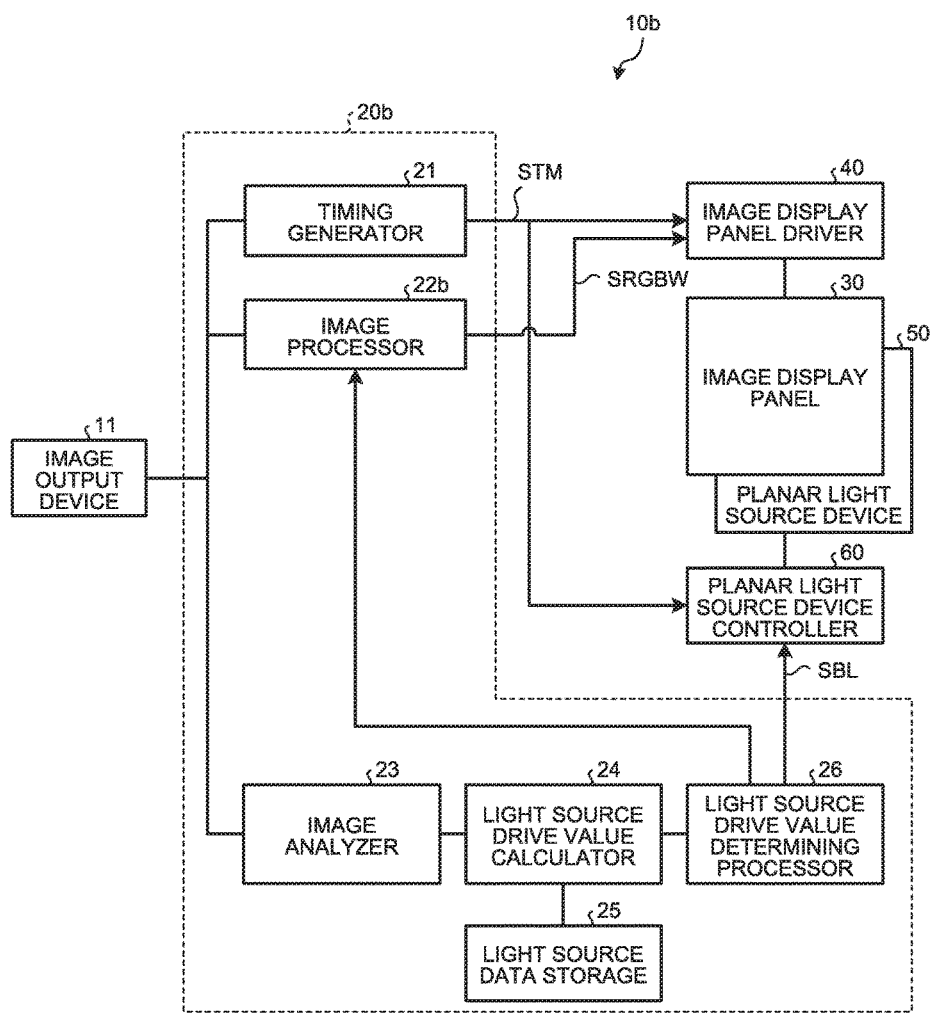
FIG. 36 is a block diagram for explaining a signal processor according to a third embodiment.
Figure 37:
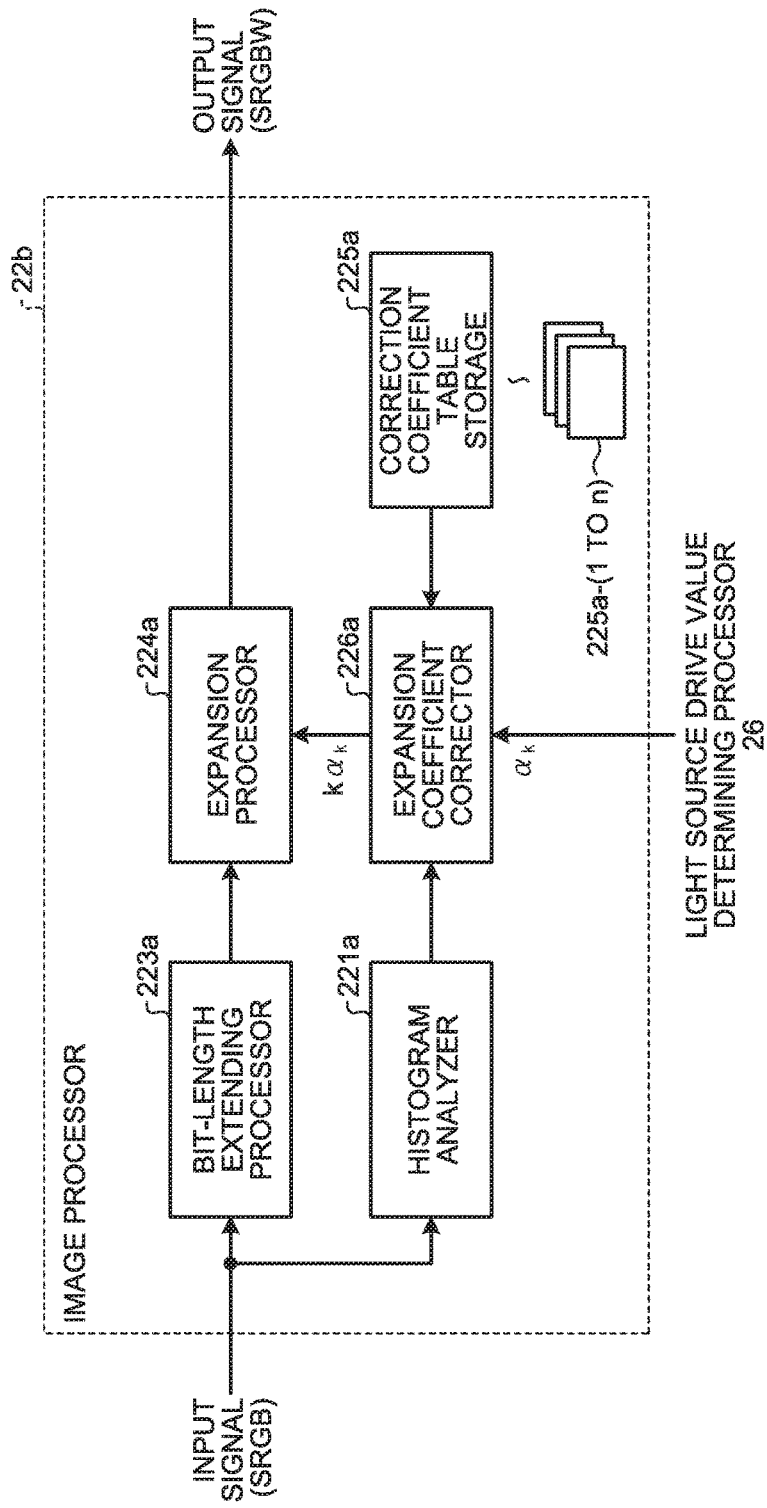
FIG. 37 is a block diagram for explaining an image processor according to the third embodiment.
Figure 38:
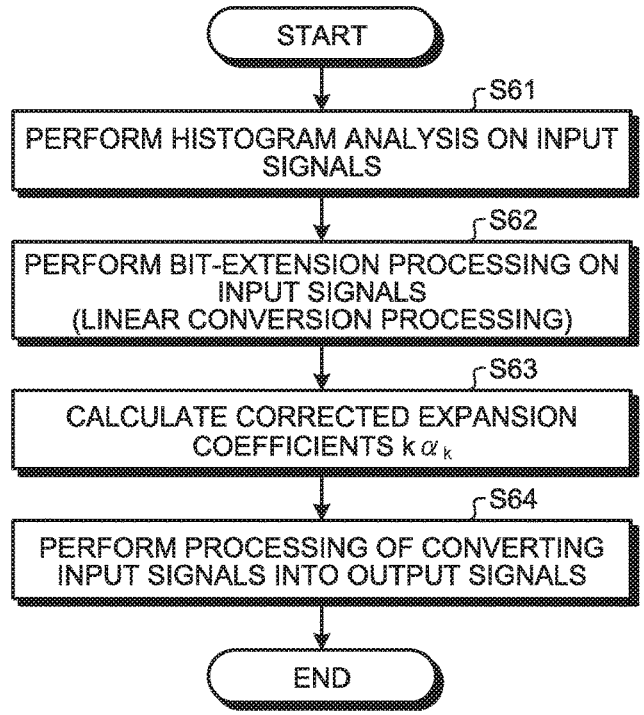
FIG. 38 is a detailed flowchart of an arithmetic step of calculating display data according to the third embodiment.

FIG. 36 is a block diagram for explaining a signal processor according to a third embodiment. FIG. 37 is a block diagram for explaining an image processor according to the third embodiment. FIG. 38 is a detailed flowchart of an arithmetic step of calculating display data according to the third embodiment. The configuration of a display apparatus, the pixel array of an image display panel, a light guide plate, sidelight type light sources, a flowchart of a method for driving the display apparatus, luminance determination blocks, lookup tables, a detailed flowchart of the image analysis and a light source drive value calculation step, and a flowchart for explaining a step for determining a drive value of each light source according to the third embodiment are the same as those in the first embodiment described above, and repetitive description will be omitted.

As illustrated in FIG. 36, a signal processor 20b in a display apparatus 10b according to the present embodiment includes the timing generator 21, an image processor 22b, the image analyzer 23, the light source drive value calculator 24, the light source data storage unit 25, and the light source drive value determining processor 26. As illustrated in FIG. 37, the image processor 22b according to the present embodiment includes the bit-length extending processor 223a, the expansion processor 224a, a correction coefficient table storage 225a, an expansion coefficient corrector 226a, and a histogram analyzer 221a.

Based on information on the input signals SRGB of an image, the histogram analyzer 221a according to the present embodiment performs a histogram analysis on the original image thereof (Step S61) in the similar manner as the histogram analyzer 221 according to the first embodiment. A result of the histogram analysis performed by the histogram analyzer 221a is the same as the result illustrated in FIG. 30 in the first embodiment, and detailed description thereof will be therefore omitted.

The bit-length extending processor 223a according to the present embodiment linearly converts each input signal SRGB by performing bit-length extension thereon (Step S62) as in the second embodiment. In this example, the 8-bit input signals SRGB for the image are extended into 16-bit signals.

The correction coefficient table storage 225a stores a plurality of correction coefficient tables 225a-(1) to 225a-(n) corresponding to different histogram analysis results.

Figure 39:
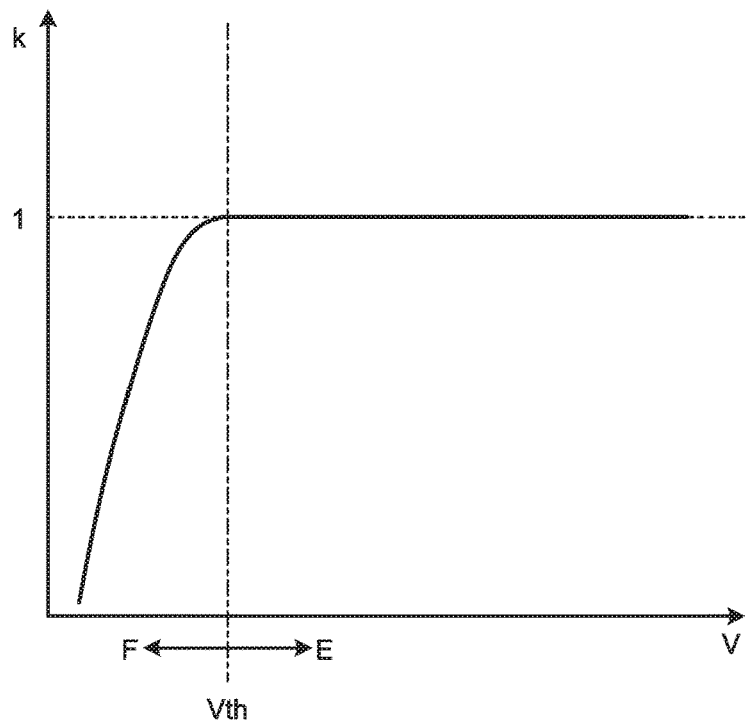
FIG. 39 is a graph illustrating an example of a correction coefficient table according to the third embodiment.

FIG. 39 is a graph illustrating an example of the correction coefficient table according to the third embodiment. FIG. 39 illustrates an example of a graph of a correction coefficient k versus brightness V of the input signal SRGB of an original image. The vertical axis represents the correction coefficient k, and the horizontal axis represents the brightness V.

As illustrated in FIG. 39, each of the correction coefficient tables 225a-(1) to 225a-(n) according to the third embodiment has a linear region E and a curving region F. The linear region E is a region where the brightness of an original image is equal to or higher than a certain brightness threshold Vth, and has a characteristic that the brightness of an image obtained by subjecting the original image to the expansion processing by the expansion processor 224a is kept unchanged from the brightness of the original image. The curving region F is a region where the brightness of the original image is lower than the certain brightness threshold Vth, and has a characteristic that: decrease in the brightness of the image obtained by subjecting the original image to the expansion processing by the expansion processor 224a relative to decrease in brightness of the original image becomes gradually larger as the brightness of the original image decreases. The characteristic of the curving region F is expressed by, for example, a quadratic curve that is tangent to a line of the characteristic of the linear region E as a tangent line at a point of tangency corresponding to the certain brightness threshold Vth for the original image.

In the present embodiment, the correction coefficient table storage 225a stores the correction coefficient tables 225a-(1) to 225a-(n) that have different values for the certain brightness threshold Vth for the original image that separates the linear region E and the curving region F. Based on the result of the histogram analysis performed on each frame by the histogram analyzer 221, the expansion coefficient corrector 226a determines the certain brightness threshold Vth for the original image that separates the linear region E and the curving region F, and multiplies the expansion coefficients $\alpha_k$ of the respective pixels 48 by the correction coefficient k with reference to one of the correction coefficient tables 225a-(1) to 225a-(n) that corresponds to this certain brightness threshold Vth, thereby calculating corrected expansion coefficients $k\alpha_k$ of the respective pixels 48 (Step S63). A method that the expansion coefficient corrector 226a uses for determining an appropriate one of the correction coefficient tables 225a-(1) to 225a-(n) may be a method that includes, for example, obtaining brightness of a pixel having the highest brightness among 20% of all pixels that have the lowest brightness in the histogram analysis result illustrated in FIG. 30; and then setting this brightness as the certain brightness threshold Vth for the original image that separates the linear region E and the curving region F to select one of the correction coefficient tables 225a-(1) to 225a-(n). The percentage is not limited to 20% and can be set to an appropriate value. The method for determining the certain brightness threshold Vth for the original image that separates the linear region E and the curving region F is not limited to this example.

Based on the corrected expansion coefficients $k\alpha_k$ obtained by multiplying the expansion coefficients $\alpha_k$ of the respective pixels 48 input from the light source drive value determining processor 26 by the correction coefficient k, the expansion processor 224a according to the present embodiment performs processing of converting the input signals SRGB subjected to the bit-length extension by the bit-length extending processor 223a into the output signals SRGBW (Step S64).

That is, in the curving region F where the lightness of the original image is lower than the certain brightness threshold Vth, the brightness of the image subjected to the expansion processing by the expansion processor 224a is smaller than the brightness V of the original image. In the present embodiment, the correction coefficient tables 225a-(1) to 225a-(n) each having these characteristics are applied. Thus, the signal processor 22b can obtain output signals SRGBW representing an image in which brightness of a region corresponding to the dark region in the original image represented by input signals SRGB is lower than the brightness of the dark region in the original image, the dark region being a region corresponding to the curving region F where the brightness of the original image is lower than the certain brightness threshold Vth.

More specifically, at least based on the input signal (signal value $X_{1-(p, q)}$) for the first sub-pixels 49R subjected to the bit-length extension by the bit-length extending processor 223a and on the expansion coefficient $k\alpha_k$ of each pixel 48, the expansion processor 224a according to the present embodiment calculates the output signal (signal value $X_{1-(p, q)}$) for the first sub-pixels 49R. At least based on the input signal (signal value $X_{1-(p, q)}$) for the second sub-pixels 49G subjected to the bit-length extension by the bit-length extending processor 223 and on the expansion coefficient $k\alpha_k$ of each pixel 48, the expansion processor 224a calculates the output signal (signal value $X_{2-(p, q)}$) for the second sub-pixels 49G. At least based on the input signal (signal value $X_{3-(p, q)}$) for the third sub-pixels 49B subjected to the bit-length extension by the bit-length extending processor 223 and on the expansion coefficient $k\alpha_k$ of each pixel 48, the expansion processor 224a calculates the output signal (signal value $X_{3-(p, q)}$) for the third sub-pixels 49B. The expansion processor 224a further calculates the output signal (signal value $X_{4-(p, q)}$) for the fourth sub-pixels 49W, based on the input signal (signal value $X_{1-(p, q)}$) for the first sub-pixels 49R, the input signal. (signal value $X_{2-(p, q)}$) for the second sub-pixels 49G, and the input signal (signal value $X_{3-(p, q)}$) for the third sub-pixels 49B all subjected to the bit-length extension by the bit-length extending processor 223 and on the expansion coefficient $k\alpha_k$ of each pixel 48.

The image processor 22b performs synchronous processing in which the above-described conversion processing is performed so as to output the signal value $X_{1-(p, q)}$, the signal value $X_{2-(p, q)}$, the signal value $X_{3-(p, q)}$, and the signal value $X_{4-(p, q)}$ for the (p, q)-th pixel 48 (Step S15). Based on the synchronization signal STM, the image display panel driver 40 displays an image of each frame on the image display panel 30, and the planar light source device controller 60 drives the light sources 56A to 56F and 57A to 57F individually.

As described above, as in the first embodiment and the second embodiment, the display apparatus 10b according to the third embodiment drives the light sources 56A to 56F and 57A to 57F individually based on information of input signals SRGB of an image, and displays the image using output signals SRGBW obtained by lowering the brightness of the dark region in the image represented by the input signals SRGB. Thus, a higher contrast ratio can be attained for any image input.

In the present embodiment, as in the first embodiment, a histogram analysis is performed on the input signals SRGB of an image, and the brightness of the dark region is lowered in accordance with characteristics corresponding to the result of this histogram analysis to obtain the output signals SRGBW. Thus, the image can be displayed with a favorable contrast ratio.

In the present embodiment, as in the second embodiment, the image processor 22b lowers the brightness of the dark region by performing the bit-length extension processing on input signals SRGB of an image, and performing image processing on the foregoing signals subjected to the bit-length extension processing, using the corrected expansion coefficients $k\alpha_k$ of the respective pixels 48, and thus can obtain the output signals SRGBW. The corrected expansion coefficients $k\alpha_k$ are obtained by correcting the expansion coefficients $\alpha_k$ of the respective pixels 48 using the correction coefficients k corresponding to the expansion coefficients $\alpha_k$. Thus, the image can be displayed with a favorable contrast ratio with the number of gradations in the dark region increased, and image display can be of higher quality.

In the present embodiment, as in the first and the second embodiments, the brightness of the dark region is lowered with respect to the video signals without lowering luminance in the dark region in driving the light sources 56A to 56F and 57A to 57F. Thus, a higher contrast ratio can be attained with the visibility of gradation in the dark region secured.

The present embodiment can provide a display apparatus that is configured to control individual brightness of a plurality of light sources individually, the light sources being capable of individually changing amount of luminescence in a plurality of areas in a display area, and that is capable of increasing the number of gradations in a dark region of an image and capable of increasing a contrast ratio with respect to any image input.

Each of the above-described embodiments has illustrated an example of local dimming control using an edge-type backlight. Specifically, in the example, the planar light source device 50 includes sidelight type light sources and is configured to individually control the light sources 56A to 56F for controlling the luminance of the panel. However, the configuration of the planar light source device 50 including a plurality of light sources is not limited to this example. For example, the planar light source device 50 may be configured to perform local dimming control with what is called a direct backlight having a plurality of light sources arranged in a plane on the back side of the image display panel.

While the embodiments have been described above, the present invention is not limited to what have described above. The above-described components of the present invention include a component that is easily conceivable by those skilled in the art and those that are substantially the same. The components described above can be appropriately combined. The components can be omitted, substituted, or altered in any one of various manners without departing from the spirit of the present invention.

The present invention includes the following aspect.

(1) A display apparatus comprising:
an image display panel that displays an image thereon;
a planar light source that includes a plurality of light sources and irradiates a plurality of divided areas of the image display panel with light from the back side of the image display panel; and
a signal processor that drives the light sources individually based on input signals of the image to control brightness of the individual divided areas,
wherein the signal processor performs image display on the image display panel using output signals obtained by lowering brightness of a dark region in the image represented by the input signals.

(2) The display apparatus according to (1),
wherein the signal processor performs a histogram analysis on the input signals and lowers the brightness of the dark region in accordance with characteristics corresponding to a result of the histogram analysis to obtain the output signals.

(3) The display apparatus according to (2),
wherein, in the histogram analysis, the signal processor analyzes the number of pixels at each level of brightness indicated by the input signals of the image.

(4) The display apparatus according to (2) or (3),
wherein, in accordance with the result of the histogram analysis, the signal processor performs image processing such that:
for a region in which brightness of an original image is equal to or higher than a certain brightness threshold, brightness of the original image is maintained; and
for a region in which brightness of the original image is lower than the certain brightness threshold, decrease in brightness after the image processing relative to decrease in brightness of the original image becomes gradually larger as the brightness of the original image decreases.

(5) The display apparatus according to any one of (2) to (4),
wherein the signal processor obtains the output signals by lowering brightness of the dark region by performing bit-length extension processing using a bit conversion table corresponding to the result of the histogram analysis.

(6) The display apparatus according to any one of (1) to (3).
wherein the signal processor lowers brightness of the dark region by:
performing bit-length extension processing on the input signals, and
performing image processing on the input signals subjected to the bit-length extension processing, using corrected expansion coefficients of respective pixels arranged in the image display panel, the corrected expansion coefficients being obtained by correcting expansion coefficients of the respective pixels using correction coefficients corresponding to the expansion coefficients.

(7) A display apparatus comprising:
an image display panel that displays an image thereon;
a planar light source that includes a plurality of light sources and irradiates a plurality of divided areas of the image display panel with light from the back side of the image display panel; and
a signal processor that controls brightness of the divided areas based on input signals of the image,
wherein the signal processor performs image display on the image display panel using output signals obtained by lowering brightness of a dark region in the image represented by the input signals.

(8) The display apparatus according to (7),
wherein the signal processor performs a histogram analysis on the input signals and lowers the brightness of the dark region in accordance with characteristics corresponding to a result of the histogram analysis to obtain the output signals.

(9) The display apparatus according to (8), wherein, in the histogram analysis, the signal processor analyzes the number of pixels at each level of brightness indicated by the input signals of the image.

(10) The display apparatus according to (8) or (9), wherein, in accordance with the result of the histogram analysis, the signal processor performs image processing such that:

for a region in which brightness of an original image is equal to or higher than a certain brightness threshold, brightness of the original image is maintained; and for a region in which brightness of the original image is lower than the certain brightness threshold, decrease in brightness after the image processing relative to decrease in brightness of the original image becomes gradually larger as the brightness of the original image decreases.

(11) The display apparatus according to any one of (8) to (10), wherein the signal processor obtains the output signals by lowering brightness of the dark region by performing bit-length extension processing using a bit conversion table corresponding to the result of the histogram analysis.

(12) The display apparatus according to any one of (7) to (9)

wherein the signal processor lowers brightness of the dark region by:

performing bit-length extension processing on the input signals, and performing image processing on the input signals subjected to the bit-length extension processing, using corrected expansion coefficients of respective pixels arranged in the image display panel, the corrected expansion coefficients being obtained by correcting expansion coefficients of the respective pixels using correction coefficients corresponding to the expansion coefficients.

What is claimed is:

1. A display apparatus comprising:

an image display panel that displays an image thereon;

a planar light source that is disposed on a back side of the image display panel and that includes a light guide plate having an incident surface and a plurality of light sources of sidelight type lights along a side of the light guide plate, the light sources irradiating a plurality of divided areas of the image display panel through the incident surface of the light guide plate; and a signal processor that drives the light sources individually based on input signals of the image, the input signals being calculated using predetermined lookup tables each indicating a light intensity distribution of the divided areas when respective ones of the light sources irradiate the light guide plate and light travels therethrough, thereby to control brightness of the individual divided areas, wherein the signal processor performs image display on the image display panel using output signals obtained by lowering brightness of a dark region in the image represented by the input signals, wherein the signal processor performs a histogram analysis on the input signals and lowers the brightness of the dark region in accordance with characteristics corresponding to a result of the histogram analysis to obtain the output signals, and wherein, in accordance with the result of the histogram analysis, the signal processor performs image processing such that:

for a region in which brightness of an original image is equal to or higher than a certain brightness threshold, brightness of the original image is maintained; and for a region in which brightness of the original image is lower than the certain brightness threshold, decrease in brightness after the image processing relative to decrease in brightness of the original image becomes gradually larger as the brightness of the original image decreases.

2. The display apparatus according to claim 1, wherein, in the histogram analysis, the signal processor analyzes the number of pixels at each level of brightness indicated by the input signals of the image.

3. The display apparatus according to claim 1, wherein the signal processor obtains the output signals by lowering brightness of the dark region by performing bit-length extension processing using a bit conversion table corresponding to the result of the histogram analysis.

4. The display apparatus according to claim 3, wherein a certain brightness threshold is determined based on the result of the histogram analysis, wherein the signal processor lowers brightness of the dark region by:

performing bit-length extension processing on the input signals, and performing image processing on the input signals subjected to the bit-length extension processing, using corrected expansion coefficients of respective pixels arranged in the image display panel, the corrected expansion coefficients being obtained by correcting expansion coefficients of the respective pixels using a second correction coefficient table having a second correction coefficient, and wherein the second correction coefficient is:

less than 1 in a case where each expansion coefficient is less than the certain brightness threshold; and equal to 1 in a case where each expansion coefficient is not less than the certain brightness threshold.

5. The display apparatus according to claim 1, wherein the signal processor lowers brightness of the dark region by:

performing bit-length extension processing on the input signals, and performing image processing on the input signals subjected to the bit-length extension processing, using corrected expansion coefficients of respective pixels arranged in the image display panel, the corrected expansion coefficients being obtained by correcting expansion coefficients of the respective pixels using a first correction coefficient table including a first correction coefficient that corresponds to respective expansion coefficients.

6. A display apparatus comprising:

an image display panel that displays an image thereon;

a planar light source that is disposed on a back side of the image display panel and that includes a light guide plate having an incident surface and a plurality of light sources of sidelight type lights along a side of the light guide plate, the light sources irradiating a plurality of divided areas of the image display panel through the incident surface of the light guide plate; and a signal processor that controls brightness of the divided areas based on input signals of the image, the input signals being calculated using predetermined lookup tables each indicating a light intensity distribution of the divided areas when respective ones of the light sources irradiate the light guide plate and light travels therethrough, wherein the signal processor performs image display on the image display panel using output signals obtained by lowering brightness of a dark region in the image represented by the input signals, wherein the signal processor performs a histogram analysis on the input signals and lowers the brightness of the dark region in accordance with characteristics corresponding to a result of the histogram analysis to obtain the output signals, and wherein the signal processor lowers brightness of the dark region by:
- performing bit-length extension processing on the input signals, and
- performing image processing on the input signals subjected to the bit-length extension processing, using corrected expansion coefficients of respective pixels arranged in the image display panel, the corrected expansion coefficients being obtained by correcting expansion coefficients of the respective pixels using correction coefficients corresponding to the expansion coefficients.

7. The display apparatus according to claim 6,
wherein, in the histogram analysis, the signal processor analyzes the number of pixels at each level of brightness indicated by the input signals of the image.

8. The display apparatus according to claim 6,
wherein, in accordance with the result of the histogram analysis, the signal processor performs image processing such that:
for a region in which brightness of an original image is equal to or higher than a certain brightness threshold, brightness of the original image is maintained; and
for a region in which brightness of the original image is lower than the certain brightness threshold, decrease in brightness after the image processing relative to decrease in brightness of the original image becomes gradually larger as the brightness of the original image decreases.

9. The display apparatus according to claim 6,
wherein the signal processor obtains the output signals by lowering brightness of the dark region by performing bit-length extension processing using a bit conversion table corresponding to the result of the histogram analysis.

10. The display apparatus according to claim 6,
wherein the first correction coefficient is:
equal to 1 in a case where each expansion coefficient is not greater than a certain expansion coefficient threshold, and
less than 1 in a case where each expansion coefficient is greater than the certain expansion coefficient threshold.

11. A display apparatus comprising:
an image display panel that displays an image thereon;
a planar light source that is disposed on a back side of the image display panel and that includes a light guide plate having an incident surface and a plurality of light sources of sidelight type lights along a side of the light guide plate, the light sources irradiating a plurality of divided areas of the image display panel through the incident surface of the light guide plate; and
a signal processor that controls brightness of the divided areas based on input signals of the image, the input signals being calculated using predetermined lookup tables each indicating a light intensity distribution of the divided areas when respective ones of the light sources irradiate the light guide plate and light travels therethrough, wherein the signal processor performs image display on the image display panel using output signals obtained by lowering brightness of a dark region in the image represented by the input signals, wherein the signal processor performs a histogram analysis on the input signals and lowers the brightness of the dark region in accordance with characteristics corresponding to a result of the histogram analysis to obtain the output signals, and wherein, in accordance with the result of the histogram analysis, the signal processor performs image processing such that:
for a region in which brightness of an original image is equal to or higher than a certain brightness threshold, brightness of the original image is maintained; and
for a region in which brightness of the original image is lower than the certain brightness threshold, decrease in brightness after the image processing relative to decrease in brightness of the original image becomes gradually larger as the brightness of the original image decreases.

12. The display apparatus according to claim 11,
wherein, in the histogram analysis, the signal processor analyzes the number of pixels at each level of brightness indicated by the input signals of the image.

13. The display apparatus according to claim 11,
wherein the signal processor obtains the output signals by lowering brightness of the dark region by performing bit-length extension processing using a bit conversion table corresponding to the result of the histogram analysis.

14. The display apparatus according to claim 13,
wherein a certain brightness threshold is determined based on the result of the histogram analysis,
wherein the signal processor lowers brightness of the dark region by:
performing bit-length extension processing on the input signals, and
performing image processing on the input signals subjected to the bit-length extension processing, using corrected expansion coefficients of respective pixels arranged in the image display panel, the corrected expansion coefficients being obtained by correcting expansion coefficients of the respective pixels using a second correction coefficient table having a second correction coefficient, and
wherein the second correction coefficient is:
less than 1 in a case where each expansion coefficient is less than the certain brightness threshold; and
equal to 1 in a case where each expansion coefficient is not less than the certain brightness threshold.

15. The display apparatus according to claim 11,
wherein the signal processor lowers brightness of the dark region by:
performing bit-length extension processing on the input signals, and
performing image processing on the input signals subjected to the bit-length extension processing, using corrected expansion coefficients of respective pixels arranged in the image display panel, the corrected expansion coefficients being obtained by correcting expansion coefficients of the respective pixels using a first correction coefficient table including a first correction coefficient that corresponds to respective expansion coefficients.

16. The display apparatus according to claim 15, wherein the first correction coefficient is:
   equal to 1 in a case where each expansion coefficient is not greater than a certain expansion coefficient threshold, and
   less than 1 in a case where each expansion coefficient is greater than the certain expansion coefficient threshold.

\* \* \* \* \*